US011350115B2

(12) United States Patent
Tsukagoshi

(10) Patent No.: US 11,350,115 B2
(45) Date of Patent: May 31, 2022

(54) TRANSMITTING APPARATUS, TRANSMITTING METHOD, RECEIVING APPARATUS, AND RECEIVING METHOD

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/621,437

(22) PCT Filed: Jun. 11, 2018

(86) PCT No.: PCT/JP2018/022288
§ 371 (c)(1),
(2) Date: Dec. 11, 2019

(87) PCT Pub. No.: WO2018/235666
PCT Pub. Date: Dec. 27, 2018

(65) Prior Publication Data
US 2020/0195943 A1 Jun. 18, 2020

(30) Foreign Application Priority Data
Jun. 19, 2017 (JP) .............................. JP2017-120026

(51) Int. Cl.
*H04N 19/31* (2014.01)
*H04N 19/132* (2014.01)
(Continued)

(52) U.S. Cl.
CPC ........... *H04N 19/31* (2014.11); *H04N 19/132* (2014.11); *H04N 19/136* (2014.11); *H04N 19/172* (2014.11); *H04N 19/70* (2014.11)

(58) Field of Classification Search
None
See application file for complete search history.

(56) References Cited

U.S. PATENT DOCUMENTS

| 5,797,041 A | 8/1998 | Yasue et al. |
| 6,198,505 B1 | 3/2001 | Turner et al. |
| (Continued) | | |

FOREIGN PATENT DOCUMENTS

| CN | 104541511 A | 4/2015 |
| EP | 2 688 304 A1 | 1/2014 |
| (Continued) | | |

OTHER PUBLICATIONS

International Search Report dated Aug. 14, 2018 in PCT/JP2018/022288 filed on Jun. 11, 2018.

*Primary Examiner* — James M Anderson, II
(74) *Attorney, Agent, or Firm* — Chris Kolefas

(57) ABSTRACT

A transmission apparatus configured to mix, at a mixing rate, pixels of first video data with pixels of peripheral frames of the first video data and obtain second video data at a first frame rate. The mixing rate for each pixel of a frame of the first video data is based on a luminance value of the pixel. The second video data includes frames having a second frame rate lower than the first frame rate. The apparatus encodes the frames having the second frame rate to obtain a basic stream and encodes remaining frames of the second video data to obtain an extended stream, inserts information about the mixing rate into the basic stream and the extended stream in association with each frame, and transmits the basic stream and the extended stream into which the information about the mixing rate has been inserted.

16 Claims, 43 Drawing Sheets

(51) Int. Cl.
*H04N 19/136* (2014.01)
*H04N 19/172* (2014.01)
*H04N 19/70* (2014.01)

(56) References Cited

U.S. PATENT DOCUMENTS

| | | |
|---|---|---|
| 2002/0030751 A1 | 3/2002 | Takane |
| 2004/0240543 A1 | 12/2004 | Faroudja |
| 2005/0036704 A1 | 2/2005 | Dumitras et al. |
| 2008/0158386 A1 | 7/2008 | Miki |
| 2008/0284904 A1 | 11/2008 | Dumitras et al. |
| 2008/0292201 A1 | 11/2008 | Dumitras et al. |
| 2009/0180761 A1* | 7/2009 | Wand ............ H04N 19/172 386/329 |
| 2010/0238792 A1 | 9/2010 | Togo |
| 2010/0265353 A1 | 10/2010 | Koyama et al. |
| 2012/0030682 A1 | 2/2012 | Shaffer et al. |
| 2013/0187962 A1 | 7/2013 | Vieri et al. |
| 2014/0071236 A1 | 3/2014 | Tsukagoshi |
| 2014/0092994 A1 | 4/2014 | Wang |
| 2014/0098886 A1 | 4/2014 | Crenshaw et al. |
| 2014/0104492 A1 | 4/2014 | Liu et al. |
| 2014/0286415 A1* | 9/2014 | Kang ............ H04N 19/33 375/240.12 |
| 2015/0229878 A1 | 8/2015 | Hwang et al. |
| 2016/0360178 A1 | 12/2016 | Tsukagoshi |
| 2018/0199078 A1 | 7/2018 | Beattie, Jr. et al. |
| 2018/0213242 A1 | 7/2018 | Tsukagoshi |
| 2018/0220129 A1* | 8/2018 | Peng ............ H04N 19/154 |
| 2019/0394475 A1 | 12/2019 | Toma et al. |

FOREIGN PATENT DOCUMENTS

| | | |
|---|---|---|
| EP | 2 731 337 A1 | 5/2014 |
| EP | 3 349 456 A1 | 7/2018 |
| JP | 2007-150432 A | 6/2007 |
| WO | WO 03/021970 A1 | 3/2003 |
| WO | WO 2009/133403 A2 | 11/2009 |
| WO | WO 2012/166512 A2 | 12/2012 |
| WO | WO-2012166512 A2 * | 12/2012 ........... H04N 19/176 |
| WO | WO 2015/076277 A1 | 5/2015 |
| WO | WO 2016/136470 A1 | 9/2016 |
| WO | WO 2017/033748 A1 | 3/2017 |
| WO | WO 2017/038800 A1 | 3/2017 |
| WO | WO 2017/043504 A1 | 3/2017 |

* cited by examiner

```
[Determination logic based only on pixels in Picture N]

{PreProc} if ( (P(N) > range_high) or (P(N) < range_low) ) {
         Type1_blending()
}
else {
         Type0_blending()

}

{PostProc} if (P'(N) > range_high ) {
    if( P(N+1) =< range_high ) {
         Type1_reverse_blending()
    }
    else {
         Type0_reverse_blending()
    }
}
else if (P'(N) < range_low ) {
    if( P(N+1) >= range_low ) {
         Type1_reverse_blending()
    }
    else{
         Type0_reverse_blending()
    }
}
else {
         Type0_reverse_blending()
}
```

FIG.8

```
[Determination logic based on pixels in Picture N and Picture N+1]

{PreProc}
if ( (P(N) > range_high ) or ( P(N) < range_low) ) {
        Type1_blending()
}
else {
   if(( P(N+1) > range_high ) or ( P(N+1) < range_low )) {
        Type2_blending()
   }
 else {
        Type0_blending()
   }
}

{PostProc}
if (P'(N) > range_high) {
    if ( P(N+1) > range_high  ) {
            Type2_reverse_blending()
    }
    else {
            Type1_reverse_blending()
    }
}
else if ( P'(N) < range_low ) {
    if (P(N+1)  < range_low ) {
            Type2_reverse_blending()
    }
    else {
            Type1_reverse_blending()
    }
}
else{
            Type0_reverse_blending()
}
```

FIG.10

| P(N), P(N+1) | Modified P(N),P(N+1) |
|---|---|
| 940 | 940 |
| : | : |
| 706 | 706 |
| 705 | 705 |
| 704 | |
| 703 | |
| 702 | |
| 701 | |
| 700 | → range limit high value = 700 |
| 699 | |
| 698 | 698 |
| 697 | 697 |
| : | : |
| 64 | 64 |

Upper-limit-value table

FIG.13

| P(N), P(N+1) | Modified P(N),P(N+1) |
|---|---|
| 940 | 940 |
| : | : |
| 103 | 103 |
| 102 | 102 |
| 101 | |
| 100 | → range_limit_low_value = 100 |
| 99 | |
| 98 | |
| 97 | |
| 96 | 96 |
| 95 | 95 |
| 94 | 94 |
| : | : |
| 64 | 64 |

Lower-limit-value table

FIG.14

Blend_and_range_Information SEI Syntax

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_bytes | 8 | |
| } | | |

FIG.18

| Syntax | No. of Bits | Format |
|---|---|---|
| Blend_and_range_information ( ) { | | |
| blend_and_range_information_id | 8 | bslbf |
| bit_depth_information | 8 | bslbf |
| range_limit_high_value | 16 | uimsbf |
| range_limit_low_value | 16 | uimsbf |
| blending_mode | 8 | uimsbf |
| if ( blending_mode == 0x0 ) { | | |
| type0_blending_coefficient_a | 8 | uimsbf |
| type0_blending_coefficient_b | 8 | uimsbf |
| } else if ( blending_mode == 0x1 ) { | | |
| type0_blending_coefficient_a | 8 | Uimsbf |
| type0_blending_coefficient_b | 8 | Uimsbf |
| type1_blending_coefficient_c | 8 | Uimsbf |
| type1_blending_coefficient_d | 8 | Uimsbf |
| } else if ( blending_mode == 0x2 ) { | | |
| type0_blending_coefficient_a | 8 | Uimsbf |
| type0_blending_coefficient_b | 8 | Uimsbf |
| type1_blending_coefficient_c | 8 | Uimsbf |
| type1_blending_coefficient_d | 8 | Uimsbf |
| type2_blending_coefficient_e | 8 | Uimsbf |
| type2_blending_coefficient_f | 8 | Uimsbf |
| } | | |
| } | | |

FIG.19 semantics
bit_depth_information (8bits)
    Bit width of encoded pixel
    0 : 8bits, 1 : 10bits, 2 :12 bits , 3 : 16 bits,  others : reserved
range_limit_high_value (16bits)
    Level value of upper limit of normal-blending-process target range
range_limit_low_value (16bits)
    Level value of lower limit of normal-blending-process target range
blending_mode (8bits)
    Indicating modes of blending process
    0x0         mode0 (Normal blending process)
    0x1         mode1 (Special blending process based on determination of pixels in picture N)
    0x2         mode2 (Special blending process based on determination of pixels in pictures N and N+1)
    others : reserved
type0_blending_coefficient_a (8bits)
    Coefficient "a" in normal blending process of Type0 (coefficient for base-layer pixels)
type0_blending_coefficient_b (8bits)
    Coefficient "b" in normal blending process of Type0 (coefficient for enhanced pixels)
type1_blending_coefficient_c (8bits)
    Coefficient "c" in special blending process of Type1 (coefficient for base-layer pixels)
type1_blending_coefficient_d (8bits)
    Coefficient "d" in special blending process of Type1 (coefficient for enhanced pixels)
type2_blending_coefficient_e (8bits)
    Coefficient "e" in special blending process of Type2 (coefficient for base-layer pixels)
type2_blending_coefficient_f (8bits)
    Coefficient "f" in special blending process of Type2 (coefficient for enhanced pixels)

FIG.20

| Syntax | No. of Bits | Format |
|---|---|---|
| HFR_descriptor(){ | | |
| HFR_descriptor_tag | 8 | uimsbf |
| HFR_descriptor_length | 8 | uimsbf |
| bit_depth_information | 8 | bslbf |
| range_limit_high_value | 16 | uimsbf |
| range_limit_low_value | 16 | uimsbf |
| blending_mode | 8 | uimsbf |
| blending_target | 3 | uimsbf |
| reserved | 5 | bslbf |
| if ( blending_mode == 0x0 ) { | | |
| type0_blending_coefficient_a | 8 | uimsbf |
| type0_blending_coefficient_b | 8 | uimsbf |
| } else if ( blending_mode == 0x1 ) { | | |
| type0_blending_coefficient_a | 8 | Uimsbf |
| type0_blending_coefficient_b | 8 | Uimsbf |
| type1_blending_coefficient_c | 8 | Uimsbf |
| type1_blending_coefficient_d | 8 | Uimsbf |

| Syntax | No. of Bits | Format |
|---|---|---|
| } else if ( blending_mode == 0x2 ) { | | |
| type0_blending_coefficient_a | 8 | Uimsbf |
| type0_blending_coefficient_b | 8 | Uimsbf |
| type1_blending_coefficient_c | 8 | Uimsbf |
| type1_blending_coefficient_d | 8 | Uimsbf |
| type2_blending_coefficient_e | 8 | Uimsbf |
| type2_blending_coefficient_f | 8 | Uimsbf |
| } | | |
| } | | |

FIG.21

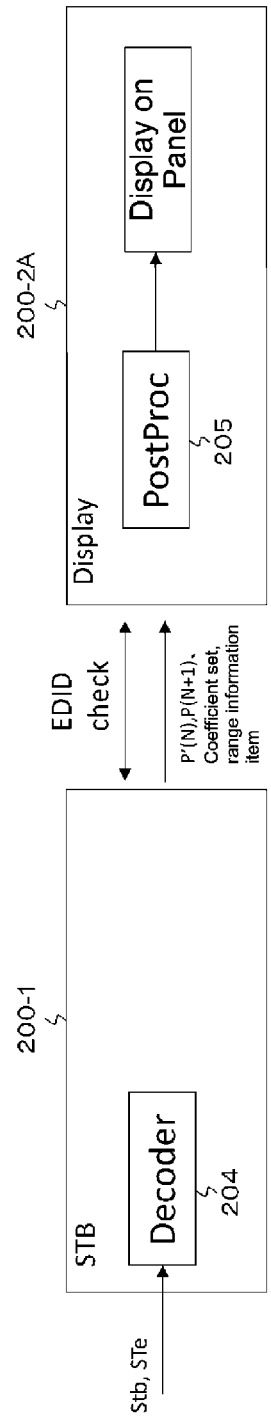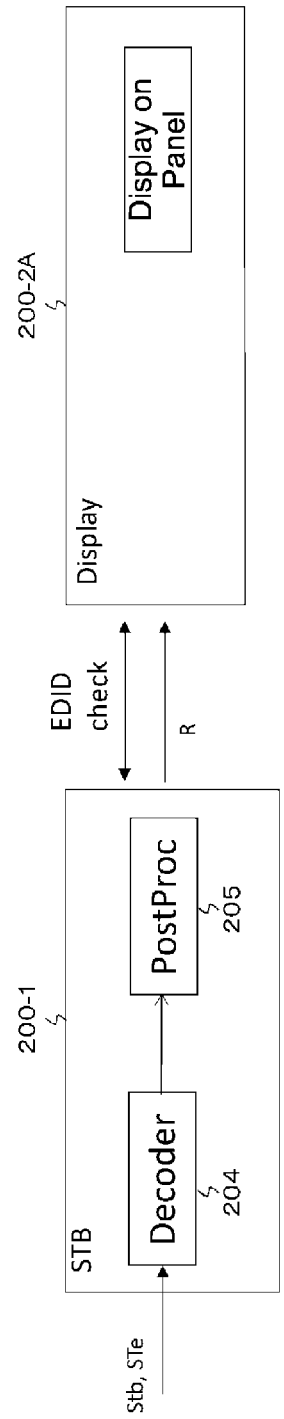

HDMI Info Frame structure for HFR blending

| Byte ¥ Bit # | 7 | 6 | 5 | 4 | 3 | 2 | 1 | 0 |
|---|---|---|---|---|---|---|---|---|
| Info Frame Type Code | | | | New InfoFrame Type | | | | |
| Info Frame Version Number | | | | Version = 0x01 | | | | |
| Length of HFR Blending InfoFrame | | | | Length | | | | |
| Data Byte 1 | | Frame Rate | | | Blending_flag | reserved | | SF |
| Data Byte 2 | | | | bit_depth_information | | | | |
| Data Byte 3 | | | | Range_limit_high_value MSByte | | | | |
| Data Byte 4 | | | | Range_limit_high_value LSByte | | | | |
| Data Byte 5 | | | | Range_limit_low_value MSByte | | | | |
| Data Byte 6 | | | | Range_limit_low_value LSByte | | | | |
| Data Byte 7 | | | | Blending_mode | | | | |
| Data Byte 8 | | | | Type0_blending_coefficient_a | | | | |
| Data Byte 9 | | | | Type0_blending_coefficient_b | | | | |
| Data Byte 10 | | | | Type1_blending_coefficient_c | | | | |
| Data Byte 11 | | | | Type1_blending_coefficient_d | | | | |
| Data Byte 12 | | | | Type2_blending_coefficient_e | | | | |
| Data Byte 13 | | | | Type2_blending_coefficient_f | | | | |

FIG.33 semantics

```
Frame Rate (3bits)
    0 : 50Hz,  1 : 60Hz,  2 : 100Hz,  3 : 120Hz,  4 : 200Hz,  5 : 240Hz,
    others : reserved
Blending_flag (1bit)
    0           blending is not applied
    1           blending is applied
SF (1bit) (Synchronized Frame)
    0           Process of synchronization with next video frame is inessential
    1           Process of synchronization with next video frame is essential
Range_limit_high_value (16bits)
                Upper limit value of normal-blending-process target range
Range_limit_low_value (16bits)
                Lower limit value of normal-blending-process target range
Blending_mode (8bits)
                Indicating modes of blending process
Type0_blending_coefficient_a (8bits)
                Coefficient "a" in normal blending process of Type0 (for pixels in picture "N")
Type0_blending_coefficient_b (8bits)
                Coefficient "b" in normal blending process of Type0 (for pixels in picture "N+1")
Type1_blending_coefficient_c (8bits)
                Coefficient "c" in special blending process of Type1 (for pixels in picture "N")
Type1_blending_coefficient_d (8bits)
                Coefficient "d" in special blending process of Type1 (for pixels in picture "N+1")
Type2_blending_coefficient_e (8bits)
                Coefficient "e" in special blending process of Type2 (for pixels in picture "N")
Type2_blending_coefficient_f (8bits)
                Coefficient "f" in special blending process of Type2 (for pixels in picture "N+1")
```

FIG.34

STe ─────────
    └ Blend_and_range_information SEI
            blending_target = 1

STb ─────────
    └ Blend_and_range_information SEI
            blending_target = 0

FIG.47A

STe ─────────

STb ─────────
    ┌ Blend_and_range_information SEI
    │        blending_target = 0
    └ Blend_and_range_information SEI
            blending_target = 1

FIG.47B

| Syntax | No. of Bits | Format |
|---|---|---|
| Blend_and_range_information () { | | |
| blend_and_range_information_id | 8 | bslbf |
| bit_depth_information | 8 | bslbf |
| range_limit_high_value | 16 | uimsbf |
| range_limit_low_value | 16 | uimsbf |
| blending_mode | 8 | uimsbf |
| blending_target | 3 | uimsbf |
| reserved | 5 | bslbf |
| if ( blending_mode == 0x0 ) { | | |
| type0_blending_coefficient_a | 8 | uimsbf |
| type0_blending_coefficient_b | 8 | uimsbf |
| } else if ( blending_mode == 0x1 ) { | | |
| type0_blending_coefficient_a | 8 | Uimsbf |
| type0_blending_coefficient_b | 8 | Uimsbf |
| type1_blending_coefficient_c | 8 | Uimsbf |
| type1_blending_coefficient_d | 8 | Uimsbf |
| } else if ( blending_mode == 0x2 ) { | | |
| type0_blending_coefficient_a | 8 | Uimsbf |
| type0_blending_coefficient_b | 8 | Uimsbf |
| type1_blending_coefficient_c | 8 | Uimsbf |
| type1_blending_coefficient_d | 8 | Uimsbf |
| type2_blending_coefficient_e | 8 | Uimsbf |
| type2_blending_coefficient_f | 8 | Uimsbf |
| } | | |
| } | | |

Semantics of new element blending_target (3bits)
Indicating group to which picture being blending target belongs
  0    base sublayer
  1    (1st) enhanced sublayer

FIG.48

HDMI Info Frame structure for HFR blending

| | | | |
|---|---|---|---|
| Info Frame Type Code | New InfoFrame Type | | |
| Info Frame Version Number | Version = 0x01 | | |
| Length of HFR Blending InfoFrame | Length | | |
| Data Byte 1 | Frame Rate | Blending_flag | blenging_target SF |
| Data Byte 2 | bit_depth_information | | |
| Data Byte 3 | Range_limit_high_value MSByte | | |
| Data Byte 4 | Range_limit_high_value LSByte | | |
| Data Byte 5 | Range_limit_low_value MSByte | | |
| Data Byte 6 | Range_limit_low_value LSByte | | |
| Data Byte 7 | Blending_mode | | |
| Data Byte 8 | Type0_blending_coefficient_a | | |
| Data Byte 9 | Type0_blending_coefficient_b | | |
| Data Byte 10 | Type1_blending_coefficient_c | | |
| Data Byte 11 | Type1_blending_coefficient_d | | |
| Data Byte 12 | Type2_blending_coefficient_e | | |
| Data Byte 13 | Type2_blending_coefficient_f | | |

FIG.49

TRANSMITTING APPARATUS, TRANSMITTING METHOD, RECEIVING APPARATUS, AND RECEIVING METHOD

CROSS REFERENCE TO RELATED APPLICATIONS

This application claims the benefit of Japanese Priority Patent Application JP 2017-120026 filed Jun. 19, 2017, the entire contents of which are incorporated herein by reference.

TECHNICAL FIELD

The present technology relates to a transmitting apparatus, a transmitting method, a receiving apparatus, and a receiving method. In particular, the present technology relates to, for example, a transmitting apparatus that transmits moving-image data items at a high frame rate.

BACKGROUND ART

In recent years, cameras that capture images at a high frame rate with a high-speed frame shutter have been known. The high frame rate is, for example, several times, several tens of times, or even several hundreds of times as high as a normal frame rate of, for example, 60 Hz or 50 Hz.

In a service with the high frame rate, it is conceivable to convert, before transmission, a moving-image data item captured with the camera with the high-speed frame shutter to a moving-image sequence at a frequency lower than an original frequency of the moving-image data item. However, although the images captured with the high-speed frame shutter have an advantage of improving motion blurs and achieving image quality with a high degree of sharpness, the images have a factor that causes a problem with image quality in related-art frame interpolation technologies used on a receiving-and-replaying side where the moving-image sequence at the frame rate lower than the high frame rate of the moving-image data item to be distributed.

Frame interpolation with the images with the high degree of sharpness, which are captured with the high-speed frame shutter, causes a larger difference between a case where motion vector search is applicable and otherwise. Thus, the difference therebetween is displayed as noticeable image degradation. High-load calculation is frequently used to increase accuracy of the motion vector search at the time of the frame interpolation. However, the high-load calculation adversely affects cost of the receiver.

The applicant of the present application has previously proposed a technology for converting the original data items of the images captured with the high-speed frame shutter and displaying these images with quality at a certain level or higher on a related-art receiver that decodes the data items at the normal frame rate (refer to Patent Literature 1).

CITATION LIST

Patent Literature

PTL 1: PCT Application WO 2015/076277 A1

SUMMARY OF INVENTION

Technical Problem

There is a need to satisfactorily transmit moving-image data items at a normal frame rate and a high frame rate.

Solution to Problem

A concept of the present technology lies in a transmitting apparatus including circuitry configured to perform processing of mixing, at a mixing rate, pixels of each frame of first video data with pixels of one or more peripheral frames of the first video data and obtain second video data at a first frame rate, wherein the mixing rate for each pixel of the respective frame of the first video data is based on a luminance value of the respective pixel. The second video data includes frames corresponding to a second frame rate that is lower than the first frame rate, the frames corresponding to the second frame rate being mixed with the peripheral frames.

In accordance with another concept of the present technology, the circuitry is further configured to encode the frames corresponding to the second frame rate to obtain a basic stream and encode remaining frames of the second video data to obtain an extended stream. The circuitry inserts information about the mixing rate for each pixel of the respective frame of the first video data into the basic stream and the extended stream in association with the respective frame and transmits the basic stream and the extended stream into which the information about the mixing rate has been inserted.

In accordance with another concept of the present technology, the information about the mixing rate for each pixel of the respective frame of the first video data includes plural mixing rates and a corresponding luminance range for at least one of the mixing rates. The basic stream and the extended stream have a Network Abstraction Layer (NAL) unit structure, and the circuitry is configured to insert a Supplemental Enhancement Information (SEI) NAL unit with the information about the mixing rate into the basic stream and the extended stream.

In accordance with another concept of the present technology, the circuitry is configured to determine, when performing the processing of mixing the pixels of each frame of the first video data with the pixels of the one or more peripheral frames of the first video data, the mixing rate for each pixel of the respective frame of the first video data based on a luminance value of the respective pixel.

In accordance with another concept of the present technology, the circuitry is configured to determine, when performing the processing of mixing the pixels of each frame of the first video data with the pixels of the one or more peripheral frames of the first video data, the mixing rate for each pixel of the respective frame of the first video data based on a luminance value of the respective pixel, and based on the luminance values of the pixels of the one or more peripheral frames. The information about the mixing rate for each pixel of the respective frame of the first video data includes a first luminance threshold and a second luminance threshold, the first luminance threshold and the second luminance threshold defining the corresponding luminance range for at least one of the mixing rates. The first frame rate is 120 Hz or 240 Hz, and the second frame rate is 60 Hz.

Another concept of the present technology lies in a transmission method comprising performing, by circuitry, processing of mixing, at a mixing rate, pixels of each frame of first video data with pixels of one or more peripheral frames of the first video data and obtaining second video data at a first frame rate. The mixing rate for each pixel of the respective frame of the first video data is based on a luminance value of the respective pixel. The second video data includes frames corresponding to a second frame rate that is lower than the first frame rate and the frames corresponding to the second frame rate are mixed with the peripheral frames. The transmission method further includes encoding, by the circuitry, the frames corresponding to the second frame rate to obtain a basic stream and encoding remaining frames of the second video data to obtain an extended stream. The method further includes inserting, by the circuitry, information about the mixing rate for each pixel of the respective frame of the first video data into the basic stream and the extended stream in association with the respective frame and transmitting, by the circuitry, the basic stream and the extended stream into which the information about the mixing rate has been inserted.

Another concept of the present technology lies in a reception apparatus comprising circuitry configured to receive a basic stream and an extended stream, which are obtained by performing processing of mixing, at a mixing rate, pixels of each frame of first video data with pixels of one or more peripheral frames of the first video data and obtaining second video data at a first frame rate. The mixing rate for each pixel of the respective frame of the first video data is based on a luminance value of the respective pixel, the second video data include frames corresponding to a second frame rate that is lower than the first frame rate, and the frames corresponding to the second frame rate are mixed with the peripheral frames.

In accordance with another concept of the present technology, the basic stream and the extended stream are obtained by then encoding the frames corresponding to the second frame rate to obtain the basic stream, and encoding remaining frames of the second video data to obtain the extended stream, information about the mixing rate for each pixel of the respective frame of the first video data being included in the basic stream and the extended stream in association with the respective frame. The reception apparatus further includes circuitry configured to, based on a frame rate capability of a display connected to the reception apparatus, decode the basic stream to obtain frames at the second frame rate or decode the basic stream and the extended stream to obtain the second video data, and obtain mixing-released video data at the first frame rate by performing back mixing processing on the second video data on a basis of the information about the mixing rate.

In accordance with another concept of the present technology, the information about the mixing rate for each pixel of the respective frame of the first video data includes plural mixing rates and a corresponding luminance range for at least one of the mixing rates. The circuitry is configured to perform back mixing processing based on the plural mixing rates and the corresponding luminance range for at least one of the mixing rates.

Another concept of the present technology lies in a reception method comprising receiving, by circuitry, a basic stream and an extended stream, which are obtained by performing processing of mixing, at a mixing rate, pixels of each frame of first video data with pixels of one or more peripheral frames of the first video data and obtaining second video data at a first frame rate.

In accordance with another concept of the present technology, the mixing rate for each pixel of the respective frame of the first video data is based on a luminance value of the respective pixel. The second video data including frames corresponding to a second frame rate that is lower than the first frame rate, and the frames corresponding to the second frame rate are mixed with the peripheral frames.

In accordance with another concept of the present technology, the basic stream and the extended stream are obtained by encoding the frames corresponding to the second frame rate to obtain the basic stream, and encoding remaining frames of the second video data to obtain the extended stream. Information about the mixing rate for each pixel of the respective frame of the first video data is included in the basic stream and the extended stream in association with the respective frame.

In accordance with another concept of the present technology, the reception method further includes, based on a frame rate capability of a display connected to the reception apparatus, decoding, by the circuitry, the basic stream to obtain frames at the second frame rate, or decoding the basic stream and the extended stream to obtain the second video data, and obtaining mixing-released video data at the first frame rate by performing back mixing processing on the second video data on a basis of the information about the mixing rate.

Another concept of the present technology lies in a reception apparatus comprising circuitry configured to acquire second video data obtained by performing processing of mixing, at a mixing rate, pixels of each frame of first video data with pixels of one or more peripheral frames of the first video data. The mixing rate for each pixel of the respective frame of the first video data is based on a luminance value of the respective pixel.

In accordance with another concept of the present technology, the circuitry is configured to transmit the second video data and information about the mixing rate for each pixel of the respective frame of the first video data to an external device via a transfer path, the information about the mixing rate for each pixel of the respective frame of the first video data includes plural mixing rates and a corresponding luminance range for at least one of the mixing rates.

In accordance with another concept of the present technology, the circuitry is configured to respectively insert the information about the mixing rate for each pixel of the respective frame into a blanking period of the respective frame of the second video data and transmit the second video data.

In accordance with another concept of the present technology, the circuitry is further configured to perform back mixing processing on each frame of the second video data on a basis of the information about the mixing rate to obtain third video data. The circuitry is configured to transmit the third video data instead of the second video data when the external device does not have a function of the back mixing processing.

In accordance with another concept of the present technology, the second video data has a first frame rate, the second video data includes frames corresponding to a second frame rate that is lower than the first frame rate, and the frames corresponding to the second frame rate are mixed with the peripheral frames.

The circuitry is further configured to transmit fourth video data that includes the frames corresponding to the second frame rate instead of the second video data when a frame rate at which display is able to be performed by the external device is the second frame rate.

Another concept of the present technology lies in a reception method comprising acquiring, by circuitry, second video data obtained by performing processing of mixing, at a mixing rate, pixels of each frame of first video data with pixels of one or more peripheral frames of the first video data. The mixing rate for each pixel of the respective frame of the first video data is based on a luminance value of the respective pixel.

In accordance with another concept of the present technology, the reception method further includes transmitting, by the circuitry, the second video data and information about the mixing rate for each pixel of the respective frame of the first video data to an external device via a transfer path, the information about the mixing rate for each pixel of the respective frame of the first video data includes plural mixing rates and a corresponding luminance range for at least one of the mixing rates.

Another concept of the present technology lies in a reception apparatus comprising circuitry configured to receive second video data obtained by performing processing of mixing, at a mixing rate, pixels of each frame of first video data with pixels of one or more peripheral frames of the first video data. Information about a mixing rate for each pixel of the respective frame of the first video data is received from an external device via a transfer path. The mixing rate for each pixel of the respective frame of the first video data is based on a luminance value of the respective pixel.

In accordance with another concept of the present technology, the circuitry is further configured to obtain mixing-released video data by performing back mixing processing on each frame of the second video data on a basis of the information about the mixing rate, the information about the mixing rate for each pixel of the respective frame of the first video data includes plural mixing rates and a corresponding luminance range for at least one of the mixing rates.

Another concept of the present technology lies in a reception method comprising receiving, by circuitry, second video data obtained by performing processing of mixing, at a mixing rate, pixels of each frame of first video data with pixels of one or more peripheral frames of the first video data. Information about a mixing rate for each pixel of the respective frame of the first video data is received from an external device via a transfer path, wherein the mixing rate for each pixel of the respective frame of the first video data is based on a luminance value of the respective pixel.

In accordance with another concept of the present technology, the reception method includes obtaining, by the circuitry, mixing-released video data by performing back mixing processing on each frame of the second video data on a basis of the information about the mixing rate, the information about the mixing rate for each pixel of the respective frame of the first video data includes plural mixing rates and a corresponding luminance range for at least one of the mixing rates.

In accordance with another concept of the present technology, the receiving unit receives the container containing the video stream obtained by encoding the first moving-image data item at the first frame rate. The control unit controls the decoding process and the rate-conversion process. The decoding process includes decoding the video stream such that the first moving-image data item at the first frame rate is obtained. The rate-conversion process includes executing the process of blending the image data items of the peripheral frames of the first moving-image data item with the image data items of the processing-target frames of the first moving-image data item, the processing-target frames corresponding to the second frame rate that is lower than the first frame rate, such that the second moving-image data item at the second frame rate is obtained.

In this way, pixels of frames at the second frame rate are mixed with pixels of the peripheral frames, that is, under the state of the high shutter-opening rate. Thus, images of this moving image can be smoothly displayed in such a manner that the stroboscopic effect is reduced. In addition, the image-quality problem as a result of the frame interpolation process including the low-load calculation in the display process can be avoided.

Note that, in accordance with another concept of the present technology, for example, a receiving apparatus, comprises a receiver configured to receive a video stream obtained by encoding second video data at a first frame rate. The receiving apparatus also includes circuitry configured to control decoding the video stream such that the second video data at the first frame rate is obtained. The circuitry is further configured to control mixing, at a mixing rate, pixels of each frame of first video data with pixels of one or more peripheral frames of the first video data. The second video data includes frames corresponding to a second frame rate that is lower than the first frame rate, the frames corresponding to the second frame rate being mixed with the peripheral frames, such that a basic stream at the second frame rate is obtained. In accordance with another concept of the present technology, the mixing rate for each pixel of the respective frame of the first video data is based on a luminance value of the respective pixel. With this, the original texture of the images, such as the high dynamic range (HDR) effect, can be prevented from being impaired by the blending processes.

Advantageous Effects of Invention

In accordance with the concepts of the present technology, moving-image data items at a normal frame rate and a high frame rate can be satisfactorily transmitted. Note that, the advantages disclosed herein are not necessarily limited to those described hereinabove, and all of the advantages disclosed herein can be obtained.

BRIEF DESCRIPTION OF DRAWINGS

FIG. 8 shows a determination logic of a blending process in the pre-processor and in an unblending process (reverse blending process) in the post-processor in the case where the novel method 1 is employed as the method of determining the blending rates.

FIG. 10 shows another determination logic of the blending process in the pre-processor and in the unblending process (reverse blending process) in the post-processor in the case where the novel method 2 is employed as the method of determining the blending rates.

FIG. 13 shows an example of an upper-limit-value table that is used in a pixel processing unit.

FIG. 14 shows an example of a lower-limit-value table that is used in the pixel processing unit.

FIG. 18 is a table showing a structural example of "Blend_and_range_information SEI message."

FIG. 19 is a table showing a structural example of "Blend_and_range_information( )."

FIG. 20 shows contents of main information items in the structural example of "Blend_and_range_information( )."

FIG. 21 is a table showing a structural example of "HFR_descriptor."

FIG. 32A and FIG. 32B are diagrams showing a comparison between a case where the display has a function of the reverse blending process (unblending process) and otherwise.

FIG. 33 is a table showing a structural example of "HFR Blending InfoFrame."

FIG. 34 shows contents of main information items in the structural example of "HFR Blending InfoFrame."

FIG. 47A and FIG. 47B each show a method of arranging SEIs in the general pattern of the blending process.

FIG. 48 is a table showing a structural example of "Blend_and_range_information SEI message" in the general pattern of the blending process.

FIG. 49 is a table showing a structural example of "HFR Blending InfoFrame" in the general pattern of the blending process.

DESCRIPTION OF EMBODIMENTS

Figure 1:
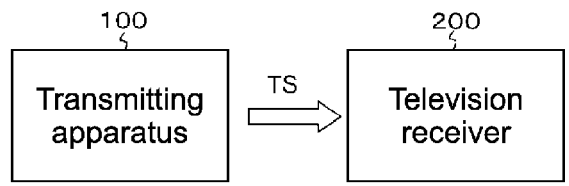
FIG. 1 is a block diagram showing a configuration example of a transmitting-and-receiving system according to a first embodiment.

Now, embodiments of the present technology (hereinafter, abbreviated as "embodiments") are described. Note that the description is made in the following order.
1. First Embodiment
2. Second Embodiment
3. Third Embodiment
4. Modification 1. First Embodiment (Transmitting-and-Receiving System)
FIG. 1 shows a configuration example of a transmitting-and-receiving system 10 according to the first embodiment.

This transmitting-and-receiving system 10 includes a transmitting apparatus 100 and a television receiver 200.

The transmitting apparatus 100 transmits a transport stream TS as a container via a broadcast wave. This transport stream TS contains a base stream (base video stream) and an enhanced stream (enhanced video stream) that are obtained by processing a moving-image data item at a high frame rate of, for example, 120 Hz or 240 Hz, more specifically, at 120 Hz in this embodiment. In this embodiment, the base stream and the enhanced stream each have a NAL unit structure.

The base stream is obtained as follows. Specifically, a moving-image data item after a blending process is obtained by executing a process of blending, at per-frame blending rates based on data levels, image data items of peripheral frames of a high-frame-rate moving-image data item before the blending with image data items of processing-target frames of the high-frame-rate moving-image data item before the blending.

Among image data items of frames of the moving-image data item after the blending process, at least image data items of frames corresponding to a normal frame rate, specifically, corresponding to 60 Hz in this embodiment are blended with image data items of peripheral frames. The base stream is obtained by encoding the image data items of the frames corresponding to the normal frame rate (base frames). Further, the enhanced stream is obtained by encoding image data items of the rest of the frames (enhanced frames).

The base stream contains, as access units, the encoded image data items of the frames corresponding to the normal frame rate. Further, the enhanced stream contains, as access units, the encoded image data items of the enhanced frames corresponding to the high frame rate.

Figure 2:
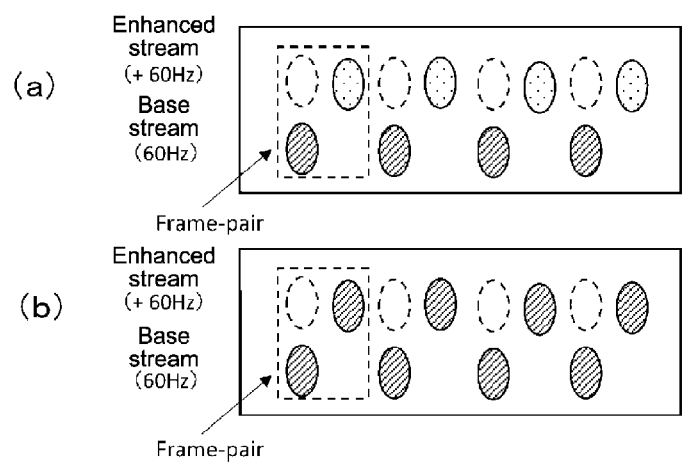
FIG. 2 is illustrations of an example of a base stream at 60 Hz and an enhanced stream at +60 Hz, which are obtained by a blending process on a moving-image data item at 120 Hz.

FIG. 2 illustrates an example of a base stream at 60 Hz, which is obtained by execution of the blending process on the moving-image data item at 120 Hz, and an enhanced stream at +60 Hz. Frame pairs are each formed of two frames, one of which constitutes the base stream and another one of which is subsequent thereto and constitutes an enhanced stream.

In (a) of FIG. 2, in each of the frame pairs, an image data item of a first frame, specifically, an image data item of a frame of the base stream is blended with an image data item of the enhanced frame (blended state), and this image data item of this frame subsequent thereto of the enhanced stream is not blended with the image data item of the base frame (unblended state). Further, (b) of FIG. 2, in each of the frame pairs, the image data item of the first frame, specifically, the image data item of the frame of the base stream is blended with the image data item of the enhanced frame (blended state), and this image data item of the frame subsequent thereto of the enhanced stream is also blended with the image data item of the base frame (blended state).

Information items of the blending rates and a range information item of each of the image data items are inserted into a layer of a video (video stream) and/or a layer of a container. Specifically, the information items of the blending rates contain coefficient sets as many as the number of taps of a filter to be used in the blending process. For example, when "m"-tap filter by which "m" frames can be blended is used, "m" coefficients are contained in the coefficient set of each of the frames.

Further, the range information item of each of the image data items contains information items of a first threshold and a second threshold smaller than the first threshold. Further, in this embodiment, the above-mentioned moving-image data item at 120 Hz is an HDR moving-image data item.

Figure 3:
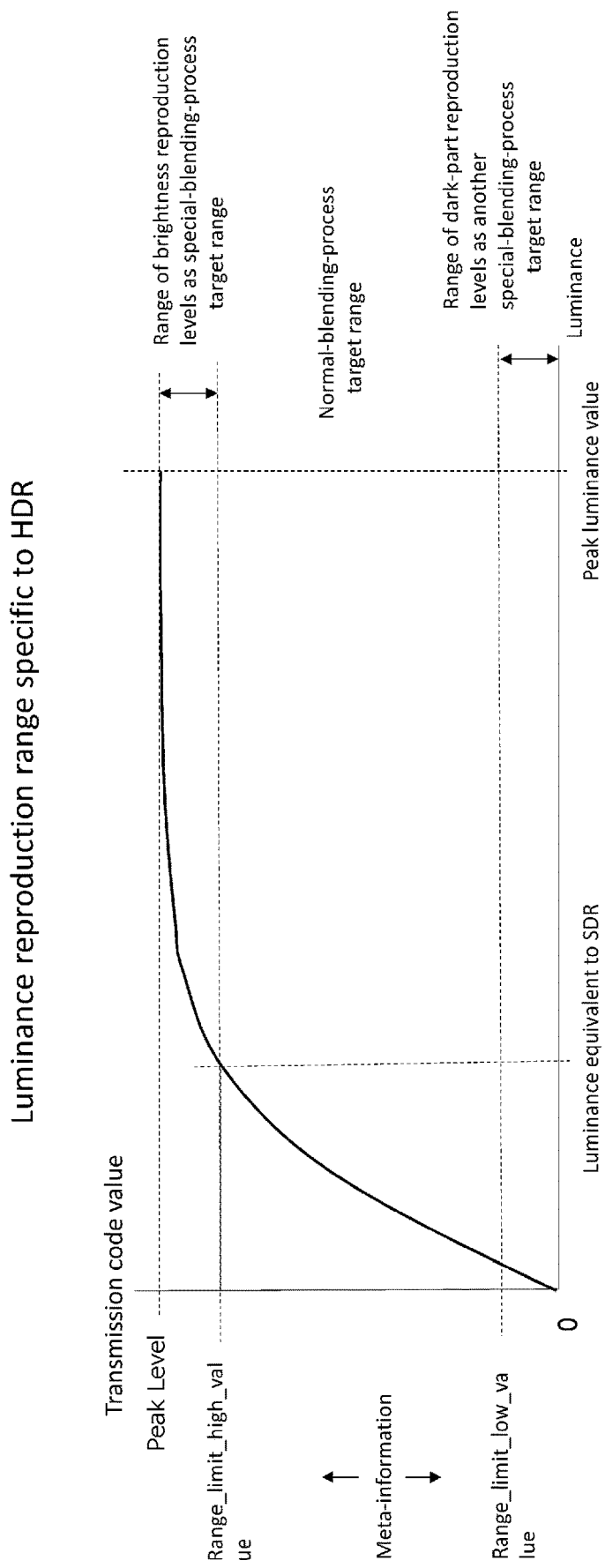
FIG. 3 is a graph showing an example of HDR photoelectric conversion characteristics.

FIG. 3 shows an example of HDR photoelectric conversion characteristics. In this graph, the abscissa axis represents luminance, and the ordinate axis represents transmission code values. The first threshold is a level value "Range_limit_high_value" equivalent to a luminance (100 $cd/m^2$) corresponding to a standard dynamic range (SDR), which is set such that whether or not levels of the image data items are within a range of brightness reproduction levels as a special-blending-process target range is determined. Further, the second threshold is a level value "Range_limit_low_value," which is set such that whether or not the levels of the image data items are within a range of dark-part reproduction levels as another special-blending-process target range.

As described above, at the per-frame blending rates in accordance with the data levels, the image data items of the peripheral frames of the moving-image data item at the high frame rate are blended with the image data items of the processing-target frames of the moving-image data item at the high frame rate. When executing the process of blending the image data items of the peripheral frames with the image data items of the processing-target frames, the blending rates are determined by using the above-mentioned level values "Range_limit_high_value" and "Range_limit_low_value" on a pixel-by-pixel basis.

The determination of the blending rates is performed by a novel method 1 or a novel method 2. By the novel method 1, the blending rates are each determined based on the image data item of the processing-target frame. Meanwhile, in the novel method 2, the blending rates are each determined based not only on the image data item of the processing-target frame but also on the image data item of the peripheral frame.

In this embodiment, SEINAL units each containing the information item of the blending rate (coefficient set) and the range information item of the image data item are inserted into the base stream or the enhanced stream. On a receiving side, on the basis of these information items of the blending rates and the range information item of each of the image data items, at which rate each of the obtained image data items of the frames of each of the base stream and the enhanced stream is blended with corresponding one of the image data items of the peripheral frames can be understood.

Referring back to FIG. 1, the television receiver 200 receives the above-mentioned transport stream TS that is transmitted via the broadcast wave from the transmitting apparatus 100. When the television receiver 200 has a decoding capability to process a moving-image data item at the normal frame rate (60 Hz), the television receiver 200 processes only the base stream contained in the transport stream TS so as to generate the moving-image data item at the normal frame rate, and reproduces its images.

Meanwhile, when the television receiver 200 has a decoding capability to process the moving-image data item at the high frame rate (120 Hz), the television receiver 200 processes both the base stream and the enhanced stream contained in the transport stream TS so as to generate the moving-image data item at the high frame rate, and reproduces its images. The television receiver 200 acquires the information items of the blending rates and the range information item of each of the image data items, which are inserted into the layer of the video (video stream) and/or the layer of the container, and executes an unblending process (reverse blending process) with use of these information items.

In this case, the television receiver 200 executes a decoding process on the base stream so as to generate the image data items of the frames corresponding to the normal frame rate, and executes a decoding process on the enhanced stream so as to generate the image data items of the enhanced frames corresponding to the high frame rate. Then, the television receiver 200 executes the unblending process (reverse blending process) based on the information items of the blending rates (coefficient sets) with use of the image data items of the frames corresponding to the normal frame rate and use of the image data items of the enhanced frames corresponding to the high frame rate. In this way, a moving-image data item at a frame rate as high as that before the blending process is obtained.

Figure 4:
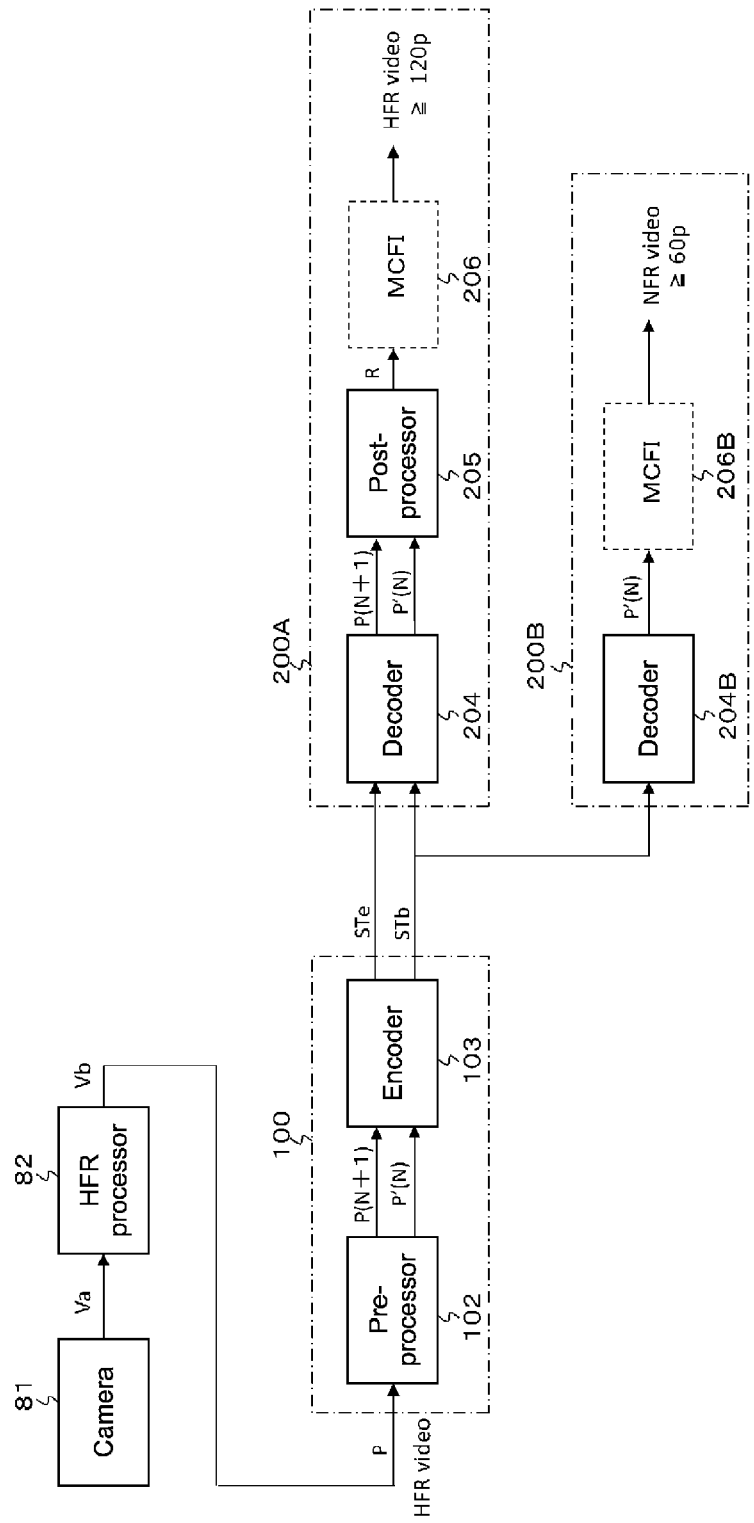
FIG. 4 is a schematic diagram showing processes in a transmitting apparatus and television receivers.

FIG. 4 schematically shows processes by the transmitting apparatus 100 and the television receivers 200 (200A and 200B). Note that image sequences P'(N) and P(N+1) of output from a pre-processor 102 of the transmitting apparatus 100, and image sequences P'(N) and P(N+1) of output from decoders 204 and 204B of the television receivers 200A and 200B, which are the same as each other in time series, may be different from each other in image quality due to processes based on codecs. A moving-image data item Va at a higher frame rate, which is output from a camera (imaging apparatus) 81, is transmitted to an HFR processor 82. With this, a moving-image data item Vb at the high frame rate (120 Hz) is obtained. This moving-image data item Vb is input as a moving-image data item P to the transmitting apparatus 100.

In the transmitting apparatus 100, the pre-processor 102 executes the blending process on image data items of frames of the moving-image data item P. With this, image data items P'(N) of the frames corresponding to the normal frame rate, and image data items P(N+1) of the enhanced frames corresponding to the high frame rate are obtained. Note that, in this embodiment, the image data items P(N+1) are not subjected to the blending with image data items of peripheral frames.

In the transmitting apparatus 100, an encoder 103 executes the encoding process on the image data items P'(N) and P(N+1). With this, a base stream STb and an enhanced stream STe are obtained. These streams STb and STe are transmitted from the transmitting apparatus 100 to the television receiver 200. Note that the information items of the blending rates of the frames and the range information items of the image data items of the frames are associated respectively with the image data items of the frames, and are inserted into these streams STb and STe.

In the television receiver 200A being compatible with the high frame rate, that is, having the decoding capability to process the moving-image data item at the high frame rate, the decoder 204 executes the decoding process on the two streams STb and STe. With this, the image data items P'(N) of the frames corresponding to the normal frame rate, and the image data items P(N+1) of the enhanced frames corresponding to the high frame rate are obtained.

Further, in the television receiver 200A, a post-processor 205 executes the unblending process (reverse blending process) on the image information items P'(N) and P(N+1) on the basis of the information items of the blending rates of the frames and the range information item of each of the image data items. With this, a moving-image data item R at the high frame rate (120 Hz) as high as that of the moving-image data item P on a transmitting side. This moving-image data item R is used as it is as a displaying moving-image data item, or converted to the same by being increased in frame rate through frame interpolation in a motion-compensated frame interpolation (MCFI) unit 206.

Meanwhile, in the television receiver 200B being compatible with the normal frame rate, that is, having the decoding capability to process the moving-image data item at the normal frame rate, the decoder 204B executes the decoding process on the stream STb. With this, the image data items P'(N) of the frames corresponding to the normal frame rate are obtained. Then, in the television receiver 200B, a moving-image data item including the image data items P'(N) of the frames corresponding to the normal frame rate is used as it is as a displaying moving-image data item, or converted to the same by being increased in frame rate through frame interpolation in a motion-compensated frame interpolation (MCFI) unit 206B.

Figure 5:
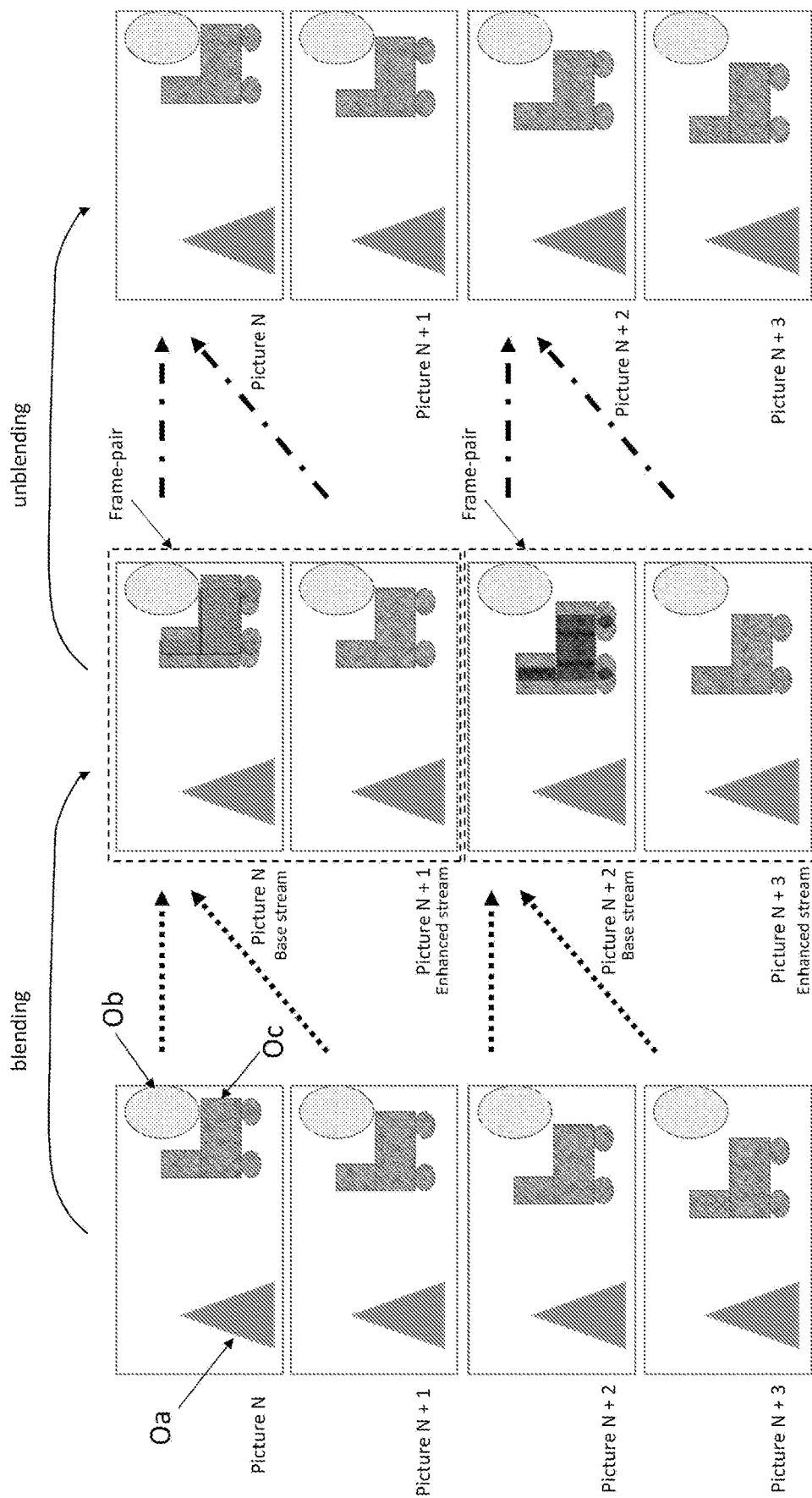
FIG. 5 is a schematic illustration of an example of blending on a transmitting side and unblending (reverse blending) on a receiving side.

FIG. 5 schematically illustrates an example of the blending on the transmitting side and the unblending on the receiving side. This example corresponds to the example in (a) of FIG. 2, specifically, a picture "N" and a picture "N+1" form a frame pair, and a picture "N+2" and a picture "N+3" form another frame pair. Note that, in the illustrated example, objects Oa and Ob are static objects, and an object Oc is a moving object.

In each of the frame pairs, by the blending process on the transmitting side, an image data item of a first frame, specifically, an image data item of a frame of the base stream is blended with an image data item of the enhanced frame (blended state), and this image data item of this frame subsequent thereto of the enhanced stream is not blended with the image data item of the base frame (unblended state). Further, the blended state is canceled by the unblending process (reverse blending process) on the receiving side.

Figure 6:
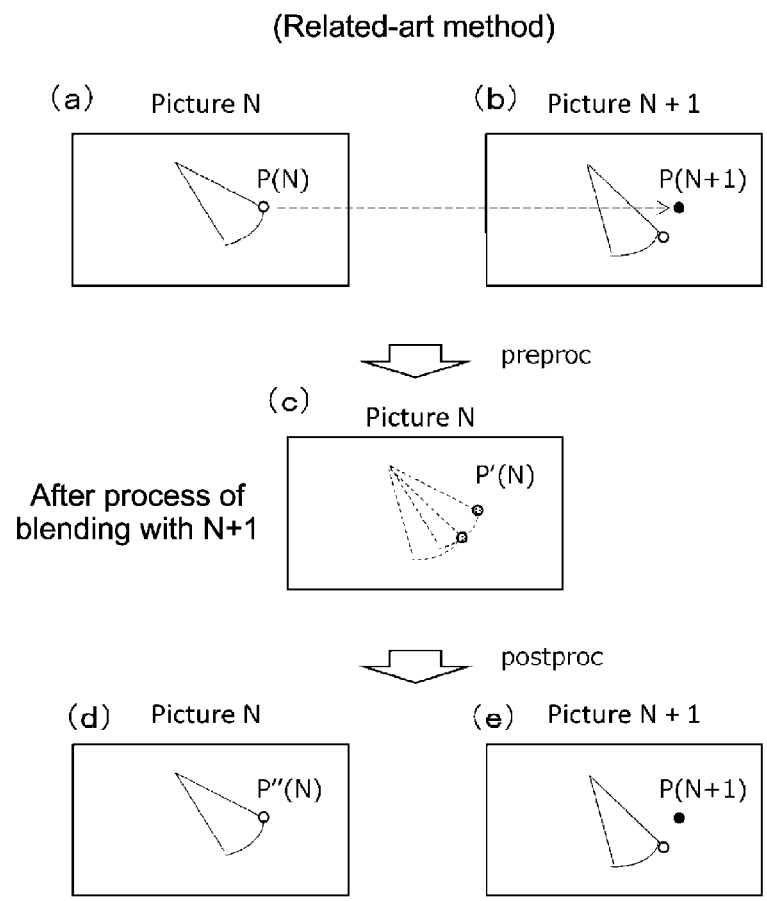
FIG. 6 is schematic illustrations of processes by a pre-processor and a post-processor in a case where a related-art method is employed as a method of determining blending rates.

FIG. 6 schematically illustrates processes by the pre-processor 102 and the post-processor 205 in a case where a related-art method is employed as the method of determining the blending rates. (A) of FIG. 6 illustrates an image of the picture "N" before the blending process in the pre-processor 102. (B) of FIG. 6 illustrates an image of the picture "N+1" before the blending process in the pre-processor 102. (C) of FIG. 6 illustrates an image of the picture "N" after the blending process in the pre-processor 102.

A point P(N) in the image of the picture "N" is subjected to the following blending process of Type0 with a point P(N+1) at the same position coordinates in the picture "N+1." A value of P'(N) is obtained by calculation of an arithmetic mean (weight is ignored) of P(N) and P(N+1). When a luminance of the point P(N) is high and a luminance of the point P(N+1) is not high, a luminance level of P'(N) as a result of the blending, that is, as the arithmetic mean, decreases. On the television receiver 200B that is incompatible with the high frame rate, the image obtained as a result of the blending is displayed. Thus, an image to be displayed thereon does not have brightness quality.

(Type0 Blending Process)

$$P'(N) = (a/k)*P(N) + (b/k)*P(N+1) \quad (a+b=k)$$

(D) of FIG. 6 illustrates an image of the picture "N" after the unblending process is executed in the post-processor 205, and (e) of FIG. 6 illustrates an image of the picture "N+1" that is used in the post-processor 205. In the television receiver 200A compatible with the high frame rate, the post-processor 205 executes the following unblending process of Type0. With this, a value of P"(N) is obtained. In this way, in the television receiver 200A compatible with the high frame rate, the brightness quality is restored by the unblending process.

(Type0 Unblending Process)

$$P''(N) = k/a*P'(N) - b/a*P(N+1) \quad (a+b=k)$$

Figure 7:
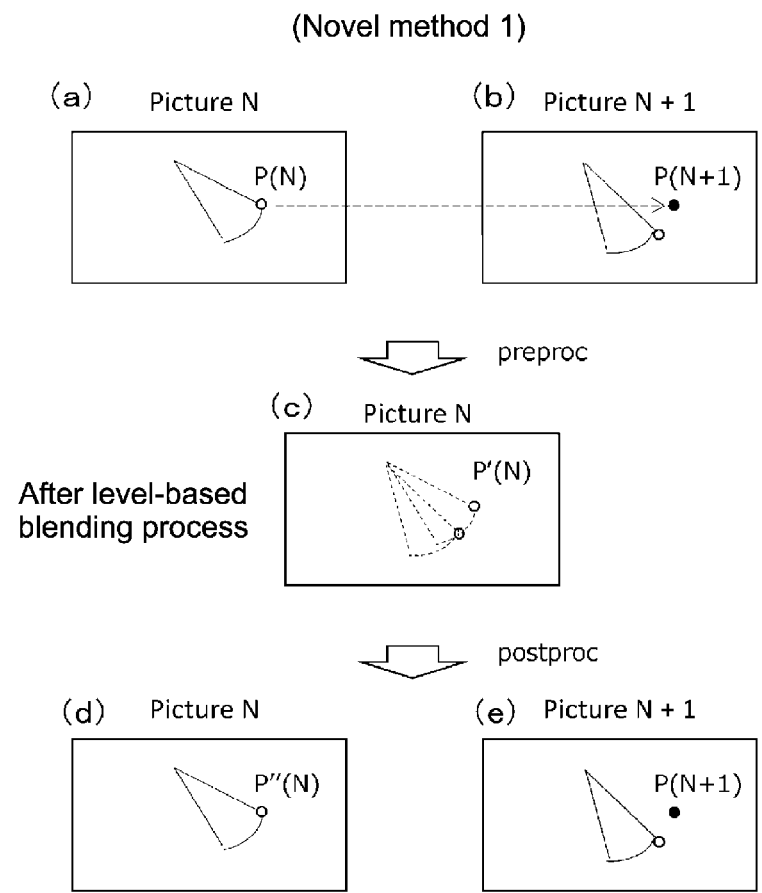
FIG. 7 is schematic illustrations of processes by the pre-processor and the post-processor in a case where a novel method 1 is employed as the method of determining the blending rates.

FIG. 7 schematically illustrates processes by the pre-processor 102 and the post-processor 205 in a case where the novel method 1 is employed as the method of determining the blending rates. (A) of FIG. 7 illustrates an image of the picture "N" before the blending process in the pre-processor 102. (B) of FIG. 7 illustrates an image of the picture "N+1" before the blending process in the pre-processor 102. (C) of FIG. 7 illustrates an image of the picture "N" after the blending process in the pre-processor 102.

At the time of blending the point P(N) in the picture "N" with the point P(N+1) at the same position coordinates in the picture "N+1," pixels are blended while maintaining important quality of luminance and chromaticity. Ranges of levels of pixel values to be maintained are set as the special-blending-process target ranges, and special blending is performed with respect to pixels within these ranges. In other words, the blending is performed at blending rates different from those in the normal blending process "Type0 blending process," or the blending itself need not necessarily be performed.

When a pixel value of the point P(N) in the image of the picture "N" is out of either one of the special-blending-process target ranges, the point P(N) in the image of the picture "N" is subjected to the following blending process of Type0 (normal blending process) so as to be blended with the point P(N+1) at the same position coordinates in the picture "N+1." The value of P'(N) is obtained by the calculation of the arithmetic mean (weight is ignored) between P(N) and P(N+1).

(Type0 Blending Process)

$$P'(N)=(a/k)*P(N)+(b/k)*P(N+1)\ (a+b=k)$$

Meanwhile, when the pixel value of the point P(N) in the image of the picture "N" is within one of the special-blending-process target ranges, the point P(N) in the image of the picture "N" is subjected to the following blending process of Type1 (special blending process) so as to be blended with the point P(N+1) at the same position coordinates in the picture "N+1." The value of P'(N) is obtained by the calculation of the arithmetic mean (weight is ignored) between P(N) and P(N+1). With this, an effect of the blending can be obtained in a normal luminance/chromaticity range, and reception and reproduction can be performed without impairing sharpness in bright parts and dark parts.

(Type1 Blending Process)

$$P'(N)=(c/m)*P(N)+(d/m)*P(N+1)\ (c+d=m)$$

$$P'(N)=P(N)\ \text{(in a case where } c=m \text{ is satisfied)}$$

(D) of FIG. 7 illustrates an image of the picture "N" after the unblending process in the post-processor 205, and (e) of FIG. 7 illustrates an image of the picture "N+1" that is used in the post-processor 205.

In the television receiver 200A compatible with the high frame rate, when a pixel value of the point P'(N) is out of either one of the special-blending-process target ranges, or when the pixel value of the point P'(N) is within one of the special-blending-process target ranges, and at the same time, when a pixel value of the point P(N+1) is within one of the special-blending-process target ranges, the post-processor 205 executes the following unblending process of Type0. With this, the value of P''(N) is obtained.

(Type0 Unblending Process)

$$P''(N)=k/a*P'(N)-b/a*P(N+1)\ (a+b=k)$$

Meanwhile, in the television receiver 200A compatible with the high frame rate, when the pixel value of the point P'(N) is within one of the special-blending-process target ranges, and at the same time, when the pixel value of the point P(N+1) is out of either one of the special-blending-process target ranges, the post-processor 205 executes the following unblending process of Type1. With this, the value of P''(N) is obtained.

(Type1 Unblending Process)

$$P''(N)=m/c*P'(N)-d/c*P(N+1)\ (c+d=m)$$

$$P''(N)=P'(N)\ \text{(in the case where } c=m \text{ is satisfied)}$$

FIG. 8 shows a determination logic of the blending process in the pre-processor 102 and in the unblending process (reverse blending process) in the post-processor 205 in the case where the novel method 1 is employed as the method of determining the blending rates as described above.

In FIG. 8, "range_high" indicates the level value "Range_limit_high_value" being the threshold for determining whether or not the levels of the image data items are within the range of the brightness reproduction levels as the special-blending-process target range. Further, "range_low" indicates the level value "Range_limit_low_value" being the threshold for determining whether or not the levels of the image data items are within the range of the dark-part reproduction levels as the other special-blending-process target range (refer to FIG. 3).

In the blending process in the pre-processor 102, when P(N) satisfies "(P(N)>range_high) or (P(N)<range_low)," it is determined that the "Type1_blending process (Type1_blending( ))" is executed. A processing result P'(N) in this case is within one of the special-blending-process target ranges. Further, in another case, in the blending process in the pre-processor 102, it is determined that the "Type0 blending process (Type0_blending( ))" is executed. Whether or not processing results P'(N) in these cases are within a normal-blending-process target range depends on P(N+1).

Further, in the unblending process in the post-processor 205, in a case where P'(N) satisfies "(P'(N)>range_high)," when P(N+1) satisfies "(P(N+1)=<range_high)," it is determined that the "Type1 unblending process (Type1_reverse_blending( ))" is executed. In another case, it is determined that the "Type0 unblending process (Type0_reverse_blending( ))" is executed.

Still further, in the unblending process in the post-processor 205, in a case where P'(N) satisfies "(P'(N)< range_low)," when P(N+1) satisfies "(P(N+1)>= range_low)," it is determined that the "Type1 unblending process (Type1_reverse_blending( ))" is executed. In another case, it is determined that the "Type0 unblending process (Type0_reverse_blending( ))" is executed.

Yet further, in the unblending process in the post-processor 205, in still another case, it is determined that the "Type0 unblending process (Type0_reverse_blending( ))" is executed.

Figure 9:
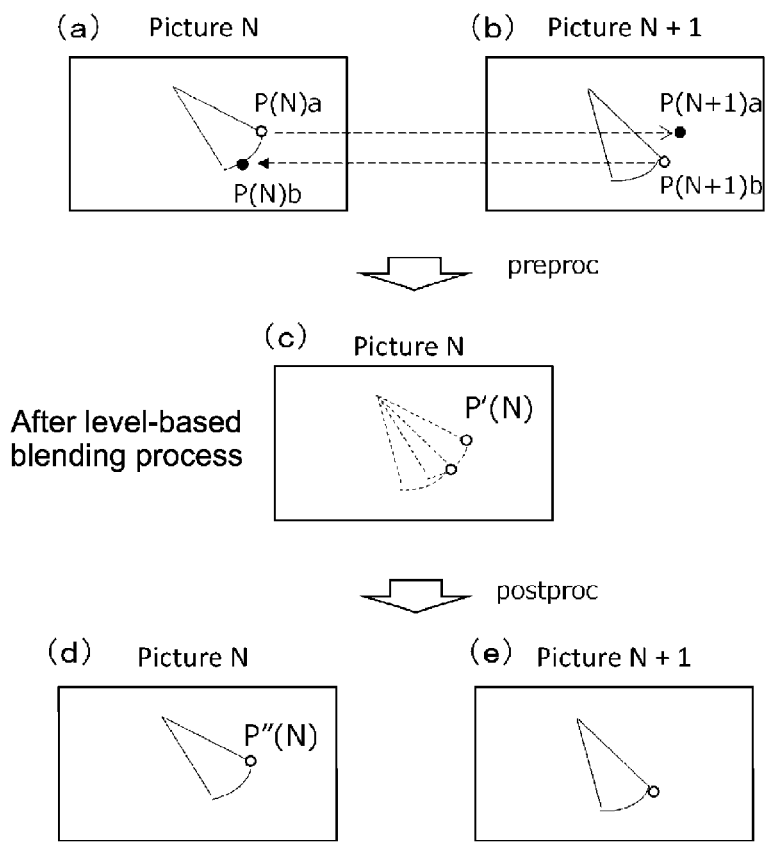
FIG. 9 is schematic illustrations of processes by the pre-processor and the post-processor in a case where a novel method 2 is employed as the method of determining the blending rates.

FIG. 9 schematically illustrates processes by the pre-processor 102 and the post-processor 205 in a case where the novel method 2 is employed as the method of determining the blending rates. (A) of FIG. 9 illustrates an image of the picture "N" before the blending process in the pre-processor 102. (B) of FIG. 9 illustrates an image of the picture "N+1" before the blending process in the pre-processor 102. (C) of FIG. 9 illustrates an image of the picture "N" after the blending process in the pre-processor 102.

At the time of blending the point P(N) in the picture "N" with the point P(N+1) at the same position coordinates in the picture "N+1," the pixels are blended while maintaining the important quality of luminance and chromaticity. The ranges of the levels of the pixel values to be maintained are set as the special-blending-process target ranges, and the special blending is performed with respect to the pixels within these ranges. In other words, the blending is performed at blending rates different from those in the normal blending process "Type0 blending process," or the blending itself need not necessarily be performed.

When the pixel value of the point P(N) in the image of the picture "N" is out of either one of the special-blending-process target ranges, and at the same time, when the pixel value of the point P(N+1) in the image of the picture "N+1" is out of either one of the special-blending-process target ranges, the point P(N) in the image of the picture "N" is subjected to the following blending process of Type0 (normal blending process) so as to be blended with the point P(N+1) at the same position coordinates in the picture "N+1." The value of P'(N) is obtained by the calculation of the arithmetic mean (weight is ignored) between P(N) and P(N+1).

(Type0 Blending Process)

$$P'(N)=(a/k)*P(N)+(b/k)*P(N+1)\ (a+b=k)$$

Meanwhile, when the pixel value of the point P(N) in the image of the picture "N" is within one of the special-blending-process target ranges, a point P(N)a in the image of the picture "N" is subjected to the following blending process of Type1 (special blending process) so as to be blended with a point P(N+1)a at the same position coordinates in the picture "N+1." The value of P'(N) is obtained by the calculation of the arithmetic mean (weight is ignored) between P(N)a and P(N+1)a.

(Type1 Blending Process)

$$P'(N)=(c/m)*P(N)+(d/m)*P(N+1)\ (c+d=m)$$

$$P'(N)=P(N)\ (\text{in the case where } c=m \text{ is satisfied})$$

Further, when the pixel value of the point P(N) in the image of the picture "N" is out of either one of the special-blending-process target ranges, and at the same time, when the pixel value of the point P(N+1) in the image of the picture "N+1" is within one of the special-blending-process target ranges, a point P(N)b in the image of the picture "N" is subjected to the following blending process of Type2 (special blending process) so as to be blended with a point P(N+1)b at the same position coordinates in the picture "N+1." The value of P'(N) is obtained by the calculation of the arithmetic mean (weight is ignored) between P(N)b and P(N+1)b. With this, reception and reproduction can be performed while obtaining the effect of the blending in the normal luminance/chromaticity range, and without impairing sharpness in bright parts and dark parts.

(Type2 Blending Process)

$$P'(N)=(e/s)*P(N)+(f/s)*P(N+1)\ (e<f \text{ and } e+f=s)$$

(D) of FIG. 9 illustrates an image of the picture "N" after the unblending process in the post-processor 205, and (e) of FIG. 9 illustrates an image of the picture "N+1" that is used in the post-processor 205.

In the television receiver 200A compatible with the high frame rate, when the pixel value of the point P'(N) is out of either one of the special-blending-process target ranges, the post-processor 205 executes the following unblending process of Type0. With this, the value of P"(N) is obtained.

(Type0 Unblending Process)

$$P''(N)=k/a*P'(N)-b/a*P(N+1)\ (a+b=k)$$

Meanwhile, in the television receiver 200A compatible with the high frame rate, when the pixel value of the point P'(N) is within one of the special-blending-process target ranges, and at the same time, when the pixel value of the point P(N+1) is out of either one of the special-blending-process target ranges, the post-processor 205 executes the following unblending process of Type1. With this, the value of P"(N) is obtained.

(Type1 Unblending Process)

$$P''(N)=m/c*P'(N)-d/c*P(N+1)\ (c+d=m)$$

$$P''(N)=P'(N)\ (\text{in the case where } c=m \text{ is satisfied})$$

Further, in the television receiver 200A compatible with the high frame rate, when the pixel value of the point P'(N) is within one of the special-blending-process target ranges, and at the same time, when the pixel value of the point P(N+1) is within one of the special-blending-process target ranges, the post-processor 205 executes the following unblending process of Type2. With this, the value of P"(N) is obtained.

(Type2 Unblending Process)

$$P''(N)=s/e*P'(N)-f/e*P(N+1)\ (e+f=s)$$

FIG. 10 shows another determination logic of the blending process in the pre-processor 102 and in the unblending process (reverse blending process) in the post-processor 205 in the case where the novel method 2 is employed as the method of determining the blending rates as described above.

In FIG. 10, "range_high" indicates the level value "Range_limit_high_value" being the threshold for determining whether or not the levels of the image data items are within the range of the brightness reproduction levels as the special-blending-process target range. Further, "range_low" indicates the level value "Range_limit_low_value" being the threshold for determining whether or not the levels of the image data items are within the range of the dark-part reproduction levels as the other special-blending-process target range (refer to FIG. 3).

In the blending process in the pre-processor 102, when P(N) satisfies "(P(N)>range_high) or (P(N)<range_low)," it is determined that the "Type1 blending process (Type1_blending( ))" is executed. A processing result P'(N) in this case is within one of the special-blending-process target ranges. Further, in the blending process in the pre-processor 102, when P(N) satisfies "range_low=< P(N)=<range_high," and at the same time, when P(N+1) satisfies "(P(N+1)>range_high) or (P(N+1)<range_low)," it is determined that the "Type2 blending process (Type2_blending( ))" is executed. A processing result P'(N) in this case is within one of the special-blending-process target ranges. Further, in another case, it is determined that the "Type0 (Type0_blending( ))" is executed. The processing result P'(N) in this case is within the normal-blending-process target range.

Further, in the unblending process in the post-processor 205, when P'(N) satisfies "(P'(N)>range_high)," and at the same time, when P(N+1) satisfies "(P(N+1)>range_high)," it is determined that the "Type2 unblending process (Type2_reverse_blending( ))" is executed. When P'(N) satisfies "(P'(N)>range_high)," and at the same time, when P(N+1) does not satisfy "(P(N+1)>range_high)," it is determined that the "Type1 unblending process (Type1_reverse_blending( ))" is executed.

Still further, in the unblending process in the post-processor 205, when P'(N) satisfies "(P'(N)<range_low)," and at the same time, when P(N+1) satisfies "(P(N+1)< range_low)," it is determined that the "Type2 unblending process (Type2_reverse_blending( ))" is executed. When P'(N) satisfies "(P'(N)<range_low)," and at the same time, when P(N+1) does not satisfy "(P(N+1)<range_low)," it is determined that the "Type1 unblending process (Type1_reverse_blending( ))" is executed.

Yet further, in the unblending process in the post-processor 205, in another case, it is determined that the "Type0 unblending process (Type0_reverse_blending( ))" is executed.

"Configuration of Transmitting Apparatus"

Figure 11:
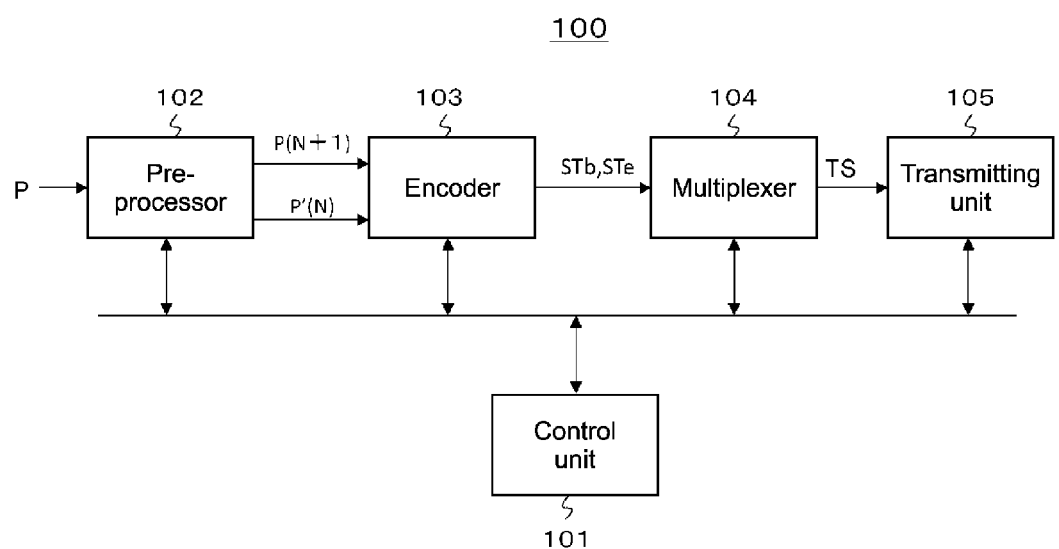
FIG. 11 is a block diagram showing a configuration example of the transmitting apparatus.

FIG. 11 shows a configuration example of the transmitting apparatus 100. This transmitting apparatus 100 includes a control unit 101, the pre-processor 102, the encoder 103, a multiplexer 104, and a transmitting unit 105. The control unit 101 controls operations of the units in the transmitting apparatus 100.

The pre-processor 102 receives the moving-image data item P at the high frame rate (120 Hz), and outputs the image data items P'(N) of the frames corresponding to the normal frame rate (60 Hz), and the image data items P(N+1) of the enhanced frames corresponding to the high frame rate.

Note that the pre-processor 102 generates the moving-image data item after the blending process by executing the process of blending, at the per-frame blending rates based on data levels, the image data items of the peripheral frames of the high-frame-rate moving-image data item P before the blending process with the image data items of the processing-target frames of the high-frame-rate moving-image data item P before the blending process. In this moving-image data item, the image data items P'(N) correspond to the image data items of the frames corresponding to the normal frame rate (60 Hz), and the image data items P(N+1) correspond to the image data items of the rest of the frames. In this case, at least the image data items P'(N) are blended with the image data items of the peripheral frames.

Figure 12:
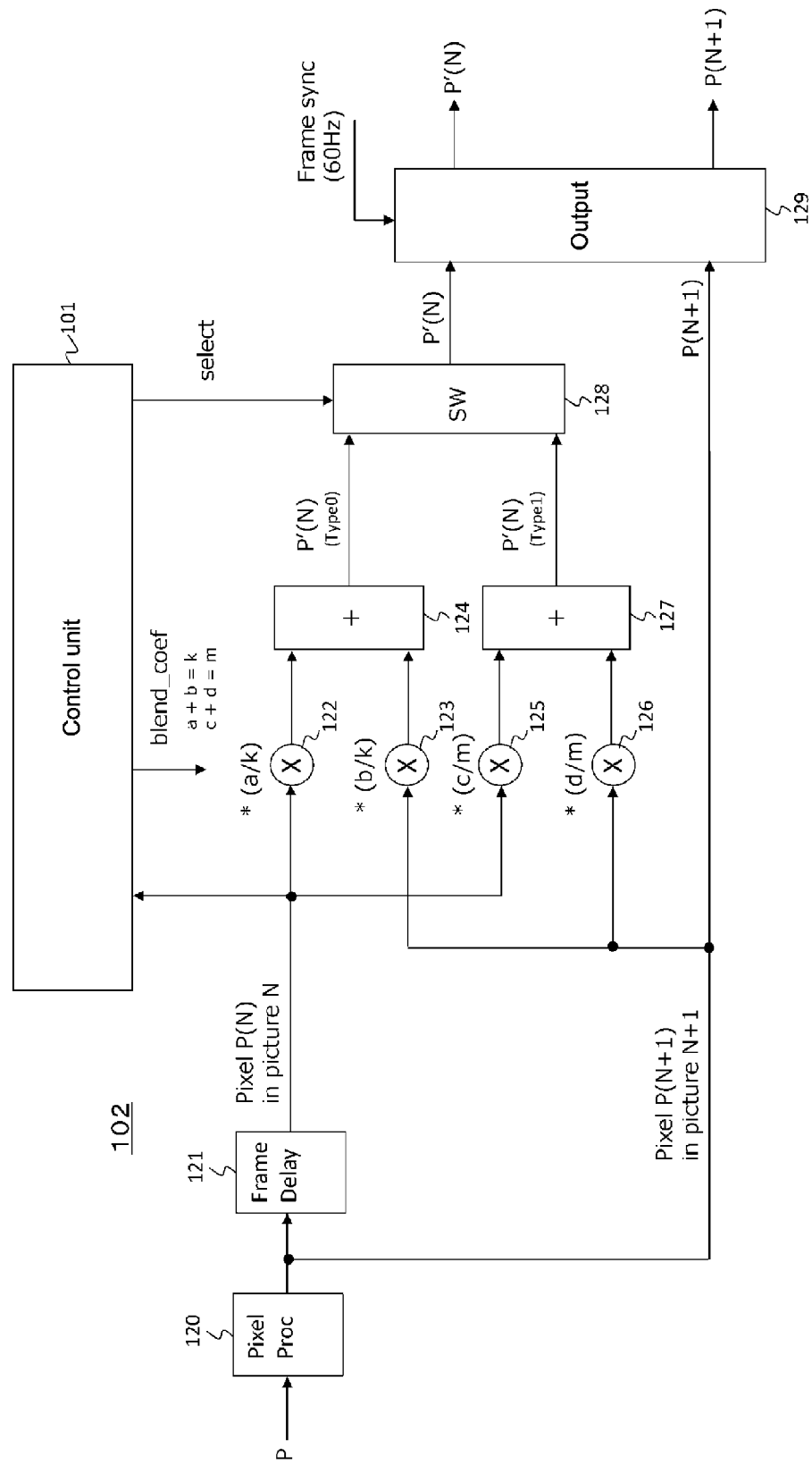
FIG. 12 is a block diagram showing a configuration example of the pre-processor in the case where the novel method 1 is employed as the method of determining the blending rates.

FIG. 12 shows a configuration example of the pre-processor 102. This example is a configuration example in the case where the novel method 1 is employed as the method of determining the blending rates. This pre-processor 102 includes a pixel processing unit 120, a frame delay unit 121, coefficient multipliers 122, 123, 125, and 126, adding units 124 and 127, a switching unit 128, and an output unit 129.

The pixel processing unit 120 adjusts values of image data items P(N) and P(N+1) of each of the frames of the moving-image data item P such that the process of determining whether or not the pixel values are within one of the special-blending-process target ranges on the basis of the level values "Range_limit_high_value" and "Range_limit_low_value" can be appropriately executed.

FIG. 13 shows an example of an upper-limit-value table that is used in the pixel processing unit 120. FIG. 14 shows an example of a lower-limit-value table that is used in the pixel processing unit 120. These examples are described by way of an example in which the image data items are each a ten-bit data item, a lower-limit value is set to 64, and an upper-limit value is set to 940.

First, the example of the upper-limit-value table shown in FIG. 13 is described. This table example is an example in a case where "range_limit_high_value" is set to 700. Values 701 to 705 are changed to a value 705, and values 706 to 940 remain unchanged. Similarly, values 698 to 700 are changed to a value 698, and values 64 to 697 remain unchanged.

In this case, when the value of P(N) is 705 or more, it is determined that the value of P(N) is within one of the special-blending-process target ranges, and the pre-processor 102 executes the "Type1 blending process." In this case, the value of P(N+1) is 64 or more, and hence, as expressed by the following equation (1), when a blending rate of P(N) and P(N+1) is set to, for example, 255:1, a minimum value of the value of P'(N) is calculated as 702.

$$P'(N)=(705*255+64*1)/256=702 \qquad (1)$$

Thus, also on the post-processor 205 side, on the basis of the value of P'(N), it can be similarly determined that the value of P'(N) is within one of the special-blending-process target ranges. With this, the unblending process (reverse blending process) can be appropriately executed. Note that, although not described in detail, even in cases where the "range_limit_high_value" is set to values other than 700, the same advantage can be obtained by adjusting the values of the image data items P(N) and P(N+1).

Next, the example of the lower-limit-value table shown in FIG. 14 is described. This table example is an example in a case where "range_limit_low_value" is set to 100. Values 96 to 99 are changed to a value 96, and values 64 to 95 remain unchanged. Similarly, values 100 to 102 are changed to a value 102, and values 103 to 940 remain unchanged.

In this case, when the value of P(N) is 96 or less, it is determined that the value of P(N) is within another one of the special-blending-process target ranges, and the pre-processor 102 executes the "Type1 blending process." In this case, the value of P(N+1) is 940 or less, and hence, as expressed by the following equation (2), when the blending rate of P(N) and P(N+1) is set to, for example, 255:1, a maximum value of the value of P'(N) is calculated as 99.

$$P'(N)=(96*255+940*1)/256=99 \qquad (2)$$

Thus, also on the post-processor 205 side, on the basis of the value of P'(N), it can be similarly determined that the value of P'(N) is within the other one of the special-blending-process target ranges. With this, the unblending process (reverse blending process) can be appropriately executed. Note that, although not described in detail, even in cases where the "range_limit_low_value" is set to values other than 100, the same advantage can be obtained by adjusting the values of the image data items P(N) and P(N+1).

Note that the upper-limit-value table and the lower-limit-value table, which are set separately from each other in the above description, may be set as a single table.

Referring back to FIG. 12, the frame delay unit 121 receives the image data items P(N) and P(N+1) that are adjusted in value in the pixel processing unit 120, and gives a delay of one frame at 120 Hz. With this, when the frame delay unit 121 outputs the image data item P(N) of the picture "N," the pixel processing unit 120 has output the image data item P(N+1) of the picture "N+1."

The image data item P(N) that is obtained from the frame delay unit 121 is input to the coefficient multiplier 122 and the coefficient multiplier 125. Further, the image data item P(N+1) that is obtained from the pixel processing unit 120 is input to the coefficient multiplier 123 and the coefficient multiplier 126.

The coefficient multiplier 122 has a coefficient (a/k) set by the control unit 101, and the image data item P(N) is multiplied by this coefficient. Further, the coefficient multiplier 123 has a coefficient (b/k) set by the control unit 101, and the image data item P(N+1) is multiplied by this coefficient. Output values from the coefficient multipliers 122 and 123 are added to each other by the adding unit 124. Note that the coefficient multipliers 122 and 123 and the adding unit 124 serve as a filter that executes the "Type0 blending process," and the image data item P'(N) generated by the "Type0 blending process" is obtained from the adding unit 124.

Further, the coefficient multiplier 125 has a coefficient (c/m) set by the control unit 101, and the image data item P(N) is multiplied by this coefficient. Still further, the coefficient multiplier 126 has a coefficient (d/m) set by the control unit 101, and the image data item P(N+1) is multiplied by this coefficient. Output values from the coefficient multipliers 125 and 126 are added to each other by the adding unit 127. Note that the coefficient multipliers 125 and 126 and the adding unit 127 serve as a filter that executes the "Type1 blending process," and the image data item P'(N) generated by the "Type1 blending process" is obtained from the adding unit 127.

The image data items P'(N) obtained in the adding units 124 and 127 are input to the switching unit 128. In response to selection signals from the control unit 101 and on the pixel-by-pixel basis, the switching unit 128 selectively outputs the image data item P'(N) obtained by the "Type0 blending process" from the adding unit 124, or the image data item P'(N) obtained by the "Type1 blending process" from the adding unit 127.

On the basis of the image data item P(N) obtained from the frame delay unit 121 and the preset level values "range_limit_high_value" and "range_limit_low_value," the control unit 101 generates the selection signals on the pixel-by-pixel basis, and transmits these signals to the switching unit 128.

Figure 15:
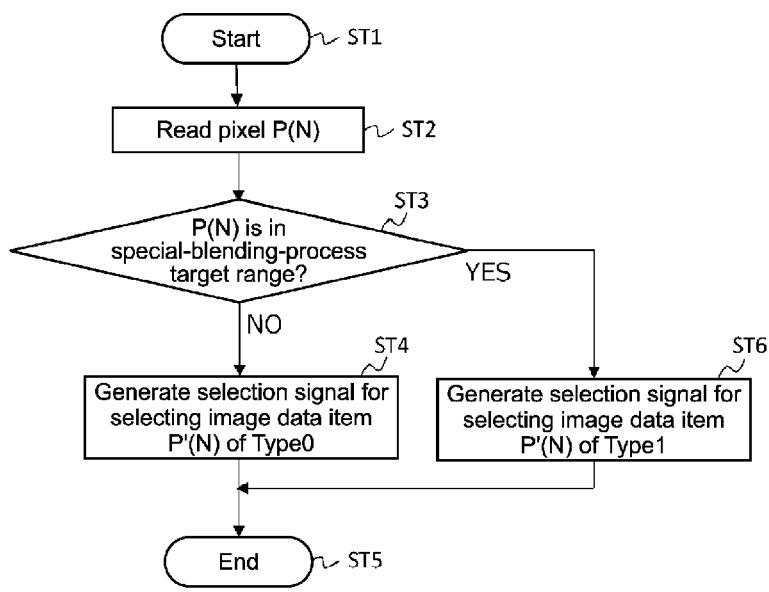
FIG. 15 is a flowchart showing an example of a procedure for generating selection signals on a pixel-by-pixel basis in a control unit.

FIG. 15 is a flowchart showing an example of a procedure for generating the selection signals on the pixel-by-pixel basis in the control unit 101. First, in Step ST1, the control unit 101 starts the procedure. Then, in Step ST2, the control unit 101 reads a pixel P(N). Next, in Step ST3, the control unit 101 determines whether or not the pixel P(N) is within the special-blending-process target range "(P(N)>range_high) or (P(N)<range_low)."

When the control unit 101 determines that the pixel P(N) is out of either one of the special-blending-process target ranges and within the normal-blending-process target range, in Step ST4, the control unit 101 generates a selection signal for selecting the image data item P'(N) obtained by the "Type0 blending process." Then, in Step ST5, the control unit 101 terminates the procedure. Meanwhile, when the control unit 101 determines that the pixel P(N) is within one of the special-blending-process target ranges, in Step ST6, the control unit 101 generates a selection signal for selecting the image data item P'(N) obtained by the "Type1 blending process." Then, in Step ST5, the control unit 101 terminates the procedure.

Referring back to FIG. 12, the image data item P'(N) obtained in the switching unit 128 and the image data item P(N+1) obtained in the pixel processing unit 120 are input to the output unit 129. A frame synchronization signal at 60 Hz is supplied to this output unit 129. In synchronization with this frame synchronization signal and at the frame rate of 60 Hz, the output unit 129 outputs the image data item P'(N) of each of the frames corresponding to the normal frame rate, and the image data item P(N+1) of each of the enhanced frames corresponding to the high frame rate.

Figure 16:
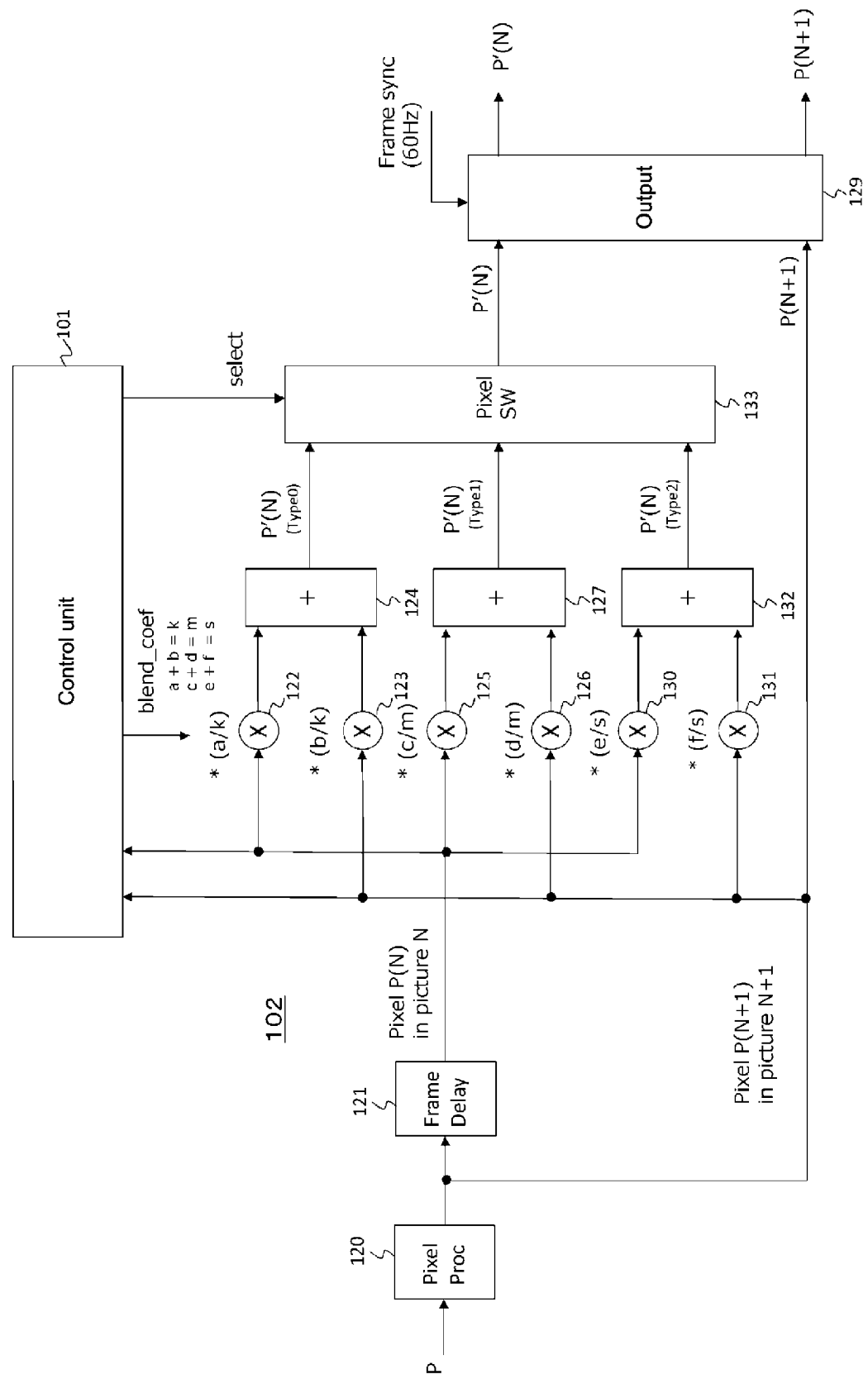
FIG. 16 is a block diagram showing another configuration example of the pre-processor in the case where the novel method 2 is employed as the method of determining the blending rates.

FIG. 16 shows another configuration example of the pre-processor 102. This example is a configuration example in the case where the novel method 2 is employed as the method of determining the blending rates. In FIG. 16, the parts corresponding to those in FIG. 12 are denoted by the same reference symbols, and detailed description thereof is omitted as appropriate. This pre-processor 102 includes the pixel processing unit 120, the frame delay unit 121, the coefficient multipliers 122, 123, 125, and 126, coefficient multipliers 130 and 131, the adding units 124 and 127, an adding unit 132, a switching unit 133, and the output unit 129.

The image data item P(N) that is obtained from the frame delay unit 121 is input to the coefficient multiplier 122, the coefficient multiplier 125, and the coefficient multiplier 130. Further, the image data item P(N+1) that is obtained from the pixel processing unit 120 is input to the coefficient multiplier 123, the coefficient multiplier 126, and the coefficient multiplier 131.

The coefficient multiplier 122 has the coefficient (a/k) set by the control unit 101, and the image data item P(N) is multiplied by this coefficient. Further, the coefficient multiplier 123 has the coefficient (b/k) set by the control unit 101, and the image data item P(N+1) is multiplied by this coefficient. The output values from the coefficient multipliers 122 and 123 are added to each other by the adding unit 124. Note that the coefficient multipliers 122 and 123 and the adding unit 124 serve as the filter that executes the "Type0 blending process," and the image data item P'(N) generated by the "Type0 blending process" is obtained from the adding unit 124.

Further, the coefficient multiplier 125 has the coefficient (c/m) set by the control unit 101, and the image data item P(N) is multiplied by this coefficient. Still further, the coefficient multiplier 126 has the coefficient (d/m) set by the control unit 101, and the image data item P(N+1) is multiplied by this coefficient. The output values from the coefficient multipliers 125 and 126 are added to each other by the adding unit 127. Note that the coefficient multipliers 125 and 126 and the adding unit 127 serve as the filter that executes the "Type1 blending process," and the image data item P'(N) generated by the "Type1 blending process" is obtained from the adding unit 127.

Still further, the coefficient multiplier 130 has a coefficient (e/s) set by the control unit 101, and the image data item P(N) is multiplied by this coefficient. Further, the coefficient multiplier 131 has a coefficient (f/s) set by the control unit 101, and the image data item P(N+1) is multiplied by this coefficient. Output values from the coefficient multipliers 130 and 131 are added to each other by the adding unit 132. Note that the coefficient multipliers 130 and 131 and the adding unit 132 serve as a filter that executes the "Type2 blending process," and the image data item P'(N) generated by the "Type2 blending process" is obtained from the adding unit 132.

The image data items P'(N) obtained in the adding units 124, 127, and 132 are input to the switching unit 133. In response to the selection signals from the control unit 101 and on the pixel-by-pixel basis, the switching unit 133 selectively outputs the image data item P'(N) obtained by the "Type0 blending process" from the adding unit 124, the image data item P'(N) obtained by the "Type1 blending process" from the adding unit 127, or the image data item P'(N) obtained by the "Type2 blending process" from the adding unit 132.

Based on the image data item P(N) obtained from the frame delay unit 121, the image data item P(N+1) obtained from the pixel processing unit 120, and the preset level values "range_limit_high_value" and "range_limit_low_value," the control unit 101 generates the selection signals on the pixel-by-pixel basis, and transmits these signals to the switching unit 133.

Figure 17:
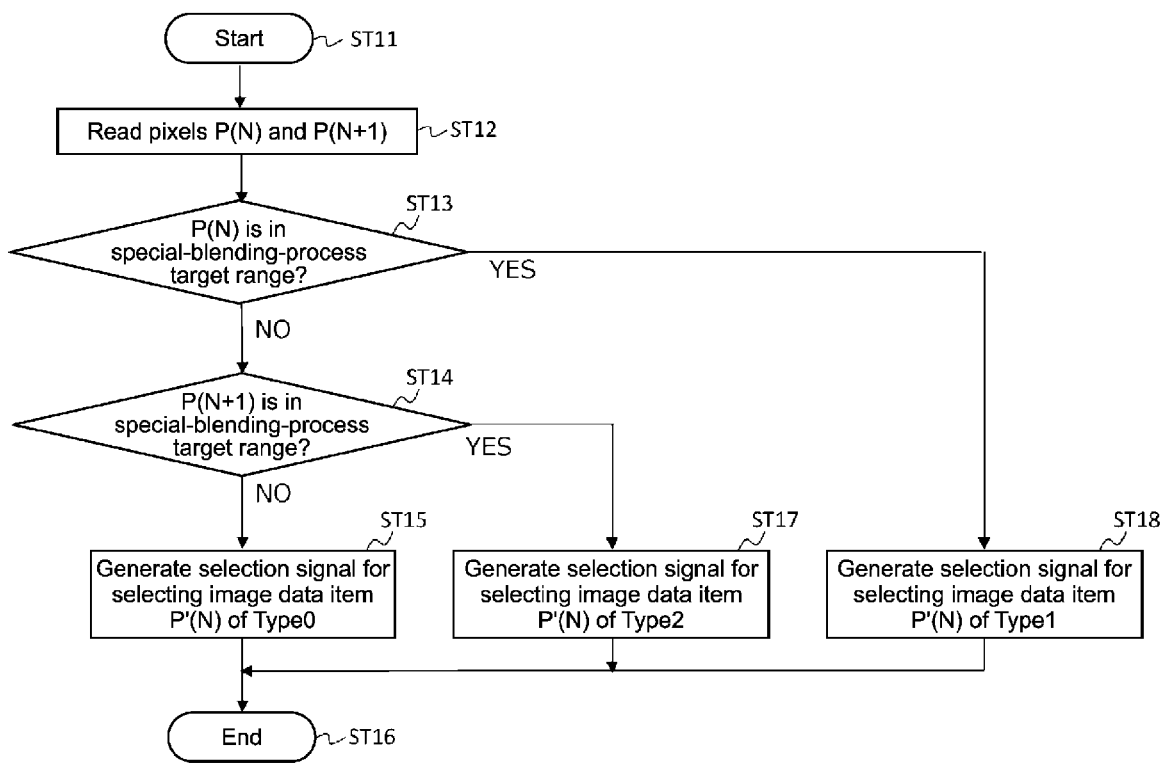
FIG. 17 is a flowchart showing another example of the procedure for generating the selection signals on the pixel-by-pixel basis in the control unit.

FIG. 17 is a flowchart showing another example of the procedure for generating the selection signals on the pixel-by-pixel basis in the control unit 101. First, in Step ST11, the control unit 101 starts the procedure. Then, in Step ST12, the control unit 101 reads the pixel P(N) and a pixel P(N+1). Next, in Step ST13, the control unit 101 determines whether or not the pixel P(N) is within the special-blending-process target range "(P(N)>range_high) or (P(N)<range_low)."

When the control unit 101 determines that the pixel P(N) is out of either one of the special-blending-process target ranges and within the normal-blending-process target range, in Step ST14, the control unit 101 determines whether or not the pixel P(N+1) is within the special-blending-process target range "(P(N+1)>range_high) or (P(N+1)<range_low)."

When the control unit 101 determines that the pixel P(N+1) is out of either one of the special-blending-process target ranges and within the normal-blending-process target range, in Step ST15, the control unit 101 generates the selection signal for selecting the image data item P'(N) obtained by the "Type0 blending process." Then, in Step ST16, the control unit 101 terminates the procedure. Meanwhile, when the control unit 101 determines that the pixel P(N+1) is within one of the special-blending-process target ranges, in Step ST17, the control unit 101 generates a selection signal for selecting the image data item P'(N) obtained by the "Type2 blending process." Then, in Step ST16, the control unit 101 terminates the procedure.

Further, in Step ST13, when the control unit 101 determines that the pixel P(N) is within one of the special-blending-process target ranges, in Step ST18, the control unit 101 generates the selection signal for selecting the image data item P'(N) obtained by the "Type0 blending process." Then, in Step ST16, the control unit 101 terminates the procedure.

Referring back to FIG. 16, the image data item P'(N) obtained in the switching unit 133 and the image data item P(N+1) obtained in the pixel processing unit 120 are input to the output unit 129. The frame synchronization signal at 60 Hz is supplied to this output unit 129. In synchronization with this frame synchronization signal and at the frame rate of 60 Hz, the output unit 129 outputs the image data item P'(N) of each of the frames corresponding to the normal frame rate, and the image data item P(N+1) of each of the enhanced frames corresponding to the high frame rate.

Referring back to FIG. 11, the encoder 103 executes the encoding process on the image data items P'(N) and P(N+1) obtained from the pre-processor 102 so as to generate the base stream STb and the enhanced stream STe. In this case, predictive encoding processes such as H.264/AVC and H.265/HEVC are executed on the image data items P'(N) and P(N+1).

The encoder 103 inserts the information items of the blending rates and the range information item of each of the image data items into the base stream STb and the enhanced stream STe. On the receiving side, on the basis of these information items, at which rate each of the obtained image data items of the frames of the base stream is blended with corresponding one of the image data items of the enhanced frames can be understood on the pixel-by-pixel basis. With this, the unblending process (reverse blending process) can be appropriately executed.

In this embodiment, the SEINAL unit containing the information item of the blending rate and the range information item of the image data item is inserted into each access unit of each of the base stream STb and the enhanced stream STe. In this case, the encoder 103 inserts newly defined "Blend_and_range_information SEI message" into a part corresponding to "SEIs" in an access unit (AU).

In this embodiment, the SEINAL unit containing the information item of the blending rate and the range information item of the image data item, which relate to the blending process of generating the image data item P'(N), is inserted into, for example, each of the access units of each of the base stream STb and the enhanced stream STe. Note that it is also conceivable to insert the information item of the blending rate and the range information item of the image data item, which relate to this blending process, only into each of the access units of the base stream STb, or only into each of the access units of the enhanced stream STe.

FIG. 18 shows a structural example (syntax) of the "Blend_and_range_information SEI message." "uuid_iso_iec_11578" has an UUID value specified in "ISO/IEC 11578:1996 AnnexA." "Blend_and_range_information( )" is inserted into a field of "user_data_payload_bytes."

FIG. 19 shows a structural example (syntax) of "Blend_and_range_information( )" and FIG. 20 shows contents of main information items (semantics) in this structural example. An eight-bit field of "bit_depth_information" indicates a bit width of an encoded pixel. For example, "0" indicates 8 bits, "1" indicates 10 bits, "2" indicates 12 bits, and "3" indicates 16 bits.

A sixteenth-bit field of "range_limit_high_value" indicates the level value of the upper limit of the normal-blending-process target range. A sixteen-bit field of "range_limit_low_value" indicates the level value of the lower limit of the normal-blending-process target range. These define the range information item of each of the image data items.

An eight-bit field of "blending_mode" indicates modes of the blending processes. For example, "0x0" indicates a mode0, that is, a mode of executing only the normal blending process in related art. Further, for example, "0x1" indicates a mode1, that is, a mode of executing the blending processes including the special blending process based on the determination of the pixels in the picture "N." Still further, for example, "0x2" indicates a mode2, that is, a mode of executing the blending processes including the special blending process based on the determination of the pixels in each of the pictures "N" and "N+1."

When "blending_mode" is "0x0," there exist eight-bit fields of "type0_blending_coefficient_a" and "type0_blending_coefficient_b." Further, when "blending_mode" is "0x1," there exist eight-bit fields of "type0_blending_coefficient_a," "type0_blending_coefficient_b," "type1_blending_coefficient_c," and "type1_blending_coefficient_d." Still further, when "blending_mode" is "0x2," there exist eight-bit fields of "type0_blending_coefficient_a," "type0_blending_coefficient_b," "type1_blending_coefficient_c," "type1_blending_coefficient_d," "type2_blending_coefficient_e," and "type2_blending_coefficient_f."

The eight-bit field of "type0_blending_coefficient_a" indicates the coefficient "a" (coefficient for base-layer pixels) in the "Type0 blending process" being the normal blending process. The eight-bit field of "type0_blending_coefficient_b" indicates the coefficient "b" (coefficient for enhanced pixels) in the "Type0 blending process" being the normal blending process.

The eight-bit field of "type1_blending_coefficient_c" indicates the coefficient "c" (coefficient for the base-layer pixels) in the "Type1 blending process" being the special blending process. The eight-bit field of "type1_blending_coefficient_d" indicates the coefficient "d" (coefficient for the enhanced pixels) the "Type1 blending process" being the special blending process.

The eight-bit field of "type2_blending_coefficient_e" indicates the coefficient "e" (coefficient for the base-layer pixels) in the "Type2 blending process" being the other special blending process. The eight-bit field of "type2_blending_coefficient_f" indicates the coefficient "f" (coefficient for the enhanced pixels) in the "Type2 blending process" being the other special blending process. The above-mentioned coefficients correspond to the information items of the blending rates relating to the blending processes.

Referring back to FIG. 11, the multiplexer 104 packetizes the base stream STb and the enhanced stream STe generated by the encoder 103 into packetized elementary stream (PES) packets, and packetizes these packets further into transport packets to be multiplexed. In this way, the transport stream TS as a multiplexed stream is obtained.

Further, the multiplexer 104 inserts the information items of the blending rates and the range information item of each of the image data items into the layer of the transport stream TS as the container. In this embodiment, newly defined "HFR_descriptors" are inserted into video elementary stream loops arranged correspondingly to the base stream and the enhanced stream under a program map table. Note that, in the case where the information items of the blending rates and the range information item of each of the image data items are arranged in the SEI as described above, the information items can be switched on a picture-by-picture basis or a scene-by-scene basis. Further, in a case where the information items of the blending rates and the range information item of each of the image data items are arranged in the descriptors of the container, the information items can be switched in units of longer periods, specifically, on a program-by-program basis or in units of divided programs FIG. 21 shows a structural example (Syntax) of the "HFR_descriptor." Although not described in detail, this "HFR_descriptor" contains information items similar to those of the above-described "Blend_and_range_information SEI message" (refer to FIG. 19). Arrangement of the "HFR_descriptor" is advantageous in that, before the receiver starts the decoding process, types of processes necessary for HFR picture data items can be understood, and preparation for subsequent post-processes can be completed.

Figure 22:
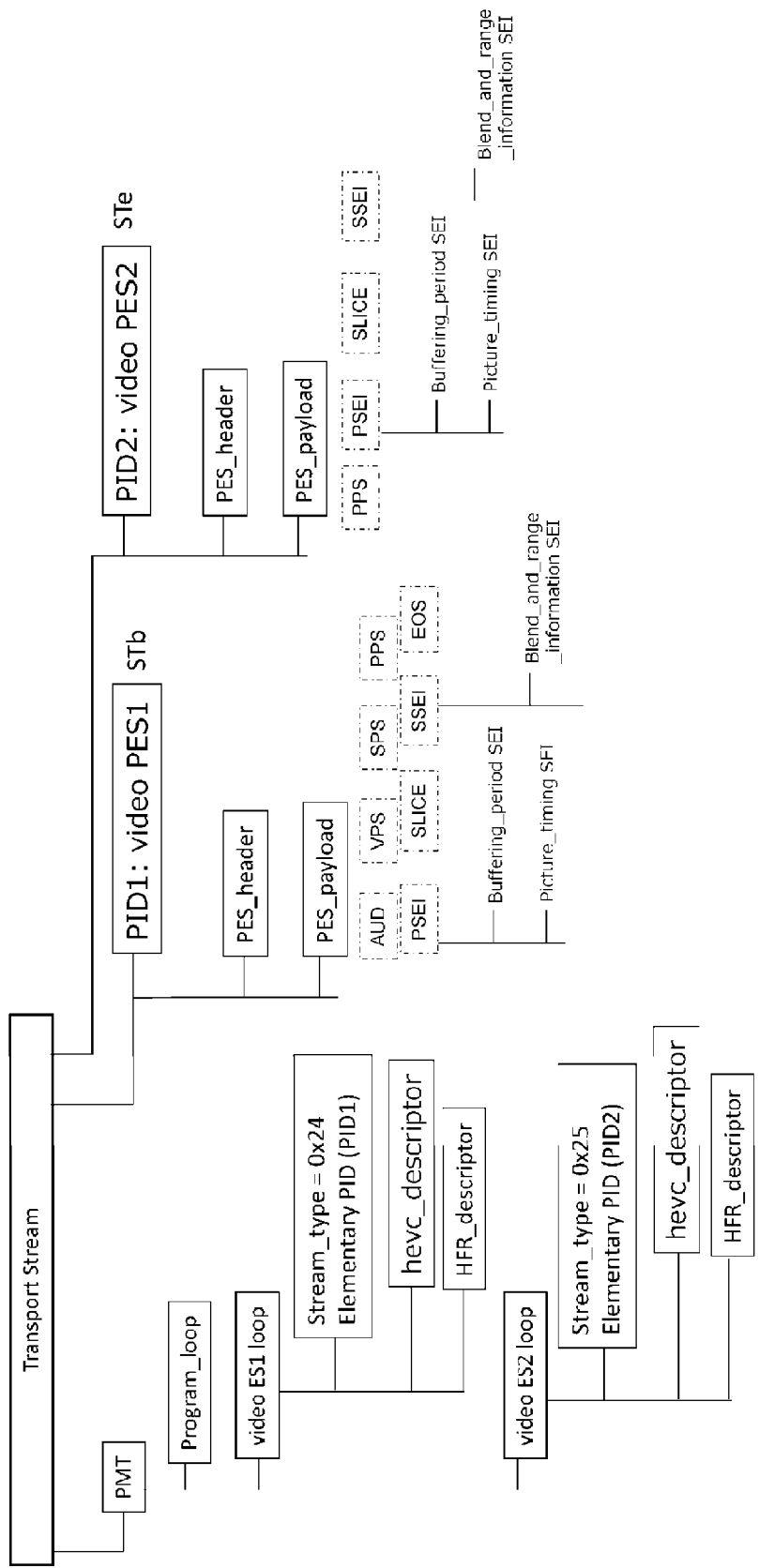
FIG. 22 shows a structural example of a transport stream TS.

FIG. 22 shows a configuration example of the transport stream TS. This transport stream TS contains the two video streams, that is, the base stream STb and the enhanced stream STe. In other words, in this configuration example, there exist a PES packet "video PES1" of the base stream STb, and a PES packet "video PES2" of the enhanced stream STe.

The "Blend_and_range_information SEI message" (refer to FIG. 19) is inserted into each of the encoded image data items of the pictures, which are contained in the PES packet "video PES1" and the PES packet "video PES2." Note that this example is corresponds to the example in which the information items of the blending rates and the range information item of each of the image data items are inserted into each of the base stream STb and the enhanced stream STe.

Further, the transport stream TS contains, as one of program specific information (PSI) items, the program map table (PMT). These PSIs refer to information items of to which program the elementary streams contained in the transport stream TS belong.

The PMT contains "Program_loop" that describes information items relating to an entirety of a program. Further, the PMT contains elementary stream loops each containing information items relating to corresponding one of the video streams. In this configuration example, there exist a video elementary stream loop "video ES1 loop" corresponding to the base stream, and a video elementary stream loop "video ES2 loop" corresponding to the enhanced stream.

In the "video ES1 loop," not only information items of, for example, a stream type and a packet identifier (PID) corresponding to the base stream (video PES1), but also descriptors that describe the information items relating to this video stream, such as "hevc_descriptor" and the above-mentioned "HFR_descriptor" (refer to FIG. 21), are also arranged. In a case of the HEVC encoding, a type of this stream is represented by "0x24" corresponding to the base stream.

Further, in the "video ES2 loop," not only the information items of, for example, the stream type and the packet identifier (PID) corresponding to the enhanced stream (video PES2), but also the descriptors that describe the information items relating to this video stream, such as "hevc_descriptor" and the above-mentioned "HFR_descriptor" (refer to FIG. 21), are also arranged. A type of this stream is represented by "0x25" corresponding to the enhanced stream.

Note that, in the case of the shown example, the HEVC encoding is performed, but transmission of signaling information items via the "Blend_and_range_information SEI messages" is applicable also to other codecs. In cases of the other codecs, different descriptors are inserted into the PMT.

Referring back to FIG. 11, the transmitting unit 105 modulates the transport stream TS, for example, in accordance with a modulation scheme suited to broadcasting, such as QPSK and OFDM, and transmits an RF signal via a transmitting antenna.

An operation of the transmitting apparatus 100 shown in FIG. 11 is briefly described. The moving-image data item P at the high frame rate (120 Hz) is input to the pre-processor 102. In this pre-processor 102, the moving-image data item P is processed, and the image data item P'(N) of each of the frames corresponding to the normal frame rate (60 Hz), and the image data item P(N+1) of each of the enhanced frames corresponding to the high frame rate are obtained.

In this case, the moving-image data item after the blending process is obtained by executing the process of blending, at the per-frame blending rates based on data levels, the image data items of the peripheral frames of the moving-image data item P with the image data items of the processing-target frames of the moving-image data item P. Then, in this moving-image data item, the image data items P'(N) correspond to the image data items of the frames corresponding to the normal frame rate (60 Hz), and the image data items P(N+1) correspond to the image data items of the rest of the frames. In this case, the image data items P'(N) are obtained by blending the image data items P(N+1) with the image data items P(N).

In this embodiment, the blending processes in accordance with the data levels of the image data items P(N) or with the data level of each of the image data items P(N) and P(N+1) and on the pixel-by-pixel basis are selectively used. With this, reception and reproduction can be performed while obtaining the effect of the blending in the normal luminance/chromaticity range, and without impairing sharpness in bright parts and dark parts.

For example, in the case where the novel method 1 is employed as the method of determining the blending rates, in accordance with the data levels of the image data items P(N), the "Type0 blending process" being the normal blending process or the "Type1 blending process" being the special blending process is used. Further, in the case where the novel method 2 is employed as the method of determining the blending rates, in accordance with the data levels of the image data items P(N) and P(N+1), the "Type0 blending process" being the normal blending process, the "Type1 blending process" being the special blending process, or the "Type2 blending process" being the other special blending process is used.

The image data items P'(N) and P(N+1) obtained in the pre-processor 102 are supplied to the encoder 103. In the encoder 103, the encoding process is executed on the image data items P'(N) and P(N+1), and the base stream STb and the enhanced stream STe are generated. In this encoder 103, for the sake of convenience of the unblending process (reverse blending process) on the receiving side, the information items of the blending rates and the range information item of each of the image data items, which relate to the blending process, are inserted into the base stream STb and the enhanced stream STe.

The base stream STb and the enhanced stream STe, which are generated in the encoder 103, are supplied to the multiplexer 104. In the multiplexer 104, the base stream STb and the enhanced stream STe are packetized into the PES packets, and further into the transport packets to be multiplexed. In this way, the transport stream TS as a multiplexed stream is obtained. Further, in the multiplexer 104, the "HFR_descriptors" each containing the information items of the blending rates and the range information item of each of the image data items are inserted into the layer of the transport stream TS as the container.

The transport stream TS generated in the multiplexer 104 is transmitted to the transmitting unit 105. In the transmitting unit 105, this transport stream TS is modulated, for example, in accordance with the modulation scheme suited to the broadcasting, such as QPSK and OFDM, and the RF signal is transmitted via the transmitting antenna.

"Configuration of Television Receiver"

Figure 23:
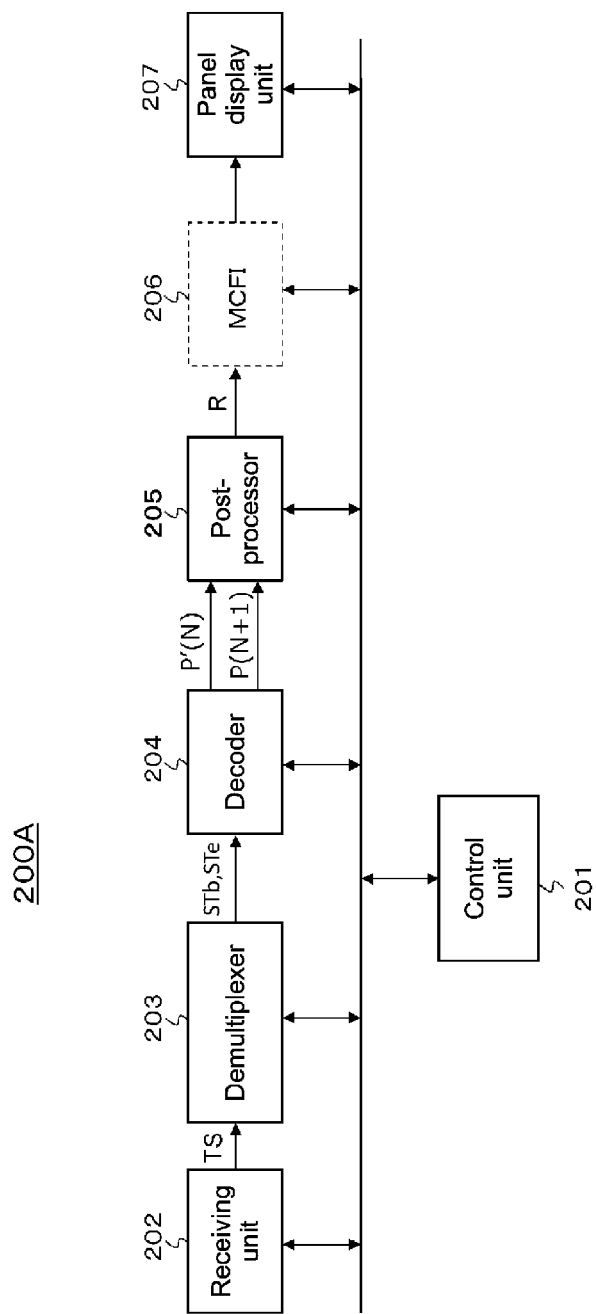
FIG. 23 is a block diagram showing a configuration example of a television receiver having a decoding capability to process a moving-image data item at a high frame rate (120 Hz).

FIG. 23 is a configuration example of the television receiver 200A having the decoding capability to process the moving-image data item at the high frame rate (120 Hz). This television receiver 200A includes a control unit 201, a receiving unit 202, a demultiplexer 203, the decoder 204, the post-processor 205, the motion-compensated frame interpolation (MCFI) unit 206, and a panel display unit 207. Further, the demultiplexer 203 extracts section information items contained in the layer of the transport stream TS, and transmits these information items to the control unit 201. In this case, the "HFR_descriptors" (refer to FIG. 21) each containing the information items of the blending rates and the range information item of each of the image data items are also extracted.

The control unit 201 controls operations of the units in the television receiver 200A. The receiving unit 202 acquires the transport stream TS by demodulating the RF-modulated signal received via a receiving antenna. The demultiplexer 203 extracts the base stream STb and the enhanced stream STe from the transport stream TS by filtering the PIDs, and supplies these streams to the decoder 204.

The decoder 204 executes the decoding process on the base stream STb so as to generate the image data item P'(N) of each of the frames corresponding to the normal frame rate, and executes the decoding process on the enhanced stream STe so as to generate the image data item P(N+1) of each of the enhanced frames corresponding to the high frame rate.

Further, the decoder 204 extracts a parameter set and the SEI that are inserted into each of the access units of each of the base stream STb and the enhanced stream STe, and transmits these information items to the control unit 201. In this case, the "Blend_and_range_information SEI messages" (refer to FIG. 19) each containing the information item of the blending rate and the range information item of the image data item are also extracted.

On the basis of the information items of the blending rates and the range information item of each of the image data items, when the unblending process (reverse blending process) is executed, the control unit 201 is allowed to appropriately determine which type of the unblending processes (reverse blending processes) to apply on the pixel-by-pixel basis, and is allowed to appropriately set filtering coefficients in accordance with the types the unblending processes (reverse blending processes). In this way, the post-processor 205 is allowed to appropriately perform control described below of the post-processor 205.

Under control by the control unit 201, the post-processor 205 executes the unblending processes (reverse blending processes) based on the image data items P'(N) and P(N+1) obtained in the decoder 204. With this, the unblended moving-image data item R at the high frame rate is obtained.

Figure 24:
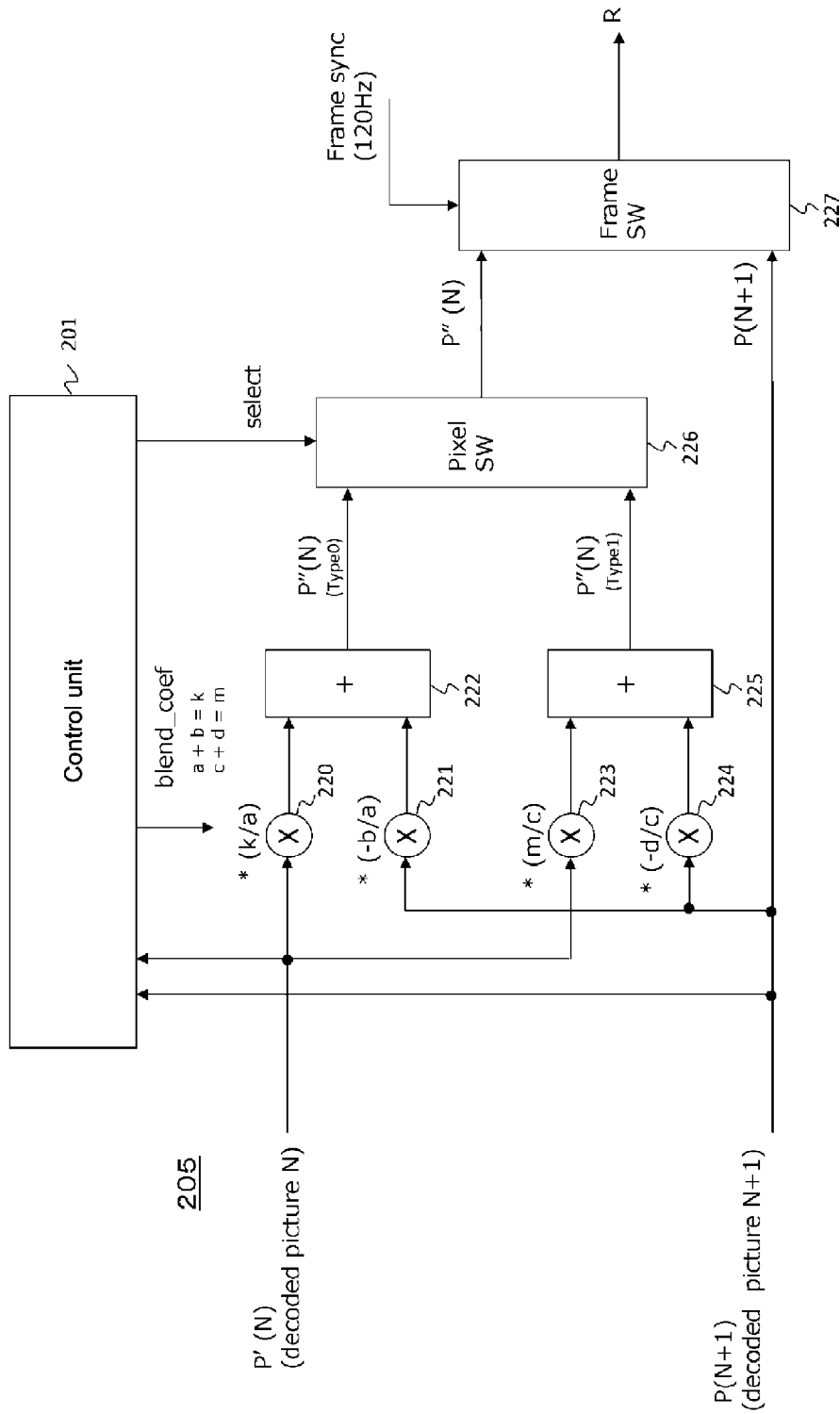
FIG. 24 is a block diagram showing a configuration example of the post-processor in the case where the novel method 1 is employed as the method of determining the blending rates.

FIG. 24 shows a configuration example of the post-processor 205. This example is a configuration example in the case where the novel method 1 is employed as the method of determining the blending rates. This post-processor 205 includes coefficient multipliers 220, 221, 223, and 224, adding units 222 and 225, switching units 226 and 227.

The image data item P'(N) of the picture "N" is input to the coefficient multiplier 220 and the coefficient multiplier 223. Further, the image data item P(N+1) of the picture "N+1" is input to the coefficient multiplier 221 and the coefficient multiplier 224.

The coefficient multiplier 220 has a coefficient (k/a) set by the control unit 201, and the image data item P'(N) is multiplied by this coefficient. Further, the coefficient multiplier 221 has a coefficient (−b/a) set by the control unit 201, and the image data item P(N+1) is multiplied by this coefficient. Output values from the coefficient multipliers 220 and 221 are added to each other by the adding unit 222. Note that the coefficient multipliers 220 and 221 and the adding unit 222 serve as a filter that executes the "Type0 unblending process" (reverse blending process), and an image data item P"(N) generated by the "Type0 unblending process" is obtained from the adding unit 222.

The coefficient multiplier 223 has a coefficient (m/c) set by the control unit 201, and the image data item P'(N) is multiplied by this coefficient. Further, the coefficient multiplier 224 has a coefficient (−d/c) set by the control unit 201, and the image data item P(N+1) is multiplied by this coefficient. Output values from the coefficient multipliers 223 and 224 are added to each other by the adding unit 225. Note that the coefficient multipliers 223 and 224 and the adding unit 225 serve as a filter that executes the "Type1 unblending process" (reverse blending process), and an image data item P"(N) generated by the "Type1 unblending process" is obtained from the adding unit 225.

The image data items P"(N) obtained in the adding units 222 and 225 are input to the switching unit 226. In response to selection signals from the control unit 201 and on the pixel-by-pixel basis, the switching unit 226 selectively outputs the image data item P"(N) obtained by the "Type0 unblending process" from the adding unit 222, or the image data item P"(N) obtained by the "Type1 unblending process" from the adding unit 225.

On the basis of the image data items P'(N) and P(N+1) and the level values "range_limit_high_value" and "range_limit_low_value" as the range information item of each of the image data items, the control unit 201 generates the selection signals on the pixel-by-pixel basis, and transmits these signals to the switching unit 226.

Figure 25:
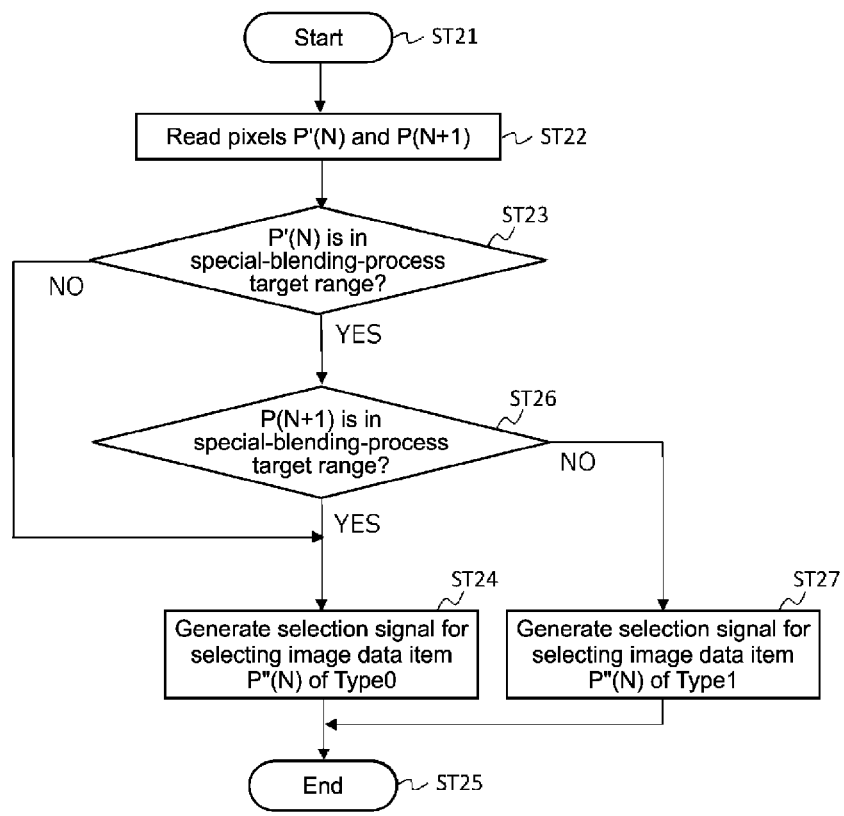
FIG. 25 is a flowchart showing an example of a procedure for generating selection signals on the pixel-by-pixel basis in another control unit.

FIG. 25 is a flowchart showing an example of a procedure for generating the selection signals on the pixel-by-pixel basis in the control unit 201. First, in Step ST21, the control unit 201 starts the procedure. Then, in Step ST22, the control unit 201 reads a pixel P'(N) and a pixel P(N+1). Next, in Step ST23, the control unit 201 determines whether or not the pixel P'(N) is in the special-blending-process target range "(P'(N)>range_high) or (P'(N)<range_low)."

When the control unit 201 determines that the pixel P'(N) is out of either one of the special-blending-process target ranges and within the normal-blending-process target range, in Step ST24, the control unit 201 generates the selection signal for selecting the image data item P"(N) obtained by the "Type0 unblending process." Then, in Step ST25, the control unit 201 terminates the procedure. Meanwhile, when the control unit 201 determines that the pixel P'(N) is within one of the special-blending-process target ranges, the control unit 201 advances the procedure to the process of Step ST26.

In Step ST26, the control unit 201 determines whether or not the pixel P(N+1) is within the special-blending-process target range "(P(N+1)>range_high) or (P(N+1)<range_low)." When the control unit 201 determines that the pixel P(N+1) is out of either one of the special-blending-process target ranges and within the normal-blending-process target range, in Step ST27, the control unit 201 generates the selection signal for selecting the image data item P"(N) obtained by the "Type1 unblending process." Then, in Step ST25, the control unit 201 terminates the procedure.

Meanwhile, when the control unit 201 determines that the pixel P(N+1) is within one of the special-blending-process target ranges, in Step ST24, the control unit 201 generates the selection signal for selecting the image data item P"(N) obtained by the "Type0 unblending process." Then, in Step ST25, the control unit 201 terminates the procedure.

Referring back to FIG. 24, the image data item P"(N) obtained in the switching unit 226 and the image data item P(N+1) are input to the switching unit 227. A frame synchronization signal at 120 Hz is supplied to this switching unit 227. In synchronization with this frame synchronization signal, the switching unit 227 extracts the unblended image data item P"(N) and the image data item P(N+1) alternately to each other, and outputs the moving-image data item R at the high frame rate (120 Hz).

Figure 26:
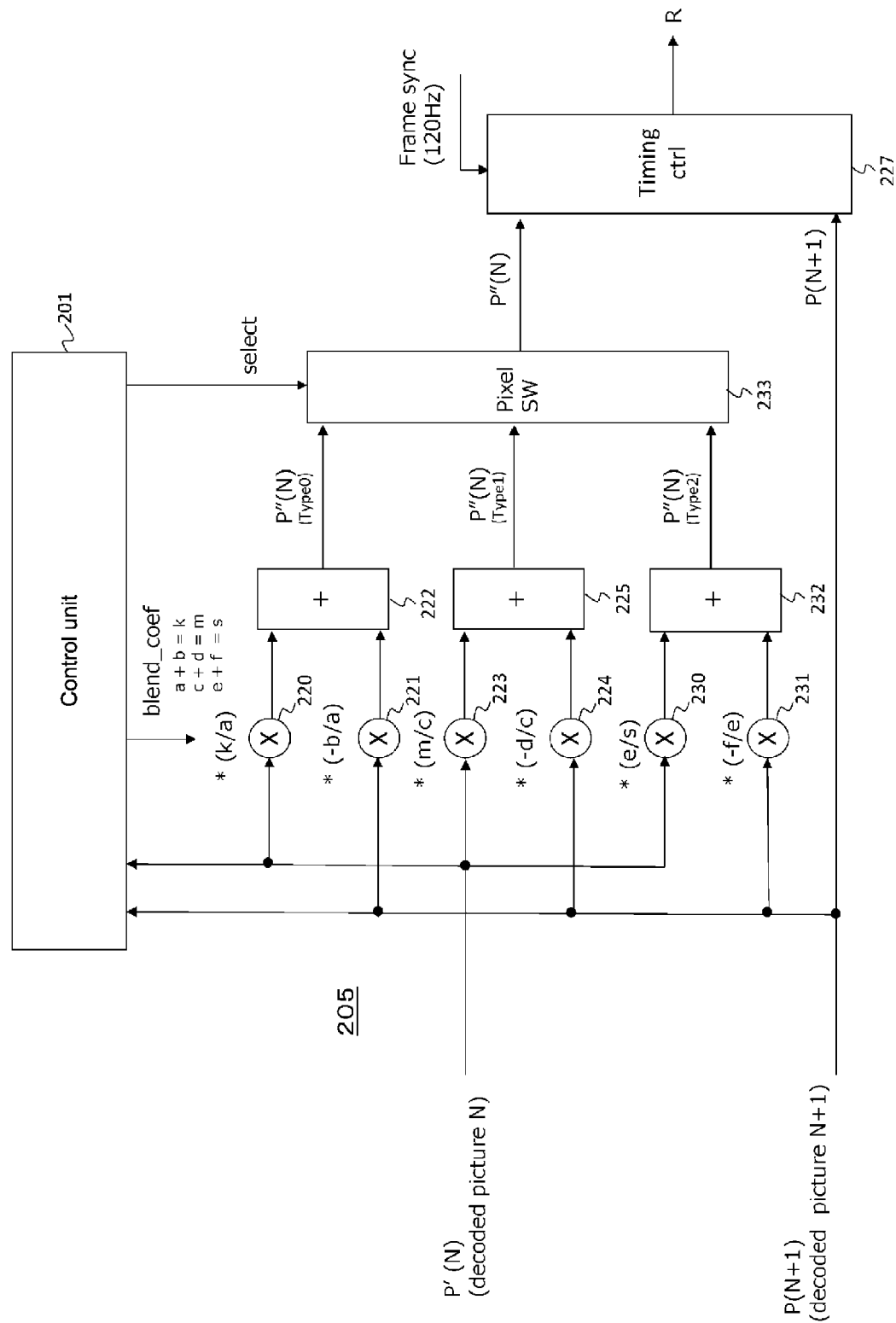
FIG. 26 is a block diagram showing another configuration example of the post-processor in the case where the novel method 2 is employed as the method of determining the blending rates.

FIG. 26 shows another configuration example of the post-processor 205. This example is a configuration example in the case where the novel method 2 is employed as the method of determining the blending rates. In FIG. 26, the parts corresponding to those in FIG. 24 are denoted by the same reference symbols, and detailed description thereof is omitted as appropriate. This post-processor 205 includes the coefficient multipliers 220, 221, 223, and 224, coefficient multipliers 230 and 231, the adding units 222 and 225, an adding unit 232, a switching unit 233, and the switching unit 227.

The image data item P'(N) of the picture "N" is input to the coefficient multiplier 200, the coefficient multiplier 223, and the coefficient multiplier 230. Further, the image data item P(N+1) of the picture "N+1" is input to the coefficient multiplier 221, the coefficient multiplier 224, and the coefficient multiplier 231.

The coefficient multiplier 220 has the coefficient (k/a) set by the control unit 201, and the image data item P'(N) is multiplied by this coefficient. Further, the coefficient multiplier 221 has the coefficient (−b/a) set by the control unit 201, and the image data item P(N+1) is multiplied by this coefficient. The output values from the coefficient multipliers 220 and 221 are added to each other by the adding unit 222. Note that the coefficient multipliers 220 and 221 and the adding unit 222 serve as the filter that executes the "Type0 unblending process" (reverse blending process), and the image data item P"(N) generated by the "Type0 unblending process" is obtained from the adding unit 222.

The coefficient multiplier 223 has the coefficient (m/c) set by the control unit 201, and the image data item P'(N) is multiplied by this coefficient. Further, the coefficient multiplier 224 has the coefficient (−d/c) set by the control unit 201, and the image data item P(N+1) is multiplied by this coefficient. The output values from the coefficient multipliers 223 and 224 are added to each other by the adding unit 225. Note that the coefficient multipliers 223 and 224 and the adding unit 225 serve as the filter that executes the "Type1 unblending process" (reverse blending process), and the image data item P"(N) generated by the "Type1 unblending process" is obtained from the adding unit 225.

The coefficient multiplier 230 has a coefficient (e/s) set by the control unit 201, and the image data item P'(N) is multiplied by this coefficient. Further, the coefficient multiplier 231 has a coefficient (−f/e) set by the control unit 201, and the image data item P(N+1) is multiplied by this coefficient. Output values from the coefficient multipliers 230 and 231 are added to each other by the adding unit 232. Note that the coefficient multipliers 230 and 231 and the adding unit 232 serve as a filter that executes the "Type2 unblending process" (reverse blending process), and the image data item P"(N) generated by the "Type2 unblending process" is obtained from the adding unit 232.

The image data items P"(N) obtained in the adding units 222, 225, and 232 are input to the switching unit 233. In response to the selection signals from the control unit 201 and on the pixel-by-pixel basis, the switching unit 233 selectively outputs the image data item P"(N) obtained by the "Type0 unblending process" from the adding unit 222, the image data item P"(N) obtained by the "Type1 unblending process" from the adding unit 225, or the image data item P"(N) obtained by the "Type2 unblending process" from the adding unit 232.

On the basis of the image data items P'(N) and P(N+1) and the level values "range_limit_high_value" and "range_limit_low_value" as the range information item of each of the image data items, the control unit 201 generates the selection signals on the pixel-by-pixel basis, and transmits these signals to the switching unit 233.

Figure 27:
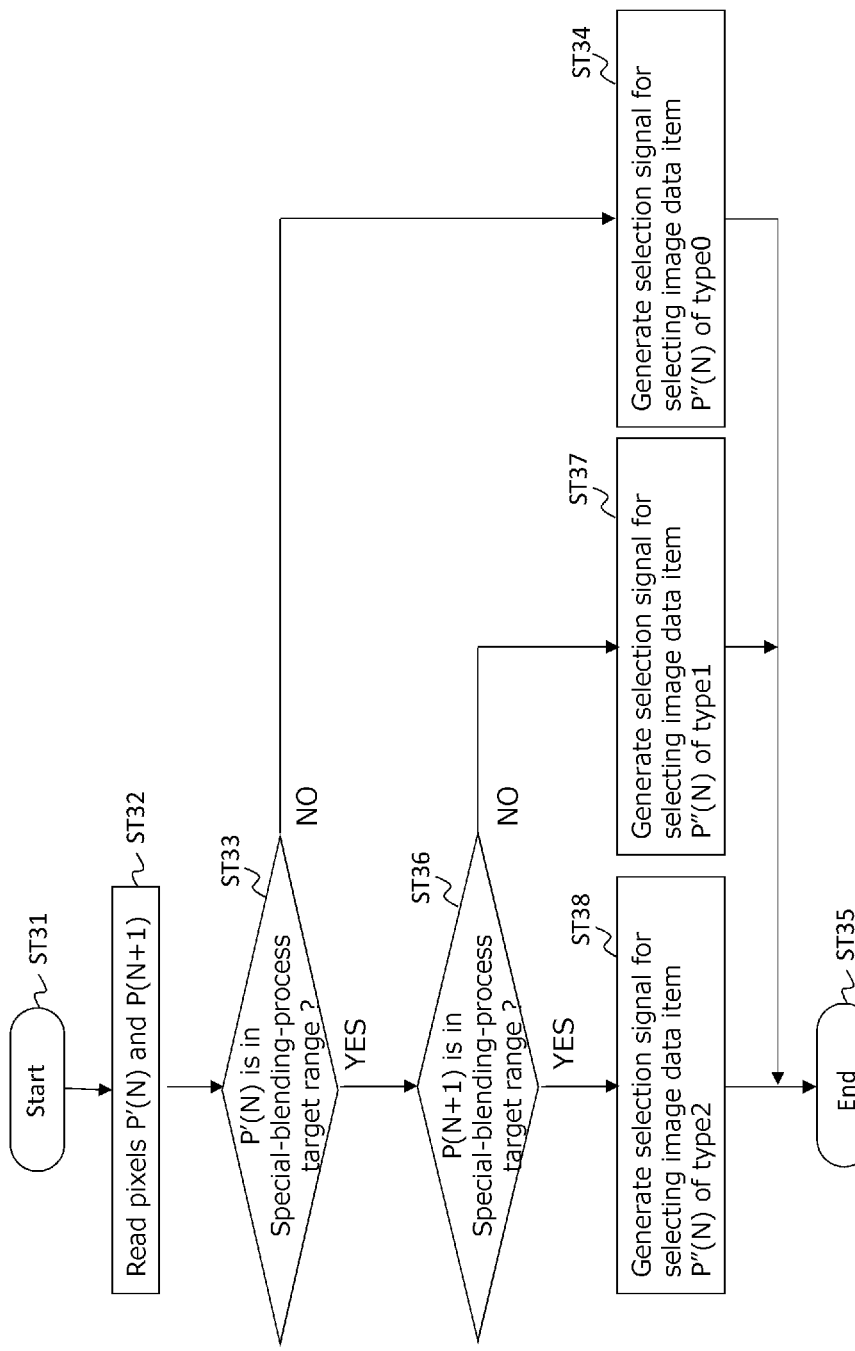
FIG. 27 is a flowchart showing another example of the procedure for generating the selection signals on the pixel-by-pixel basis in the other control unit.

FIG. 27 is a flowchart showing another example of the procedure for generating the selection signals on the pixel-by-pixel basis in the control unit 201. First, in Step ST31, the control unit 201 starts the procedure. Then, in Step ST32, the control unit 201 reads the pixels P'(N) and P(N+1). Next, in Step ST33, the control unit 201 determines whether or not the pixel P'(N) is within the special-blending-process target range "(P'(N)>range_high) or (P'(N)<range_low)."

When the control unit 201 determines that the pixel P'(N) is out of either one of the special-blending-process target ranges and within the normal-blending-process target range, in Step ST34, the control unit 201 generates the selection signal for selecting the image data item P"(N) obtained by the "Type0 unblending process." Then, in Step ST35, the control unit 201 terminates the procedure.

Further, in Step ST33, when the control unit 201 determines that the pixel P'(N) is within one of the special-blending-process target ranges, in Step ST36, the control unit 201 determines whether or not the pixel P(N+1) is within the special-blending-process target range "(P(N+1)> range_high) or (P(N+1)<range_low)." When the control unit 201 determines that the pixel P(N+1) is out of either one of the special-blending-process target ranges and within the normal-blending-process target range, in Step ST37, the control unit 201 generates the selection signal for selecting the image data item P"(N) obtained by the "Type1 unblending process." Then, in Step ST35, the control unit 201 terminates the procedure.

Still further, in Step ST36, when the control unit 201 determines that the pixel P(N+1) is within one of the special-blending-process target ranges, in Step ST38, the control unit 201 generates the selection signal for selecting the image data item P"(N) obtained by the "Type2 unblending process." Then, in Step ST35, the control unit 201 terminates the procedure.

Referring back to FIG. 26, the image data item P"(N) obtained in the switching unit 233 and the image data item P(N+1) are input to the switching unit 227. The frame synchronization signal at 120 Hz is supplied to this switching unit 227. In synchronization with this frame synchronization signal, the switching unit 227 extracts the unblended image data item P"(N) and the image data item P(N+1) alternately to each other, and outputs the moving-image data item R at the high frame rate (120 Hz).

Referring back to FIG. 23, the MCFI unit 206 executes a motion-compensated frame interpolation process on the moving-image data item R at the high frame rate, which is obtained in the post-processor 205. With this, a moving-image data item at a much higher rate is obtained. Note that this MCFI unit 206 may be omitted. The panel display unit 207 displays images of the moving-image data item R at the high frame rate, which is obtained in the post-processor 205, or images of the moving-image data item increased in frame rate in the MCFI unit 206.

The operations in the television receiver 200A shown in FIG. 23 are briefly described. In the receiving unit 202, the transport stream TS is acquired by demodulating the RF-modulated signal received via the receiving antenna. This transport stream TS is transmitted to the demultiplexer 203. In the demultiplexer 203, the base stream STb and the enhanced stream STe are extracted from the transport stream TS by filtering the PIDs, and are supplied to the decoder 204.

In the decoder 204, the decoding process is executed on the base stream STb such that the image data item P'(N) of each of the frames corresponding to the normal frame rate is obtained, and the decoding process is executed on the enhanced stream STe such that the image data item P(N+1) of each of the enhanced frames corresponding to the high frame rate is obtained. These image data items P'(N) and P(N+1) are supplied to the post-processor 205.

Further, in the decoder 204, the parameter set and the SEI that are inserted into each of the access units of each of the base stream STb and the enhanced stream STe are extracted and transmitted to the control unit 201. In this case, the "Blend_and_range_information SEI messages" (refer to FIG. 19) each containing the information item of the blending rate and the range information item of the image data item are also extracted.

In the control unit 201, on the basis of the information items of the blending rates and the range information item of each of the image data items, when executing the unblending process (reverse blending process), which type of the unblending processes (reverse blending processes) to apply on the pixel-by-pixel basis is allowed to be appropriately determined. In addition, the filtering coefficients in accordance with the types the unblending processes (reverse blending processes) are allowed to be appropriately set.

In the post-processor 205, under the control by the control unit 201, the unblending processes (reverse blending processes) are executed on the basis of the image data items P'(N) and P(N+1) obtained in the decoder 204. With this, the unblended moving-image data item R at the high frame rate is obtained.

For example, in the case where the novel method 1 is employed as the method of determining the blending rates, in accordance with the data levels of the image data item P'(N), the "Type0 unblending process" being the normal unblending process or the "Type1 unblending process" being the special unblending process is used. Further, in the case where the novel method 2 is employed as the method of determining the blending rates, in accordance with the data levels of the image data items P'(N) and P(N+1), the "Type0 unblending process" being the normal unblending process, the "Type1 unblending process" being the special unblending process, or the "Type2 unblending process" being the other special unblending process is used.

The moving-image data item R at the high frame rate, which is obtained in the post-processor 205, or the moving-image data item increased in frame rate in the MCFI unit 206 is supplied to the panel display unit 207. The images of these moving-image data items are displayed on the panel display unit 207.

Figure 28:
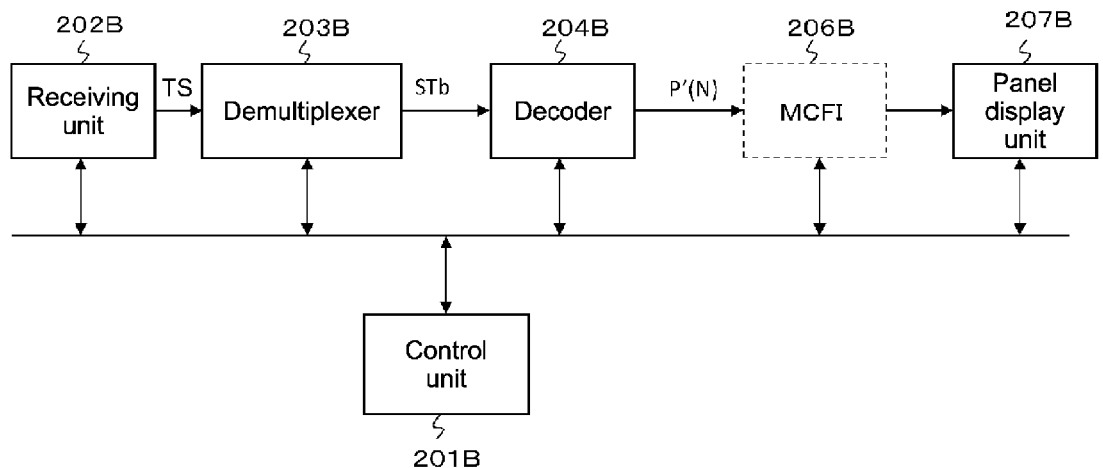
FIG. 28 is a block diagram showing a configuration example of a television receiver having a decoding capability to process a moving-image data item at a normal frame rate (60 Hz).

FIG. 28 is a configuration example of the television receiver 200B having the decoding capability to process the moving-image data item at the normal frame rate (60 Hz). This television receiver 200B includes a control unit 201B, a receiving unit 202B, a demultiplexer 203B, the decoder 204B, the MCFI unit 206B, and a panel display unit 207B.

The control unit 201B controls operations of the units in the television receiver 200B. The receiving unit 202B acquires the transport stream TS by demodulating the RF-modulated signal received via the receiving antenna. The demultiplexer 203B extracts the base stream STb from the transport stream TS by filtering the PIDs, and supplies this stream to the decoder 204B. The decoder 204B executes the decoding process on the base stream STb so as to generate the image data item P'(N) of each of the frames corresponding to the normal frame rate.

The MCFI unit 206B executes the motion-compensated frame interpolation process on these image data items P'(N) so as to generate a moving-image data item at a much higher rate. Note that this MCFI unit 206B may be omitted. The panel display unit 207B displays images of the moving-image data item at the normal frame rate (image data items P'(N)), which is obtained in the decoder 204B, or of the moving-image data item increased in frame rate in the MCFI unit 206B.

The operations in the television receiver 200B shown in FIG. 28 are briefly described. In the receiving unit 202B, the transport stream TS is acquired by demodulating the RF-modulated signal received via the receiving antenna. This transport stream TS is transmitted to the demultiplexer 203B. In the demultiplexer 203B, the base stream STb is extracted from the transport stream TS by filtering the PIDs, and is supplied to the decoder 204B.

In the decoder 204B, the decoding process is executed on the base stream STb such that the image data item P'(N) of each of the frames corresponding to the normal frame rate is obtained. The moving-image data item at the normal frame rate, which is obtained in the decoder 204B, or the moving-image data item increased in frame rate in the MCFI unit 206B is supplied to the panel display unit 207B. The images of these moving-image data items are displayed on the panel display unit 207B.

As described hereinabove, in the transmitting-and-receiving system 10 shown in FIG. 1, among the image data items of the frames of the moving-image data item at the high frame rate, at least the image data items of the frames corresponding to the normal frame rate are blended with the image data items of the peripheral frames, that is, under a state of a high shutter-opening rate. The base stream STb to be transmitted is obtained by encoding these image data items of the frames corresponding to the normal frame rate.

Thus, as for the television receiver 200B having the decoding capability to process the moving-image data item at the normal frame rate, the moving-image data item at the normal frame rate is obtained by processing the base stream STb, and images of the moving image can be smoothly displayed. In addition, an image-quality problem as a result of the frame interpolation process including low-load calculation in the display process can be avoided.

Further, in the transmitting-and-receiving system 10 shown in FIG. 1, the image data item of each of the frames is blended with the image data item of corresponding one of the peripheral frames at the blending rate in accordance with the data level. Thus, the original texture of the images, such as a high dynamic range (HDR) effect, can be prevented from being impaired by the blending processes.

Still further, in the transmitting-and-receiving system 10 shown in FIG. 1, in addition to the base stream STb, the enhanced stream STe is obtained by encoding the image data items of the rest of the frames. The base stream STb and the enhanced stream STe are transmitted with the information items of the blending rates (coefficient sets) of the frames and the range information item of each of the image data items, which are associated respectively with the image data items of the frames, being inserted into these streams. Thus, on the receiving side, on the basis of these information items, the unblended moving-image data item can be easily and appropriately obtained by executing the unblending processes (reverse blending processes) on the moving-image data item obtained by decoding the base stream and the enhanced stream.

Note that the present technology is not limited to the above-described example of the transmitting-and-receiving system 10 shown in FIG. 1, in which the base stream STb and the enhanced stream STe are transmitted to the receiving side with the information items of the blending rates of the frames and the range information item of each of the image data items being inserted therein. The information items of the blending rates of the frames and the range information item of each of the image data items may be provided with other units to the receiving side.

2. Second Embodiment (Transmitting-and-Receiving System)

In the example in the above-described embodiment, the transmitting-and-receiving system 10 includes the transmitting apparatus 100 and the television receiver 200. However, the present technology is applicable is applicable to other configurations of the transmitting-and-receiving system. The television receiver 200 may be replaced with a set-top box and a display that are connected to each other via digital interfaces (multimedia interfaces) such as a high-definition multimedia interface (HDMI). Note that the "HDMI" is a trademark.

Figure 29:
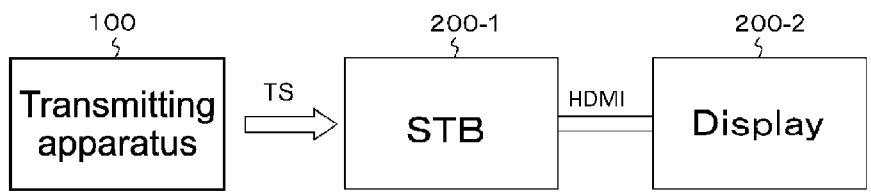
FIG. 29 is a block diagram showing a configuration example of a transmitting-and-receiving system according to a second embodiment.

FIG. 29 shows a configuration example of a transmitting-and-receiving system 10A. This transmitting-and-receiving system 10A includes the transmitting apparatus 100, a set-top box (STB) 200-1, and a display 200-2. The set-top box (STB) 200-1 and the display 200-2 are connected to each other via the HDMI.

The transmitting apparatus 100 is the same as the transmitting apparatus 100 in the transmitting-and-receiving system 10 shown in FIG. 1, and hence description thereof is omitted. The set-top box 200-1 receives the transport stream TS that is transmitted via the broadcast wave from the transmitting apparatus 100.

In a case where the display 200-2 is compatible with the moving-image data item at the high frame rate (120 Hz), the set-top box 200-1 processes both the base stream STb and the enhanced stream STe contained in the transport stream TS. With this, the image data items P'(N) and P(N+1) are obtained.

In a case where the display 200-2 has the function of the unblending process (reverse blending process), the set-top box 200-1 transmits, to the display 200-2 via the HDMI transmission path, the image data items P'(N) and P(N+1) of each of the frames, which have been subjected to the blending process, the information items of the blending rates (coefficient sets), and the range information item of each of the image data items.

Further, in a case where the display 200-2 does not have the function of the unblending process (reverse blending process), the set-top box 200-1 executes, on the basis of the information items of the blending rates (coefficient sets), the unblending process (reverse blending process) on the image data items P'(N) and P(N+1) that have been subjected to the blending process. With this, the unblended moving-image data item R at the high frame rate is obtained. Then, the set-top box 200-1 transmits this moving-image data item R at the high frame rate to the display 200-2 via the HDMI transmission path.

Meanwhile, in a case where the display 200-2 is compatible with the moving-image data item at the normal frame rate (60 Hz), the set-top box 200-1 processes only the base stream STb contained in the transport stream TS. With this, the image data item P'(N) of each of the frames corresponding to the normal frame rate is obtained. Then, the set-top box 200-1 transmits these image data items P'(N) to the display 200-2 via the HDMI transmission path.

The set-top box 200-1 being a source apparatus acquires EDID from the display 200-2 being a sink apparatus, and determines whether or not the display 200-2 is compatible with the moving-image data item at the high frame rate (120 Hz), and determines whether or not the display 200-2 has the function of the unblending process (reverse blending process).

Figure 30:
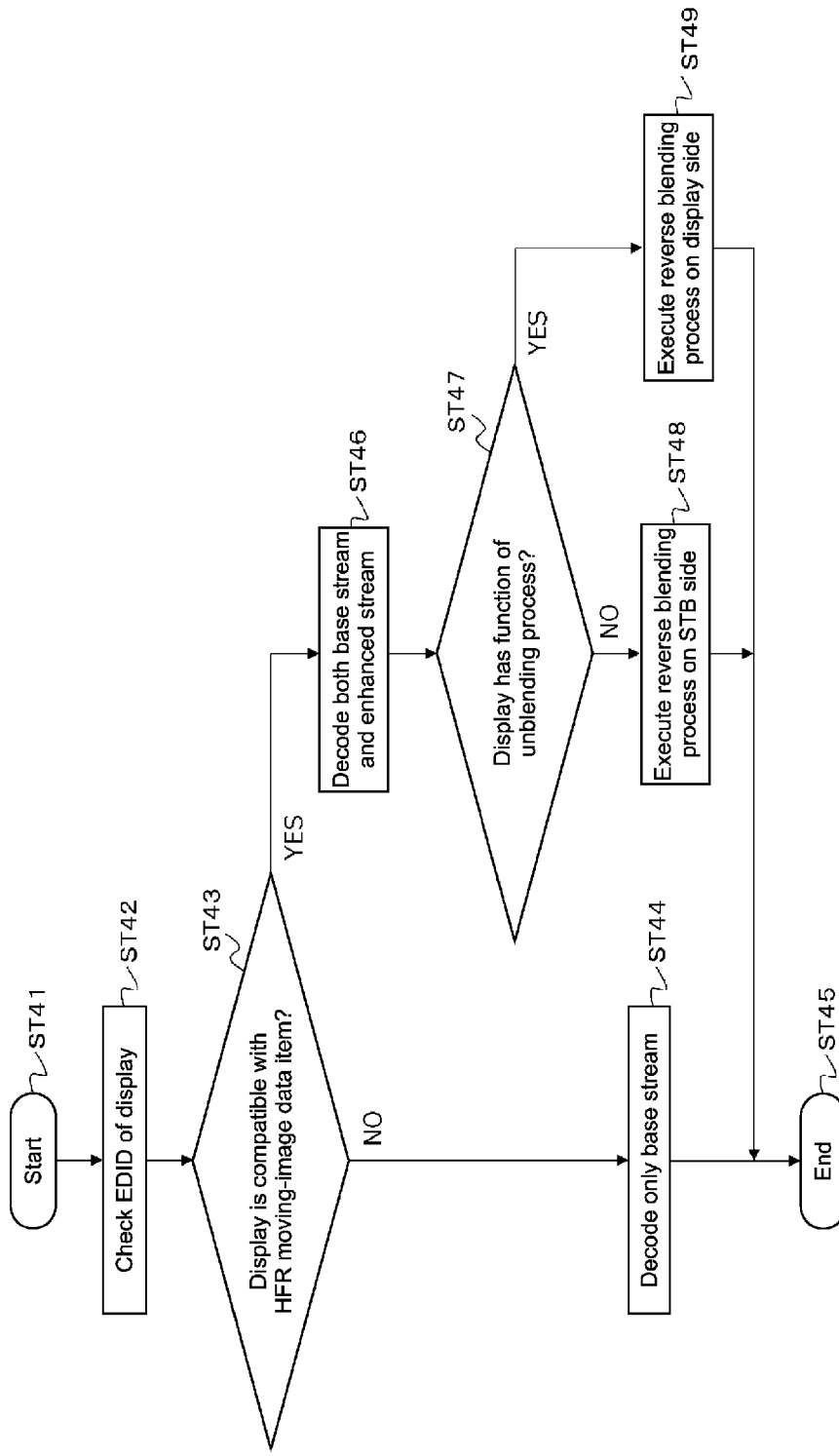
FIG. 30 is a flowchart showing an example of a control procedure in a control unit (CPU) of a set-top box.

FIG. 30 is a flowchart showing an example of a control procedure in a control unit (CPU) of the set-top box 200-1. First, in Step ST41, the control unit starts the control procedure. Then, in Step ST42, the control unit checks the EDID read out from the display 200-2. Next, in Step ST43, the control unit determines whether or not the display 200-2 is compatible with the moving-image data item at the high frame rate (120 Hz).

When the display 200-2 is incompatible therewith, in Step ST44, the control unit decodes only the base stream STb, and transmits the image data item P(N) of each of the frames corresponding to the normal frame rate (60 Hz) to the display 200-2. After the process of this Step ST44, in Step ST45, the control unit terminates the control procedure.

Further, in Step ST43, when the control unit determines that the display 200-2 is compatible with the moving-image data item at the high frame rate, in Step ST46, the control unit decodes both the base stream STb and the enhanced stream STe.

Then, in Step ST47, the control unit determines whether or not the display 200-2 has the function of the unblending process (reverse blending process). When the display 200-2 does not have the function of the unblending process, in Step ST48, the control unit determines execution of the unblending process on the set-top box 200-1 side, and transmits the unblended moving-image data item R at the high frame rate to the display 200-2. After the process of this Step ST48, in Step ST45, the control unit terminates the control procedure.

Further, in Step ST47, when the control unit determines that the display 200-2 has the function of the unblending process, in Step ST49, the control unit determines execution of the unblending process on the display 200-2 side, and transmits, to the display 200-2 via the HDMI transmission path, the image data items P'(N) and P(N+1) that have been subjected to the blending process, the information items of the blending rates (coefficient sets), and the range information item of each of the image data items. After the process of this Step ST49, in Step ST45, the control unit terminates the control procedure.

Figure 31:
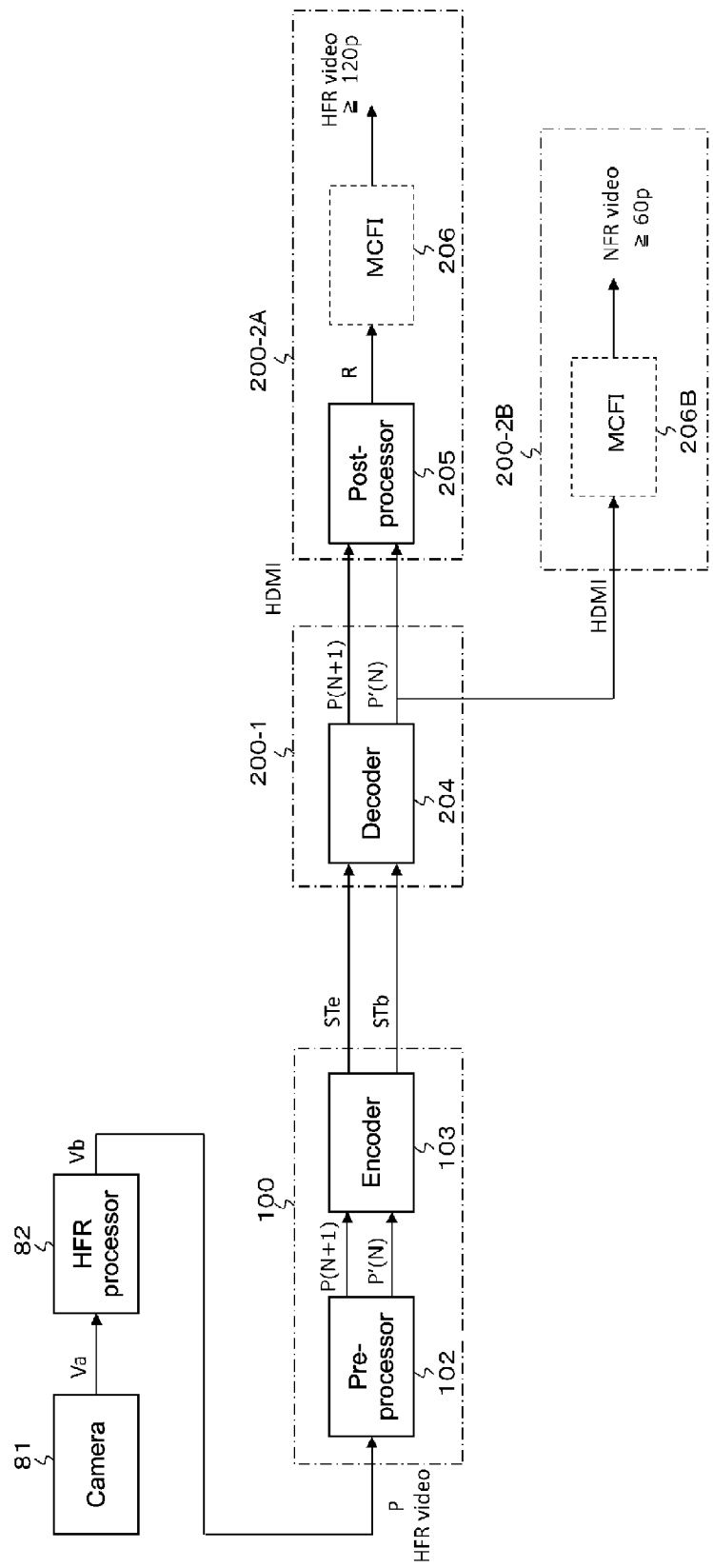
FIG. 31 is a schematic diagram showing processes by the transmitting apparatus, the set-top box, and displays.

FIG. 31 schematically shows processes by the transmitting apparatus 100, the set-top box 200-1, and the display 200-2. Note that the image sequences P'(N) and P(N+1) of the output from the pre-processor 102 of the transmitting apparatus 100, and the image sequences P'(N) and P(N+1) of the output from the decoder 204 of the set-top box 200-1, which are the same as each other in time series, may be different from each other in image quality due to the processes based on the codecs.

The transmitting apparatus 100 is the same as that described with reference to FIG. 4, and hence description thereof is omitted. In the set-top box 200-1, in a case where a display 200-2A compatible with the moving-image data item at the high frame rate (120 Hz) is connected thereto, the decoder 204 executes the decoding process on the two streams STb and STe. With this, the image data item P'(N) of each of the frames corresponding to the normal frame rate, and the image data items P(N+1) of each of the enhanced frames corresponding to the high frame rate are obtained.

Further, in a case where the display 200-2A has the function of the unblending process (reverse blending process), from the set-top box 200-1, the image data items P'(N) and P(N+1), the information items of the blending rates (coefficient sets), and the range information item of each of the image data items are transmitted to the display 200-2A via the HDMI transmission path. In the case of the shown example, the display 200-2A includes the post-processor 205, and the display 200-2A has the function of the unblending process (reverse blending process). Further, FIG. 32A shows a state in this case.

Still further, in the set-top box 200-1, in a case where the display 200-2A does not have the function of the unblending process (reverse blending process), the post-processor 205 therein executes the unblending process (reverse blending process) on the image data items P'(N) and P(N+1). With this, the unblended moving-image data item R at the high frame rate is obtained. Then, from the set-top box 200-1, this moving-image data item R is transmitted to the display 200-2A via the HDMI transmission path. FIG. 32B shows a state in this case.

Further, in the set-top box 200-1, in a case where a display 200-2B compatible with the moving-image data item at the normal frame rate (60 Hz) is connected thereto, the decoder 204 executes the decoding process on the stream STb. With this, the image data item P'(N) of each of the frames corresponding to the normal frame rate is obtained. In addition, from the set-top box 200-1, these image data items P'(N) are transmitted to the display 200-2B via the HDMI transmission path.

As described above, in the set-top box 200-1, the image data items P'(N) and P(N+1) that have been subjected to the blending process, the information items of the blending rates (coefficient sets) of the frames, and the range information item of each of the image data items are transmitted, via the HDMI transmission path, to the display 200-2A compatible with the moving-image data item at the high frame rate (120 Hz) and has the function of the unblending process (reverse blending process).

In this case, the information items of the blending rates (coefficient sets) and the range information item are transmitted, for example, under a state of being inserted into blanking periods of the image data items P'(N) and P(N+1). In this case, newly defined "HFR Blending InfoFrames" are used.

FIG. 33 shows a structural example (syntax) of the "HFR Blending InfoFrame," and FIG. 34 shows contents of main information items (semantics) in this structural example. First three bytes of this Infoframe correspond to a header part in which information items of "InfoFrame Type," "Version Number," and byte lengths of "Data Bytes" are arranged.

A three-bit information item of "Frame Rate" is arranged from a seventh bit to a fifth bit of "Data Byte 1." This three-bit information item indicates a frame rate. For example, "3" indicates 120 Hz. Further, a one-bit information item of "Blending_flag" is arranged in a fourth bit of "Data Byte 1." This information item indicates whether or not the process of blending with an peripheral image data item is applied. For example, "0" indicates "Not Applied," and "1" indicates "Applied."

Still further, a one-bit information item of "Synchronized Frame (SF)" is arranged in a zeroth bit of "Data Byte 1." This information item indicates whether nor not a process of synchronization with a next video frame is essential. For example, "0" indicates that the process of synchronization with the next video frame is inessential, and "1" indicates that the process of synchronization with the next video frame is essential.

Yet further, an eight-bit information item of "bit_depth_information" is arranged in Data Byte 2. This information item indicates a bit width of an encoded pixel. For example, "0" indicates 8 bits, "1" indicates 10 bits, "2" indicates 12 bits, and "3" indicates 16 bits.

Yet further, the sixteen-bit information items "Range_limit_high_value" are arranged in "Data Byte 3" and "Data Byte 4." These information items indicate the level value of the upper limit of the normal-blending-process target range. Yet Further, the sixteen-bit information items "Range_limit_low_value" are arranged in "Data Byte 5" and "Data Byte 6." These information items indicate the level value of the lower limit of the normal-blending-process target range.

Yet further, the eight-bit information item of "Blending_mode" is arranged in "Data Byte 7." This information item indicates the modes of the blending processes. For example, "0x0" indicates the mode0, that is, the mode of executing only the normal blending process in related art. Further, for example, "0x1" indicates the mode1, that is, the mode of executing the blending processes including the special blending process based on the determination of the pixels in the picture "N." Still further, for example, "0x2" indicates the mode2, that is, the mode of executing the blending processes including the special blending process based on the determination of the pixels in each of the pictures "N" and "N+1."

Yet further, the eight-bit information item of "Type0_blending_coefficient_a" is arranged in "Data Byte 8." This information item indicates the coefficient "a" (coefficient for the base-layer pixels) in the "Type0 blending process" being the normal blending process. Yet further, the eight-bit information item of "Type0_blending_coefficient_b" is arranged in "Data Byte 9." This information item indicates the coefficient "b" (coefficient for the enhanced pixels) in the "Type0 blending process" being the normal blending process.

Yet further, the eight-bit information item of "Type1_blending_coefficient_c" is arranged in "Data Byte 10." This information item indicates the coefficient "c" (coefficient for the base-layer pixels) in the "Type1 blending process" being the special blending process. Yet further, the eight-bit information item of "Type1_blending_coefficient_d" is arranged in "Data Byte 11." This information item indicates the coefficient "d" (coefficient for the enhanced pixels) in the "Type1 blending process" being the special blending process.

Yet further, the eight-bit information item of "Type2_blending_coefficient_e" is arranged in "Data Byte 12." This information item indicates the coefficient "e" (coefficient for the base-layer pixels) in the "Type2 blending process" being the special blending process. Yet further, the eight-bit information item of "Type2_blending_coefficient_f" is arranged in "Data Byte 13." This information item indicates the coefficient "f" (coefficient for the enhanced pixels) in the "Type2 blending process" being the special blending process.

Figure 35:
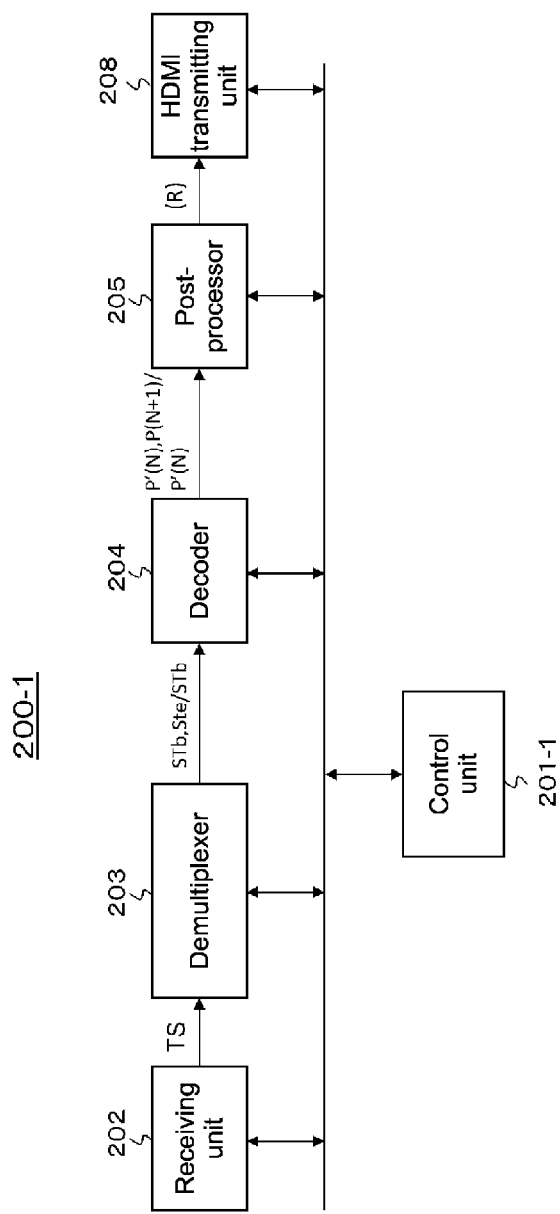
FIG. 35 is a block diagram shows a configuration example of the set-top box.

FIG. 35 shows a configuration example of the set-top box 200-1. In FIG. 35, the parts corresponding to those in FIG. 23 are denoted by the same reference symbols. This set-top box 200-1 includes a control unit 201-1, the receiving unit 202, the demultiplexer 203, the decoder 204, the post-processor 205, and an HDMI transmitting unit 208.

The control unit 201-1 controls operations of the units in the set-top box 200-1. The receiving unit 202 acquires the transport stream TS by demodulating the RF-modulated signal received via the receiving antenna, and transmits the transport stream TS to the demultiplexer 203.

Depending on whether or not the display 200-2 is compatible with the moving-image data item at the high frame rate (120 Hz), the demultiplexer 203 extracts, by filtering the PIDs, both the base stream STb and the enhanced stream STe, or only the base stream STb.

When the base stream STb and the enhanced stream STe are extracted in the demultiplexer 203, the decoder 204 executes the decoding process on the base stream STb so as to generate the image data item P'(N) of each of the frames corresponding to the normal frame rate, and executes the decoding process on the enhanced stream STe so as to generate the image data item P(N+1) of each of the enhanced frames corresponding to the high frame rate.

Further, at this time, the decoder 204 extracts the parameter set and the SEI that are inserted into each of the access units of each of the base stream STb and the enhanced stream STe, and transmits these information items to the control unit 201-1. In this case, the "Blend_and_range_information SEI messages" (refer to FIG. 19) each containing the information item of the blending rate (coefficient set) of each of the frames, and the range information item of the image data item are also extracted.

With this, the control unit 201-1 is allowed to recognize the information items of the blending rates (coefficient sets) of each of the frames and the range information item of each of the image data items, and hence is allowed to appropriately determine which type of the unblending processes (reverse blending processes) to apply on the pixel-by-pixel basis when the unblending process (reverse blending process) is executed in the post-processor 205. In addition, the control unit 201-1 is allowed to appropriately set the filtering coefficients in accordance with the types the unblending processes. Further, the control unit 201-1 is allowed to obtain, from the "Blend_and_range_information SEI message," various information items that are arranged in the "HFR Blending InfoFrame" at the time of transmitting the "HFR Blending InfoFrame" to the display 200-2.

Further, in the case where only the base stream STb is extracted in the demultiplexer 203, the decoder 204 executes the decoding process on this base stream STb. With this, the image data item P'(N) of each of the frames corresponding to the normal frame rate is obtained.

In the case where the display 200-2 is compatible with the moving-image data item at the high frame rate, and does not have the function of the unblending process, the post-processor 205 executes the unblending processes on the image data items P'(N) and P(N+1) obtained in the decoder 204. With this, the unblended moving-image data item R at the high frame rate is obtained.

The HDMI transmitting unit 208 transmits, by communication using HDMI, an uncompressed moving-image data item to the display 200-2 via the HDMI transmission path. Note that, in the case where the display 200-2 is compatible with the moving-image data item at the high frame rate, and does not have the function of the unblending process, the moving-image data item R unblended in the post-processor 205 is transmitted to the display 200-2 via the HDMI transmission path.

Further, in the case where the display 200-2 is compatible with the moving-image data item at the high frame rate, and has the function of the unblending process, the image data items P'(N) and P(N+1) obtained in the decoder 204 are transmitted to the display 200-2 via the HDMI transmission path. In this case, the unblending process is executed on the display 200-2 side, and hence the "HFR Blending InfoFrames" containing the information items of the blending rates (refer to FIG. 33) are transmitted under the state of being inserted into the blanking periods of the image data items of the frames of the image data items P'(N) and P(N+1).

Still further, in the case where the display 200-2 is compatible with the moving-image data item at the normal frame rate, the image data item P'(N) of each of the frames corresponding to the normal frame rate, which is obtained in the decoder 204, is transmitted to the display 200-2 via the HDMI transmission path.

Figure 36:
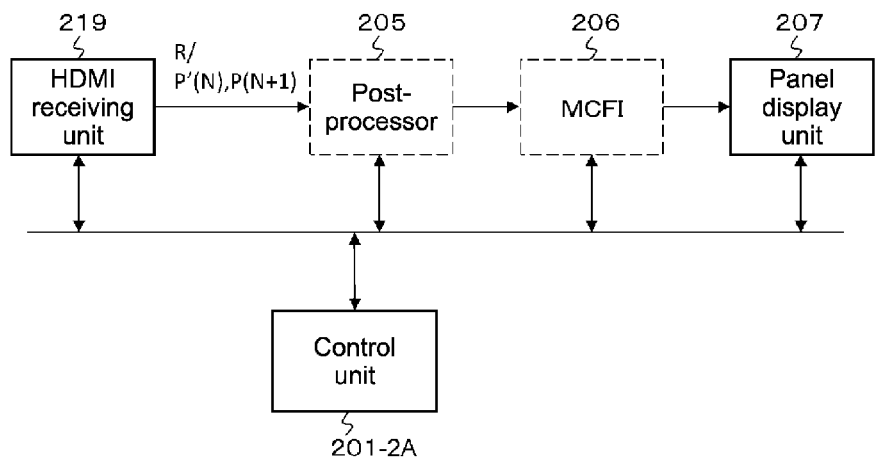
FIG. 36 is a block diagram showing a configuration example of the display compatible with the moving-image data item at the high frame rate.

FIG. 36 shows a configuration example of the display 200-2A compatible with the moving-image data item at the high frame rate. In FIG. 36, the parts corresponding to those in FIG. 23 are denoted by the same reference symbols. This display 200-2A includes a control unit 201-2A, an HDMI receiving unit 219, the post-processor 205, the MCFI unit 206, and the panel display unit 207. Note that the post-processor 205 may be omitted.

The control unit 201-2A controls operations of the units in the display 200-2A. The HDMI receiving unit 219 receives, by the communication using HDMI, the uncompressed moving-image data item at the high frame rate from the set-top box 200-1 via the HDMI transmission path. Note that, in the case where the post-processor 205 is omitted, the unblended moving-image data item R is received.

Meanwhile, in the case where the post-processor 205 is provided, the image data items P'(N) and P(N+1) that have been subjected to the blending process are received. In this case, the "HFR Blending InfoFrame" inserted into the blanking period of each of the image data items P'(N) and P(N+1) (refer to FIG. 33) is extracted and transmitted to the control unit 201-2A. With this, the control unit 201-1A is allowed to recognize the information items of the blending rates (coefficient sets) of each of the frames and the range information item of each of the image data items, and hence is allowed to appropriately determine which type of the unblending processes (reverse blending processes) to apply on the pixel-by-pixel basis when the unblending process (reverse blending process) is executed in the post-processor 205. In addition, the control unit 201-1A is allowed to appropriately set the filtering coefficients in accordance with the types the unblending processes.

Under control by the control unit 201-2A, the post-processor 205 executes the unblending processes (reverse blending processes) on the image data items P'(N) and P(N+1) received by the HDMI receiving unit 219. With this, the unblended moving-image data item R at the high frame rate is obtained.

The MCFI unit 206 executes the motion-compensated frame interpolation process on the moving-image data item R at the high frame rate, which is received by the HDMI receiving unit 219 or obtained in the post-processor 205. With this, a moving-image data item at a much higher rate is obtained. Note that this MCFI unit 206 may be omitted. The panel display unit 207 displays images of the moving-image data item R at the high frame rate, which is received by the HDMI receiving unit 219 or obtained in the post-processor 205, or images of the moving-image data item increased in frame rate in the MCFI unit 206.

Figure 37:
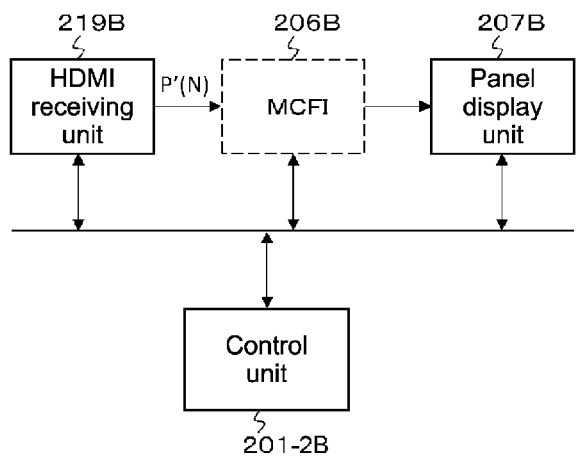
FIG. 37 is a block diagram showing a configuration example of the display compatible with the moving-image data item at the normal frame rate.

FIG. 37 shows a configuration example of the display 200-2B compatible with the moving-image data item at the normal frame rate. In FIG. 37, the parts corresponding to those in FIG. 23 are denoted by the same reference symbols. This display 200-2B includes a control unit 201-2B, an HDMI receiving unit 219B, the MCFI unit 206B, and the panel display unit 207B.

The control unit 201-2B controls operations of the units in the display 200-2B. The HDMI receiving unit 219B receives, by the communication using HDMI, an uncompressed moving-image data item P'(N) at the normal frame rate from the set-top box 200-1 via the HDMI transmission path.

The MCFI unit 206B executes the motion-compensated frame interpolation process on the moving-image data item P'(N) at the normal frame rate, which are received by the HDMI receiving unit 219B. With this, a moving-image data item at a higher rate is obtained. Note that this MCFI unit 206B may be omitted. The panel display unit 207B displays images of the moving-image data item at the normal frame rate, which is received by the HDMI receiving unit 219B, or images of the moving-image data item increased in frame rate in the MCFI unit 206B.

As described hereinabove, in the transmitting-and-receiving system 10A shown in FIG. 29, in the case where the image data items P'(N) and P(N+1) that have been subjected to the blending process are transmitted to the display 200-2, the "HFR Blending InfoFrames" containing the information items of the blending rates of the frames (refer to FIG. 33) are transmitted together. Thus, in the display 200-2, the unblending process is executed on the image data items P'(N) and P(N+1) on the basis of the information items of the blending rates of the frames and the range information item of each of the image data items. With this, the unblended moving-image data item can be easily obtained, and this moving image can be satisfactorily displayed.

3. Third Embodiment (Transmitting-and-Receiving System)

In the embodiments described hereinabove, in the transmitting apparatus 100, the blending process is executed on the moving-image data item P at the high frame rate, and the image data items P'(N) and P(N+1) after the blending process are transmitted therefrom. However, in the case where the receiving side is compatible with the moving-image data item at the normal frame rate, it is also conceivable to transmit the moving-image data item P at the high frame rate as it is from the transmitting side, and to convert the frame rate by executing the blending process on the receiving side.

Figure 38:
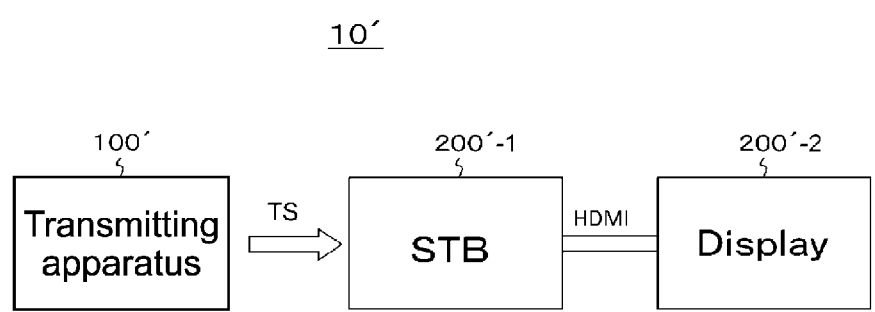
FIG. 38 is a block diagram showing a configuration example of a transmitting-and-receiving system according to a third embodiment.

FIG. 38 shows a configuration example of a transmitting-and-receiving system 10'. This transmitting-and-receiving system 10' includes a transmitting apparatus 100', a set-top box (STB) 200'-1, and a display 200'-2. The set-top box (STB) 200'-1 and the display 200'-2 are connected to each other via the HDMI.

The transmitting apparatus 100' transmits the transport stream TS as a container via a broadcast wave. This transport stream TS contains a video stream that is obtained by encoding a moving-image data item at the high frame rate of, for example, 120 Hz or 240 Hz, more specifically, at 120 Hz in this embodiment.

The set-top box 200'-1 receives the above-mentioned transport stream TS that is transmitted via the broadcast wave from the transmitting apparatus 100'. In a case where the display 200'-2 is compatible with the moving-image data item at the high frame rate (120 Hz), the set-top box 200'-1 decodes the video stream contained in the transport stream TS. With this, the moving-image data item at the high frame rate is obtained and transmitted to the display 200'-2.

Meanwhile, in a case where the display 200'-2 is compatible with the moving-image data item at the normal frame rate (60 Hz), the set-top box 200'-1 decodes the video stream contained in the transport stream TS. The moving-image data item at the high frame rate (120 Hz) obtained in this way is subjected to rate conversion. With this, the moving-image data item at the normal frame rate is obtained and transmitted to the display 200'-2. In this case, at the time of acquiring the image data items corresponding to the normal frame rate, the process of blending the image data items of peripheral frames is executed such that a stroboscopic effect and the like are restrained.

Figure 39:
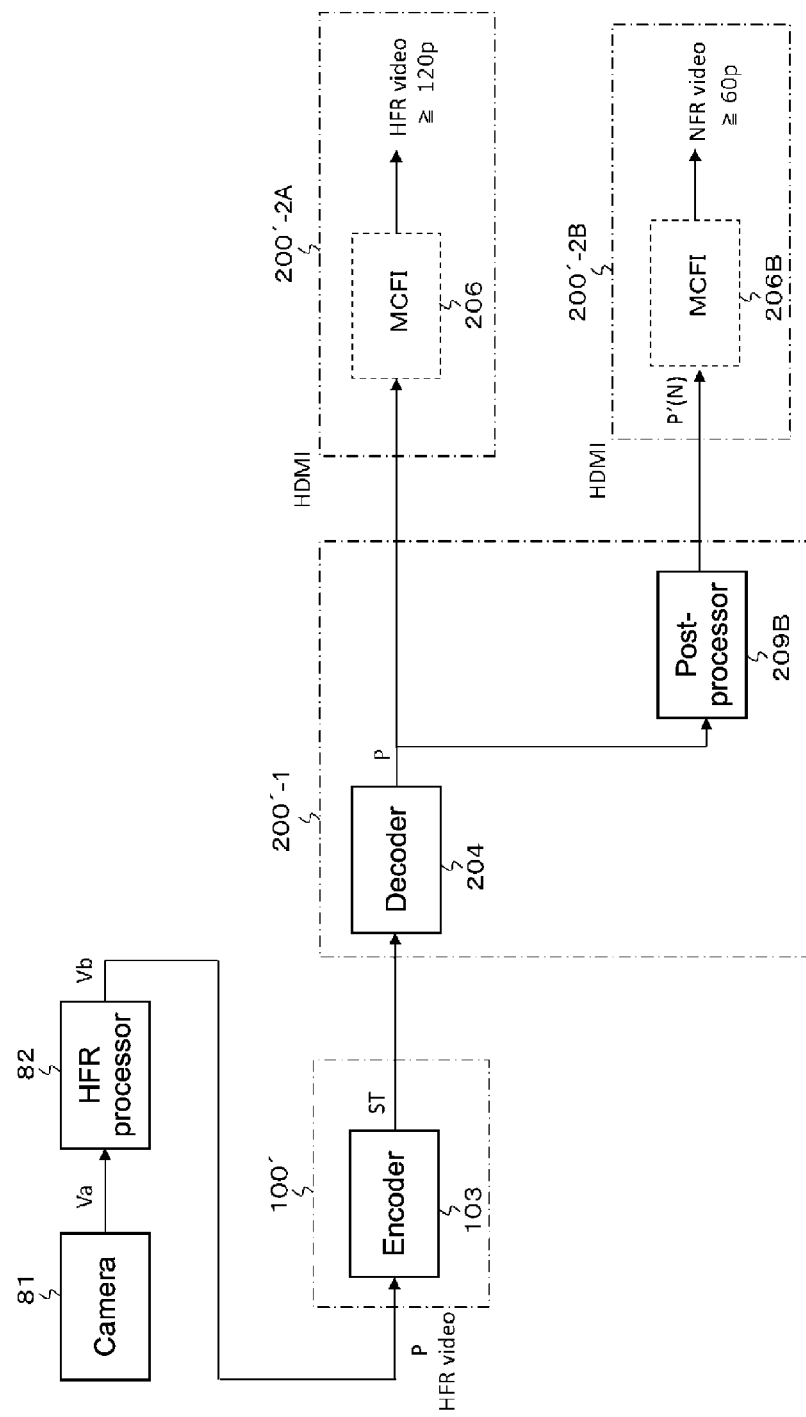
FIG. 39 is a schematic diagram showing processes by a transmitting apparatus, a set-top box, and displays.

FIG. 39 schematically shows processes by the transmitting apparatus 100', the set-top box 200'-1, and the displays 200'-2 (200'-2A and 200'-2B). The moving-image data item Va at a higher frame rate, which is output from the camera (imaging apparatus) 81, is transmitted to the HFR processor 82. With this, the moving-image data item Vb at the high frame rate (120 Hz) is obtained. This moving-image data item Vb is input as the moving-image data item P to the transmitting apparatus 100'. In the transmitting apparatus 100', the encoder 103 executes the encoding process on the moving-image data item P. With this, a video stream ST is obtained. This video stream ST is transmitted from the transmitting apparatus 100' to the set-top box 200'-1.

In the set-top box 200'-1, the decoder 204 executes the decoding process on the video stream ST. With this, the moving-image data item P at the high frame rate is obtained. In the set-top box 200'-1, this moving-image data item P is transmitted as it is, via the HDMI transmission path, to the display 200'-2A compatible with the moving-image data item at the high frame rate (120 Hz).

Further, in the set-top box 200'-1, a post-processor 209B executes the blending process on, among the image data items of the frames of the moving-image data item P, the image data item of each of the frames corresponding to the normal frame rate. With this, the image data item P'(N) of each of the frames corresponding to the normal frame rate is obtained. In the set-top box 200'-1, these image data items P'(N) are transmitted, via the HDMI transmission path, the display 200'-2B compatible with the moving-image data item at the normal frame rate (60 Hz).

In the display 200'-2A, the moving-image data item P is used as it is as a displaying moving-image data item, or converted to the same by being increased in frame rate through the frame interpolation in the motion-compensated frame interpolation (MCFI) unit 206. Further, in the display 200'-2B, the moving-image data item including the image data items P'(N) is used as it is as a displaying moving-image data item, or converted to the same by being increased in frame rate through the frame interpolation in the motion-compensated frame interpolation (MCFI) unit 206B.

Figure 40:
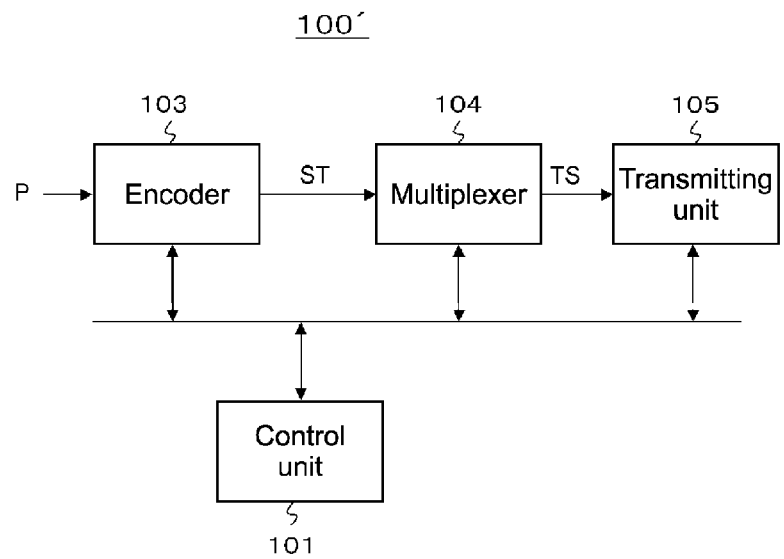
FIG. 40 is a block diagram showing a configuration example of the transmitting apparatus.

FIG. 40 shows a configuration example of the transmitting apparatus 100'. In FIG. 40, the parts corresponding to those in FIG. 11 are denoted by the same reference symbols. This transmitting apparatus 100' includes the control unit 101, the encoder 103, the multiplexer 104, and the transmitting unit 105. The control unit 101 controls operations of the units in the transmitting apparatus 100'.

In the encoder 103, the encoding process is executed on the moving-image data item P at the high frame rate. With this, the video stream ST is generated. In this case, the predictive encoding processes such as H.264/AVC and H.265/HEVC are executed on the moving-image data item P.

In the multiplexer 104, the video stream ST generated in the encoder 103 is packetized into the packetized elementary stream (PES) packets, and further into the transport packets to be multiplexed. In this way, the video stream ST as a multiplexed stream is obtained. In the transmitting unit 105, this transport stream TS is modulated, for example, in accordance with the modulation scheme suited to the broadcasting, such as QPSK and OFDM, and the RF signal is transmitted via the transmitting antenna.

Figure 41:
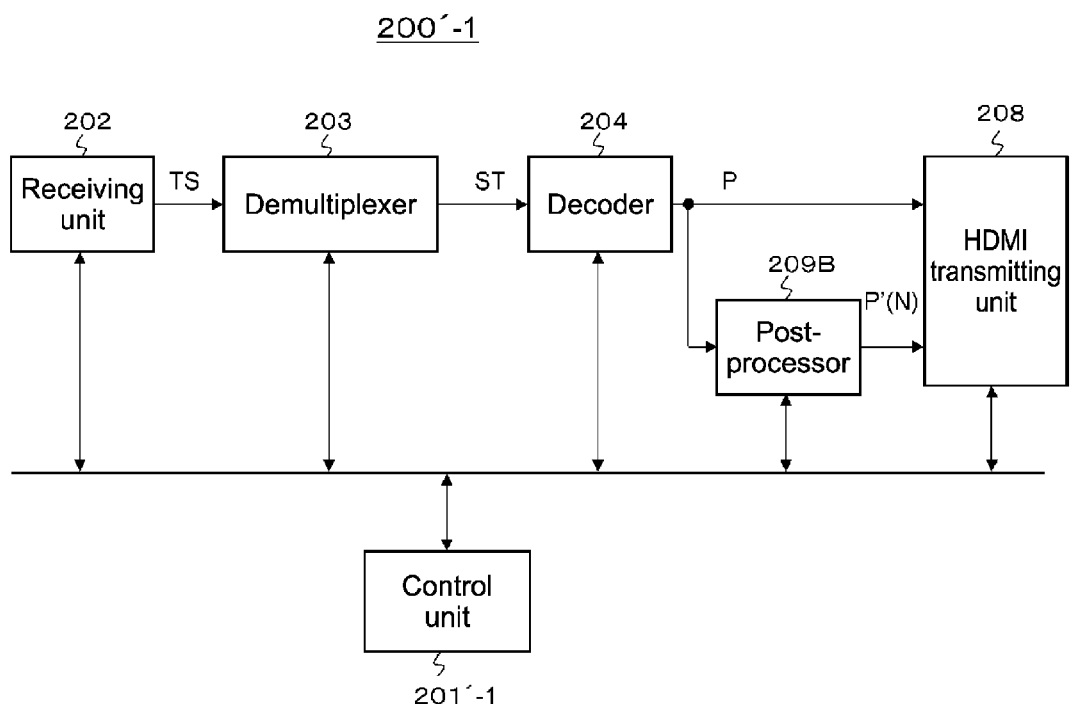
FIG. 41 is a block diagram showing a configuration example of the set-top box.

FIG. 41 shows a configuration example of the set-top box 200'-1. In FIG. 41, the parts corresponding to those in FIG. 23 and FIG. 35 are denoted by the same reference symbols. This set-top box 200'-1 includes a control unit 201'-1, the receiving unit 202, the demultiplexer 203, the decoder 204, the post-processor 209B, and the HDMI transmitting unit 208.

The control unit 201'-1 controls operations of the units in the set-top box 200'-1. In the receiving unit 202, the transport stream TS is acquired by demodulating the RF-modulated signal received via the receiving antenna. In the demultiplexer 203, the video stream ST is extracted from the transport stream TS by filtering the PIDs, and then supplied to the decoder 204.

In the decoder 204, the decoding process is executed on the video stream ST. With this, the moving-image data item P at the high frame rate is obtained. Further, in the post-processor 209B, among the image data items of the frames of the moving-image data item P, the image data item of each of the frames corresponding to the normal frame rate is subjected to the blending process. With this, the image data item P'(N) of each of the frames corresponding to the normal frame rate is obtained.

In the HDMI transmitting unit 208, by the communication using HDMI, the uncompressed moving-image data items are transmitted to the displays 200'-2A and 200'-2B via the HDMI transmission path. In this case, the moving-image data item P obtained in the decoder 204 is transmitted, via the HDMI transmission path, to the display 200'-2A compatible with the moving-image data item at the high frame rate (120 Hz). Meanwhile, the image data items P'(N) obtained in the post-processor 209B are transmitted, via the HDMI transmission path, to the display 200'-2B compatible with the moving-image data item at the normal frame rate (60 Hz).

Figure 42:
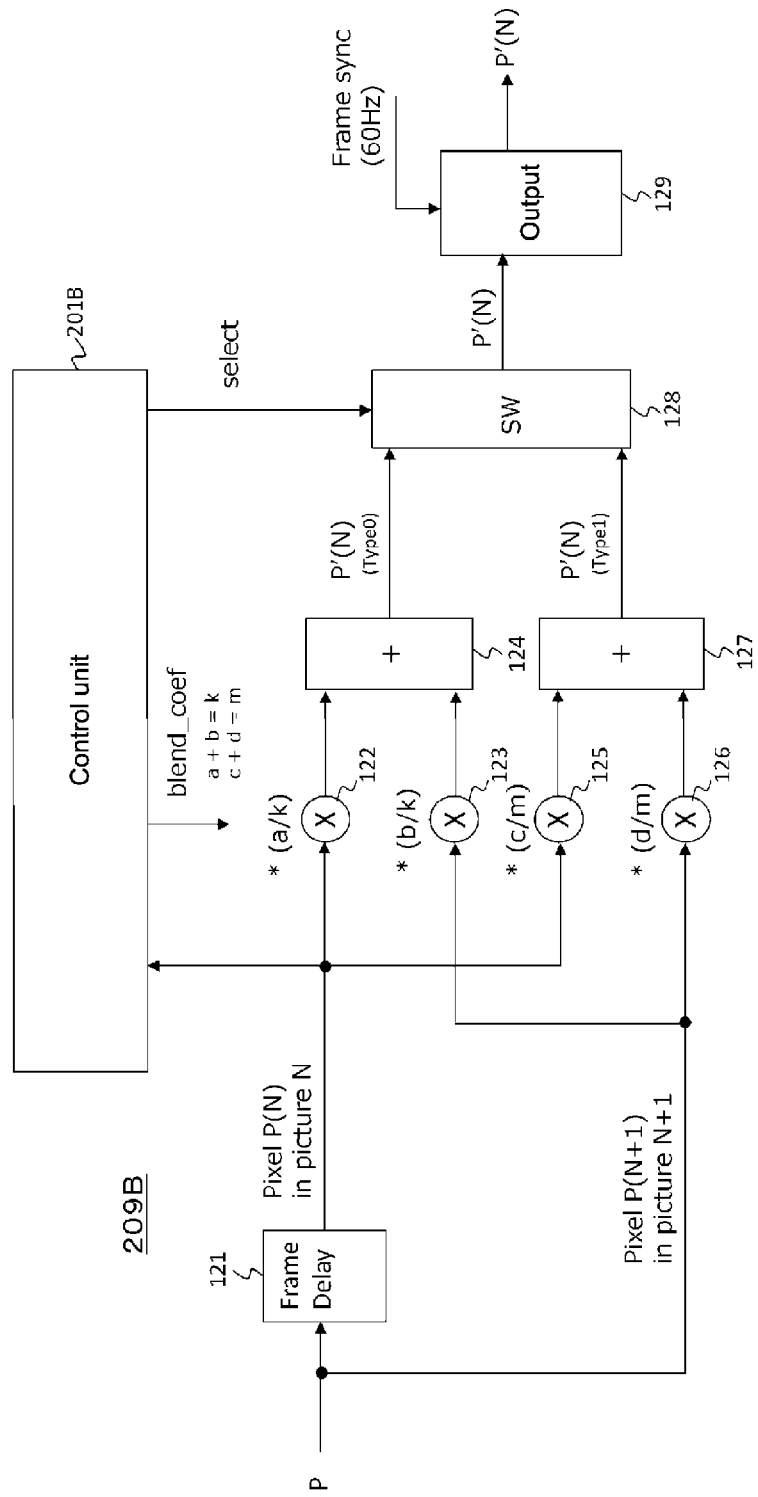
FIG. 42 is a block diagram showing a configuration example of another post-processor in the case where the novel method 1 is employed as the method of determining the blending rates.

FIG. 42 shows a configuration example of the post-processor 209B. Although not described in detail, this post-processor 209B has the same configuration and performs the same operations as those of the pre-processor 102 shown in FIG. 12 except that the output system for the image data items P(N+1) is omitted. With this, the image data items P'(N) are obtained. Note that this post-processor 209B is different from the pre-processor 102 of FIG. 12 also in that the pixel processing unit 120 may be bypassed in a case where it is unnecessary to take into consideration the determination based on the image data items P'(N) as to whether or not the pixel values are within one of the special-blending-process target ranges.

Figure 43:
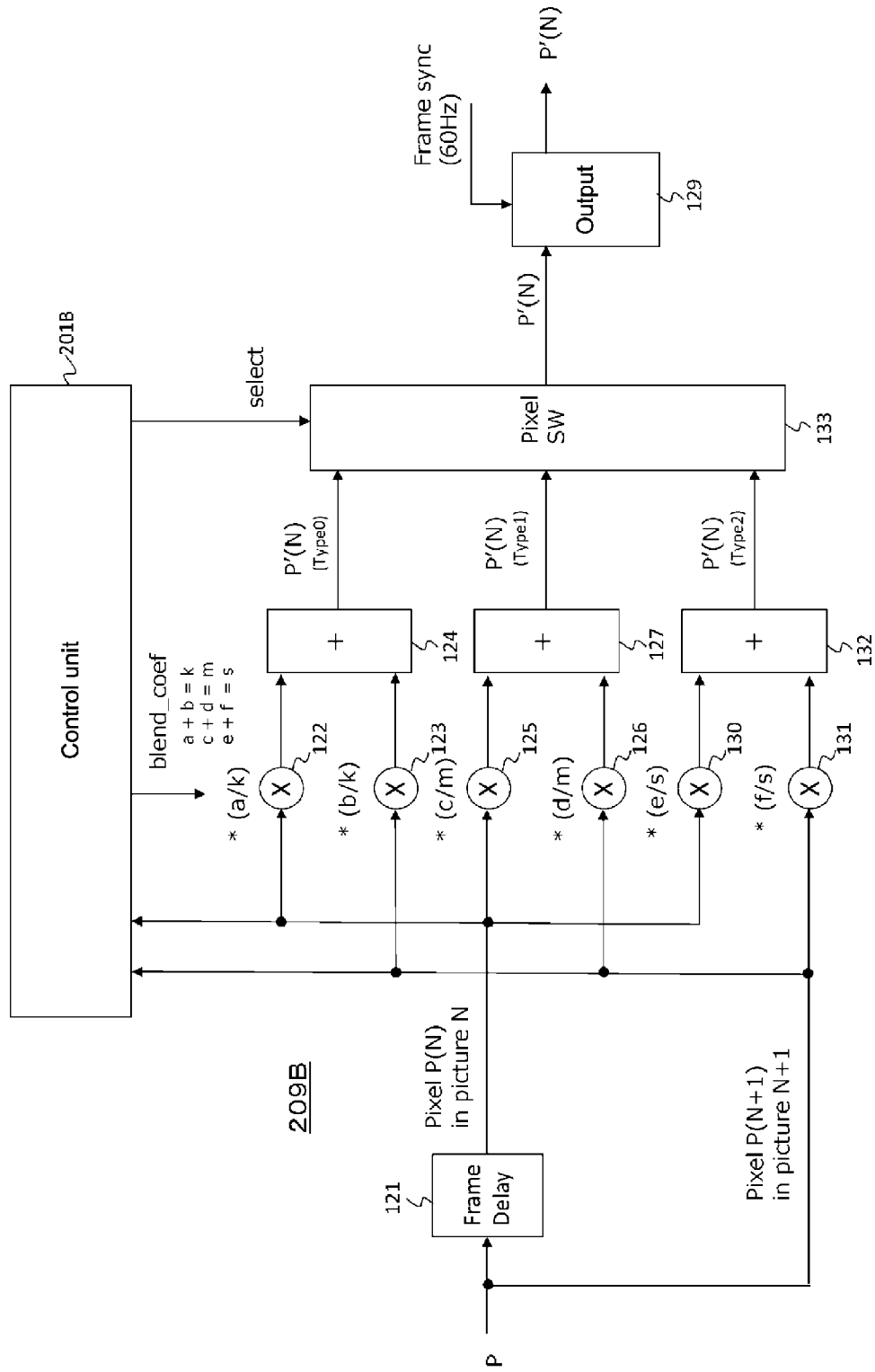
FIG. 43 is a block diagram showing another configuration example of the other post-processor in the case where the novel method 2 is employed as the method of determining the blending rates.

Further, FIG. 43 shows another configuration example of the post-processor 209B. Although not described in detail, this post-processor 209B has the same configuration and performs the same operations as those of the pre-processor 102 shown in FIG. 16 except that the output system for the image data items P(N+1) is omitted. With this, the image data items P'(N) are obtained. Note that this post-processor 209B is different from the pre-processor 106 of FIG. 12 also in that the pixel processing unit 120 may be bypassed in the case where it is unnecessary to take into consideration the determination based on the image data items P'(N) as to whether or not the pixel values are within one of the special-blending-process target ranges. Note that the information item of "Blend_and_range_information SEI message" need not be added to the output of the post-processor 209B.

Figure 44:
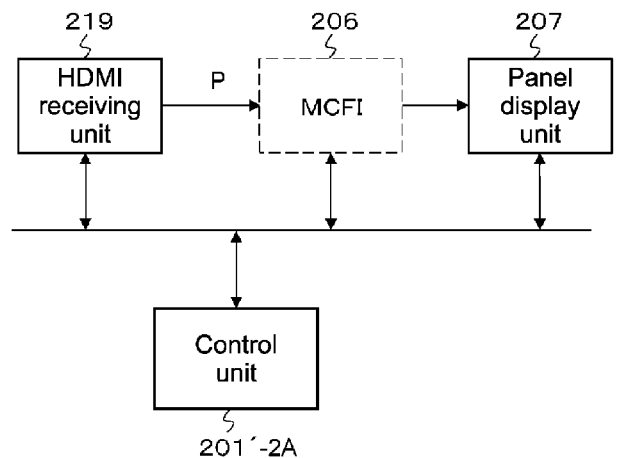
FIG. 44 is a block diagram showing a configuration example of the display compatible with the moving-image data item at the high frame rate.

FIG. 44 shows a configuration example of the display 200'-2A compatible with the moving-image data item at the high frame rate (120 Hz). This display 200'-2A includes a control unit 201'-2A, the HDMI receiving unit 219, the MCFI unit 206, and the panel display unit 207.

The control unit 201'-2A controls operations of the units in the display 200'-2A. The HDMI receiving unit 219 receives, by the communication using HDMI, an uncompressed moving-image data item P at the high frame rate from the set-top box 200'-1 via the HDMI transmission path.

In the MCFI unit 206, the motion-compensated frame interpolation process is executed on the moving-image data item P at the high frame rate, which is received by the HDMI receiving unit 219. With this, a moving-image data item at a higher rate is obtained. Note that this MCFI unit 206 may be omitted. In the panel display unit 207, images of the moving-image data item P at the high frame rate, which is received by the HDMI receiving unit 219, or images of the moving-image data item increased in frame rate in the MCFI unit 206 are displayed.

Figure 45:
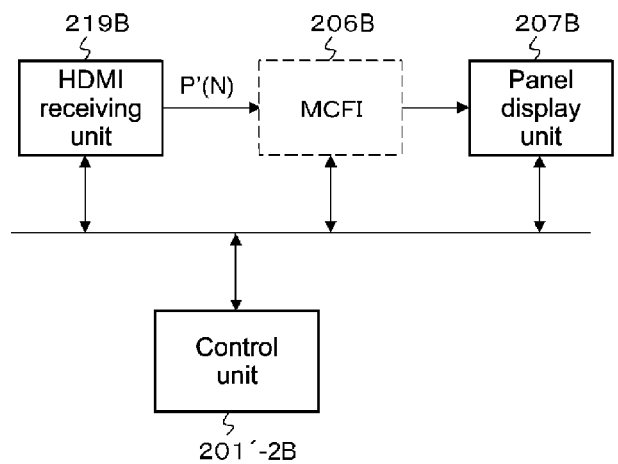
FIG. 45 is a block diagram showing a configuration example of the display compatible with the moving-image data item at the normal frame rate.

FIG. 45 shows a configuration example of the display 200'-2B compatible with the moving-image data item at the normal frame rate (60 Hz). This display 200'-2B includes a control unit 201'-2B, the HDMI receiving unit 219B, the MCFI unit 206B, and the panel display unit 207B. This display 200'-2B has the same configuration as that of the display 200-2B described above with reference to FIG. 37, and hence description thereof is omitted.

As described hereinabove, in the transmitting-and-receiving system 10' shown in FIG. 38, among the image data items of the frames of the moving-image data item P at the high frame rate (120 Hz), the image data item of each of the frames corresponding to the normal frame rate is subjected to the blending process by the post-processor 209B. With this, the image data item P'(N) of each of the frames corresponding to the normal frame rate is obtained. With this, the display 200'-2B, which is compatible with the moving-image data item at the normal frame rate (60 Hz) and to which these image data items P'(N) are supplied, is allowed to smoothly display the images of the moving image. Further, the image-quality problem as a result of the frame interpolation process including the low-load calculation in the display process can be avoided.

Further, by blending the image data item P(N) of each of the frames corresponding to the normal frame rate with the image data item P(N+1) at the blending rate in accordance with the data level, the image data item P'(N) of each of the frames corresponding to the normal frame rate is obtained. Thus, the original texture of the images, such as the high dynamic range (HDR) effect, can be prevented from being impaired by the blending processes.

4. Modification

Note that, as a general pattern of the blending process, the blending process need not necessarily be executed only on the picture P(N) of the pictures P(N) and P(N+1), and may be executed on the picture P(N+1).

In that case, the blending rates in the blending of the image data item P(N) and blending rates in the blending of the image data item P(N+1) may be set independently of each other. The image data items P'(N) and P'(N+1) are expressed as follows.

$$P'(N)=A*P(N)+B*P(N+1)$$

$$P'(N+1)=a*P(N)+b*P(N+1)$$

where "A" is "blending_coef_a" for the image data item P(N) in the case where the image data item P(N) is a blending target, "B" is "blending_coef_b" for the image data item P(N+1) in the same case, "a" is "blending_coef_a" for the image data item P(N) in the case where the image data item P(N+1) is a blending target, and "b" is "blending_coef_b" for the image data item P(N+1) in the same case.

In the pre-processor (Preproc), these relationships are represented also by the following general matrix.

$$\begin{bmatrix} P'(N) \\ P'(N+1) \end{bmatrix} = \begin{bmatrix} A & B \\ a & b \end{bmatrix} * \begin{bmatrix} P(N) \\ P(N+1) \end{bmatrix} \quad \text{[Math. 1]}$$

Further, in the post-processor (Postproc), the relationships are represented as follows.

$$\begin{bmatrix} P''(N) \\ P''(N+1) \end{bmatrix} = \begin{bmatrix} A & B \\ a & b \end{bmatrix}^{-1} * \begin{bmatrix} P'(N) \\ P'(N+1) \end{bmatrix} \quad \text{[Math. 2]}$$

"Blending_coef_c," "Blending_coef_d," "Blending_coef_e," and "Blending_coef_f" also can be expressed in the same way. Note that flowcharts are the same as those in the cases where P(N) is a blending target except that P(N) and P(N+1) are replaced with each other.

Figure 46:
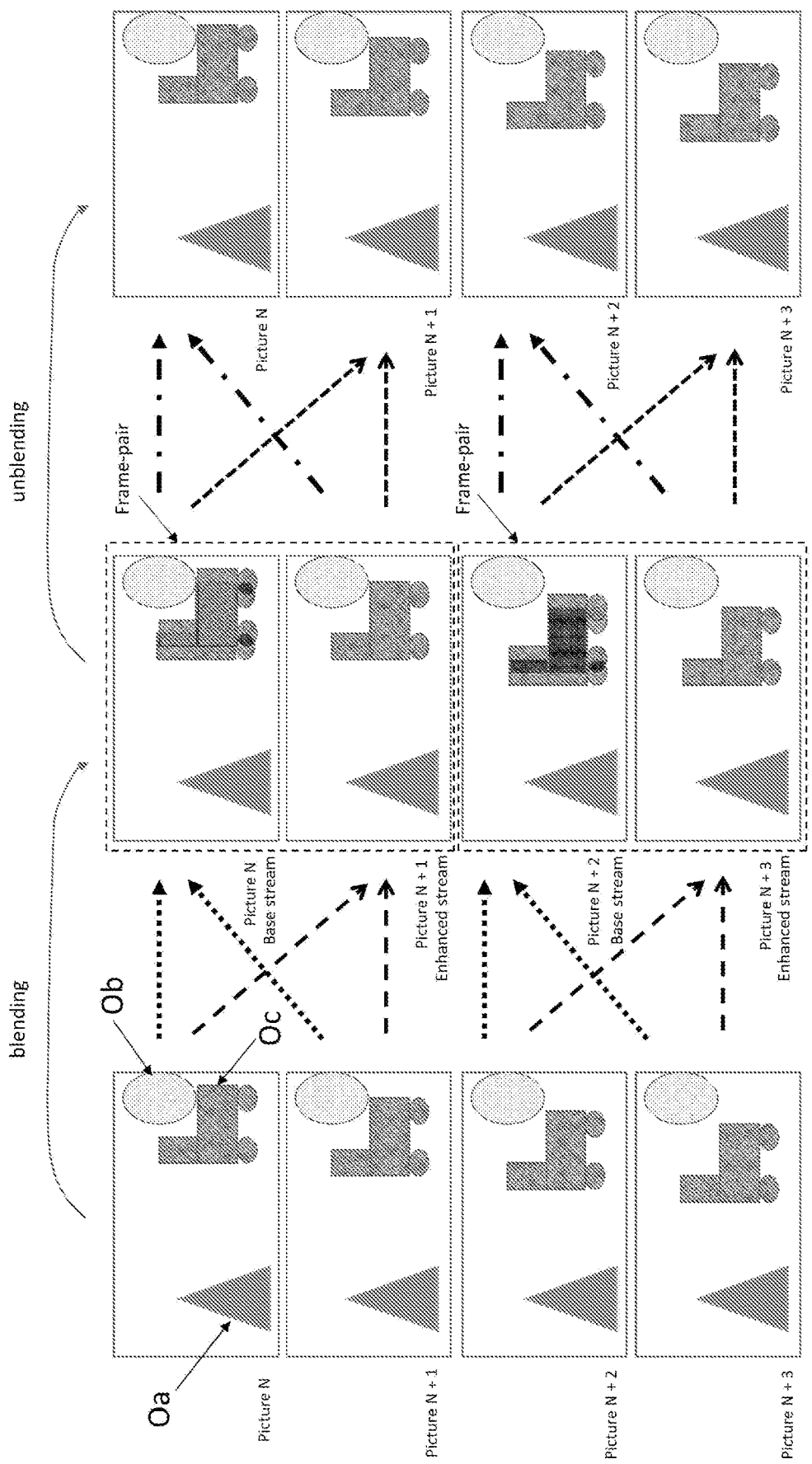
FIG. 46 is a schematic illustration of an example of the blending on the transmitting side and the unblending on the receiving side in a general pattern of the blending process.

FIG. 46 schematically illustrates an example of the blending on the transmitting side and the unblending on the receiving side in the general pattern of the blending process. This example corresponds to the example in (b) of FIG. 2, specifically, the picture "N" and the picture "N+1" form a frame pair, and the picture "N+2" and the picture "N+3" form another frame pair. Note that, in the illustrated example, the objects Oa and Ob are static objects, and the object Oc is a moving object.

In each of the frame pairs, by the blending process on the transmitting side, an image data item of a first frame, specifically, an image data item of a frame of the base stream, is blended at a predetermined blending rate with an image data item of an enhanced frame (blended state). Similarly, an image data item of a frame subsequent thereto, specifically, the image data item of the frame subsequent thereto of the enhanced stream is blended at a predetermined blending rate with the image data item of the base frame (blended state).

FIG. 47A and FIG. 47B each show a method of arranging SEIs in the general pattern of the blending process. FIG. 47A shows a first method. This first method is a method of arranging an SEI of a group (base sublayer) in which P(N) is a blending target, and an SEI of a group (enhanced sublayer) in which P(N+1) is a blending target respectively into these sublayers.

FIG. 47B shows a second method. This second method is a method of arranging the SEI of the group (base sublayer) in which P(N) is a blending target, and the SEI of the group (enhanced sublayer) in which P(N+1) is a blending target into one of these sublayers. In order that the blending target can be identified in either one of the methods, elements "blending_target" are defined in a syntax of each of the SEIs.

FIG. 48 shows a structural example of "Blend_and_range_information SEI message" in the general pattern of the blending process. This structural example is the same as the structural example shown in FIG. 19 except that the element "blending_target" is newly defined. For example, "0" indicates the base sublayer, and "1" indicates a first enhanced sublayer. FIG. 49 shows a structural example of "HFR Blending InfoFrame" in the general pattern of the blending process. This structural example is the same as the structural example shown in FIG. 33 except that the element "blending_target" is newly defined.

Note that the combinations of the frame rates are not limited to those of the examples in the embodiments described hereinabove, that is, not limited to the high frame rate of 120 Hz or 240 Hz and the normal frame rate of 60 Hz. For example, there may be employed combinations of 100 Hz or 200 Hz and 50 Hz. Further, description of the embodiments, which is made hereinabove with a focus on the luminance, may be made with a focus on colors. In that case, the similar processes are executed in an RGB domain.

Further, the configuration of the transmitting-and-receiving system to which the present technology is applicable is not limited to those of the systems in the embodiments described hereinabove, that is, not limited to the transmitting-and-receiving system 10 including the transmitting apparatus 100 and the television receiver 200, or to the transmitting-and-receiving system 10A including the transmitting apparatus 100, the set-top box 200-1, and the display 200-2.

Still further, in the examples in the embodiments described hereinabove, the container is the transport stream (MPEG-2 TS). However, the present technology is applicable also to systems that perform distribution to receiving terminals by utilizing networks such as the Internet. Containers in other formats such as MP4 are frequently used in distribution via the Internet. More specifically, as examples of the containers, there may be mentioned containers in various formats such as the transport stream (MPEG-2 TS) and MPEG Media Transport (MMT) that are employed as digital broadcasting standards, and ISOBMFF (MP4) used in the distribution via the Internet.

The present technology may also provide the following configurations.

(1) A transmission apparatus comprising:
circuitry configured to
perform processing of mixing, at a mixing rate, pixels of each frame of first video data with pixels of one or more peripheral frames of the first video data and obtain second video data at a first frame rate, wherein the mixing rate for each pixel of the respective frame of the first video data is based on a luminance value of the respective pixel,
the second video data including frames corresponding to a second frame rate that is lower than the first frame rate, the frames corresponding to the second frame rate being mixed with the peripheral frames, and
the circuitry is further configured to
encode the frames corresponding to the second frame rate to obtain a basic stream and encode remaining frames of the second video data to obtain an extended stream,
insert information about the mixing rate for each pixel of the respective frame of the first video data into the basic stream and the extended stream in association with the respective frame, and
transmit the basic stream and the extended stream into which the information about the mixing rate has been inserted.

(2) The transmission apparatus according to Item (1), wherein the information about the mixing rate for each pixel of the respective frame of the first video data includes plural mixing rates and a corresponding luminance range for at least one of the mixing rates.

(3) The transmission apparatus according to Item (1), wherein the basic stream and the extended stream have a Network Abstraction Layer (NAL) unit structure, and
the circuitry is configured to insert a Supplemental Enhancement Information (SEI) NAL unit with the information about the mixing rate into the basic stream and the extended stream.

(4) The transmission apparatus according to Item (1), wherein the circuitry is configured to determine, when performing the processing of mixing the pixels of each frame of the first video data with the pixels of the one or more peripheral frames of the first video data, the mixing rate for each pixel of the respective frame of the first video data based on a luminance value of the respective pixel.

(5) The transmission apparatus according to Item (1), wherein the circuitry is configured to determine, when performing the processing of mixing the pixels of each frame of the first video data with the pixels of the one or more peripheral frames of the first video data, the mixing rate for each pixel of the respective frame of the first video data based on a luminance value of the respective pixel, and based on the luminance values of the pixels of the one or more peripheral frames.

(6) The transmission apparatus according to Item (2), wherein the information about the mixing rate for each pixel of the respective frame of the first video data includes a first luminance threshold and a second luminance threshold, the first luminance threshold and the second luminance threshold defining the corresponding luminance range for at least one of the mixing rates.

(7) The transmission apparatus according to Item (1), wherein the first frame rate is 120 Hz or 240 Hz, and the second frame rate is 60 Hz.

(8) A transmission method comprising:
performing, by circuitry, processing of mixing, at a mixing rate, pixels of each frame of first video data with pixels of one or more peripheral frames of the first video data and obtaining second video data at a first frame rate, wherein the mixing rate for each pixel of the respective frame of the first video data is based on a luminance value of the respective pixel,
the second video data including frames corresponding to a second frame rate that is lower than the first frame rate, the frames corresponding to the second frame rate being mixed with the peripheral frames, and
the transmission method further includes
encoding, by the circuitry, the frames corresponding to the second frame rate to obtain a basic stream and encoding remaining frames of the second video data to obtain an extended stream,
inserting, by the circuitry, information about the mixing rate for each pixel of the respective frame of the first video data into the basic stream and the extended stream in association with the respective frame, and
transmitting, by the circuitry, the basic stream and the extended stream into which the information about the mixing rate has been inserted.

(9) A reception apparatus comprising:
circuitry configured to receive a basic stream and an extended stream, which are obtained by
performing processing of mixing, at a mixing rate, pixels of each frame of first video data with pixels of one or more peripheral frames of the first video data and obtaining second video data at a first frame rate, wherein
the mixing rate for each pixel of the respective frame of the first video data is based on a luminance value of the respective pixel, and the second video data including frames corresponding to a second frame rate that is lower than the first frame rate, the frames corresponding to the second frame rate are mixed with the peripheral frames,
encoding the frames corresponding to the second frame rate to obtain the basic stream, and
encoding remaining frames of the second video data to obtain the extended stream, information about the mixing rate for each pixel of the respective frame of the first video data is included in the basic stream and the extended stream in association with the respective frame, and
the reception apparatus further includes circuitry configured to, based on a frame rate capability of a display connected to the reception apparatus,
decode the basic stream to obtain frames at the second frame rate or
decode the basic stream and the extended stream to obtain the second video data, and obtain mixing-released video data at the first frame rate by performing back mixing processing on the second video data on a basis of the information about the mixing rate.

(10) The reception apparatus according to Item (9), wherein
the information about the mixing rate for each pixel of the respective frame of the first video data includes plural mixing rates and a corresponding luminance range for at least one of the mixing rates, and
the circuitry is configured to perform back mixing processing based on the plural mixing rates and the corresponding luminance range for at least one of the mixing rates.

(11) A reception method comprising:
receiving, by circuitry, a basic stream and an extended stream, which are obtained by performing processing of mixing, at a mixing rate, pixels of each frame of first video data with pixels of one or more peripheral frames of the first video data and obtaining second video data at a first frame rate, wherein the mixing rate for each pixel of the respective frame of the first video data is based on a luminance value of the respective pixel,
the second video data including frames corresponding to a second frame rate that is lower than the first frame rate, the frames corresponding to the second frame rate are mixed with the peripheral frames,
encoding the frames corresponding to the second frame rate to obtain the basic stream, and
encoding remaining frames of the second video data to obtain the extended stream, information about the mixing rate for each pixel of the respective frame of the first video data is included in the basic stream and the extended stream in association with the respective frame, and
the reception method further includes, based on a frame rate capability of a display connected to the reception apparatus, decoding, by the circuitry, the basic stream to obtain frames at the second frame rate, or
decoding the basic stream and the extended stream to obtain the second video data, and obtaining mixing-released video data at the first frame rate by performing back mixing processing on the second video data on a basis of the information about the mixing rate.

(12) A reception apparatus comprising:
circuitry configured to
acquire second video data obtained by performing processing of mixing, at a mixing rate, pixels of each frame of first video data with pixels of one or more peripheral frames of the first video data, wherein the mixing rate for each pixel of the respective frame of the first video data is based on a luminance value of the respective pixel; and
transmit the second video data and information about the mixing rate for each pixel of the respective frame of the first video data to an external device via a transfer path, the information about the mixing rate for each pixel of the respective frame of the first video data includes plural mixing rates and a corresponding luminance range for at least one of the mixing rates.

(13) The reception apparatus according to Item (12), wherein the circuitry is configured to respectively insert the information about the mixing rate for each pixel of the respective frame into a blanking period of the respective frame of the second video data and transmit the second video data.

(14) The reception apparatus according to Item (12), wherein the circuitry is further configured to perform back mixing processing on each frame of the second video data on a basis of the information about the mixing rate to obtain third video data, wherein the circuitry is configured to transmit the third video data instead of the second video data when the external device does not have a function of the back mixing processing.

(15) The reception apparatus according to Item (12), wherein the second video data has a first frame rate,
the second video data including frames corresponding to a second frame rate that is lower than the first frame rate, the frames corresponding to the second frame rate are mixed with the peripheral frames, and
the circuitry is further configured to transmit fourth video data that includes the frames corresponding to the second frame rate instead of the second video data when a frame rate at which display is able to be performed by the external device is the second frame rate.

(16) A reception method comprising:
acquiring, by circuitry, second video data obtained by performing processing of mixing, at a mixing rate, pixels of each frame of first video data with pixels of one or more peripheral frames of the first video data, wherein the mixing rate for each pixel of the respective frame of the first video data is based on a luminance value of the respective pixel; and
transmitting, by the circuitry, the second video data and information about the mixing rate for each pixel of the respective frame of the first video data to an external device via a transfer path, the information about the mixing rate for each pixel of the respective frame of the first video data includes plural mixing rates and a corresponding luminance range for at least one of the mixing rates.

(17) A reception apparatus comprising:
circuitry configured to
receive second video data obtained by performing processing of mixing, at a mixing rate, pixels of each frame of first video data with pixels of one or more peripheral frames of the first video data, and information about a mixing rate for each pixel of the respective frame of the first video data from an external device via a transfer path, wherein the mixing rate for each pixel of the respective frame of the first video data is based on a luminance value of the respective pixel; and
obtain mixing-released video data by performing back mixing processing on each frame of the second video data on a basis of the information about the mixing rate, the information about the mixing rate for each pixel of the respective frame of the first video data includes plural mixing rates and a corresponding luminance range for at least one of the mixing rates.

(18) A reception method comprising:
receiving, by circuitry, second video data obtained by performing processing of mixing, at a mixing rate, pixels of each frame of first video data with pixels of one or more peripheral frames of the first video data, and information about a mixing rate for each pixel of the respective frame of the first video data from an external device via a transfer path, wherein the mixing rate for each pixel of the respective frame of the first video data is based on a luminance value of the respective pixel; and
obtaining, by the circuitry, mixing-released video data by performing back mixing processing on each frame of the second video data on a basis of the information about the mixing rate, the information about the mixing rate for each pixel of the respective frame of the first video data includes plural mixing rates and a corresponding luminance range for at least one of the mixing rates.

(19) A receiving apparatus, comprising:
a receiver configured to receive a video stream obtained by encoding second video data at a first frame rate; and
circuitry configured to control
decoding the video stream such that the second video data at the first frame rate is obtained, and mixing, at a mixing rate, pixels of each frame of first video data with pixels of one or more peripheral frames of the first video data, the second video data including frames corresponding to a second frame rate that is lower than the first frame rate, the frames corresponding to the second frame rate are mixed with the peripheral frames, such that a basic stream at the second frame rate is obtained.

(20) The receiving apparatus according to claim 19, wherein the mixing rate for each pixel of the respective frame of the first video data is based on a luminance value of the respective pixel.

A main feature of the embodiments of the present technology lies in that, by blending, among the image data items of the frames of the moving-image data item at the high frame rate, at least the image data items of the frames corresponding to the normal frame rate with the image data items of the peripheral frames, and by transmitting the image data items of the frames corresponding to the normal frame rate under this state, that is, under the state of the higher shutter-opening rate, the receiver having the decoding capability to process the moving-image data item at the normal frame rate is allowed to smoothly display the images of this moving image in such a manner that a stroboscopic effect is reduced (refer to FIG. 5). Further, another main feature lies in that, when executing the blending processes, blending is performed at the blending rate in accordance with the data levels and on the pixel-by-pixel basis, whereby the original texture of the images, such as the HDR effect, can be prevented from being impaired by the blending processes (refer to FIG. 12 and FIG. 16).

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10, 10A, 10' Transmitting-and-receiving system
81 Camera
82 HFR processor
100, 100' Transmitting apparatus
101 Control unit
102 Pre-processor
103 Encoder
104 Multiplexer
105 Transmitting unit
120 Pixel processing unit
121 Frame delay unit
122, 125, 126, 130, 131 Coefficient multiplier
124, 127, 132 Adding unit
128, 133 Switching unit
129 Output unit
200, 200A, 200B, 200' Television receiver
200-1, 200'-1 Set-top box
200-2, 200-2A, 200-2B, 200'-2A, 200'-2B Display
201, 201B, 201-1, 201'-1, 201-2A, 201-2B, 201'-2A, 201'-2B Control unit
202, 202B Receiving unit
203, 203B Demultiplexer
204, 204B Decoder
205 Post-processor
206, 206B MCFI unit
207, 207B Panel display unit
208 HDMI transmitting unit
209B Post-processor
219, 219B HDMI receiving unit
220, 221, 223, 224, 230, 231 Coefficient multiplier
222, 225, 232 Adding unit
226, 227, 233 Switching unit

The invention claimed is:

1. A transmission apparatus, comprising:
circuitry configured to
perform blending, at one or more blending rates, pixels of each frame of first video data with pixels of one or more peripheral frames of the first video data and obtain second video data at a first frame rate, the blending rate for each pixel of the respective frame of the first video data being selected from plural candidate blending rates based on a luminance value of the respective pixel, the second video data including frames corresponding to a second frame rate that is lower than the first frame rate, the frames corresponding to the second frame rate being blended with the one or more peripheral frames,
encode the frames corresponding to the second frame rate to obtain a basic stream and encode remaining frames of the second video data to obtain an extended stream,
insert information about the one or more blending rates for blending the pixels of the respective frame of the first video data into the basic stream or the extended stream, and
transmit the basic stream and the extended stream with the information about the one or more blending rates inserted in the basic stream or the extended stream.

2. The transmission apparatus according to claim 1, wherein the information about the one or more blending rates includes the plural candidate blending rates and a corresponding luminance range for at least one of the plural candidate blending rates.

3. The transmission apparatus according to claim 1, wherein the basic stream and the extended stream have a Network Abstraction Layer (NAL) unit structure, and the circuitry is configured to insert a Supplemental Enhancement Information (SEI) NAL unit with the information about the one or more blending rates into the basic stream or the extended stream.

4. The transmission apparatus according to claim 1, wherein the circuitry is configured to determine, when performing the blending the pixels of each frame of the first video data with the pixels of the one or more peripheral frames of the first video data, the blending rate for each pixel of the respective frame of the first video data based on the luminance value of the respective pixel, and based on luminance values of the corresponding pixels of the one or more peripheral frames.

5. The transmission apparatus according to claim 2, wherein the information about the one or more blending rates includes a first luminance threshold and a second luminance threshold, the first luminance threshold and the second luminance threshold defining the corresponding luminance range for the at least one of the plural candidate blending rates.

6. The transmission apparatus according to claim 1, wherein the first frame rate is 120 Hz or 240 Hz, and the second frame rate is 60 Hz.

7. A reception apparatus, comprising:
circuitry configured to
receive a basic stream and an extended stream, which are obtained by
performing blending, at one or more blending rates, pixels of each frame of first video data with pixels of one or more peripheral frames of the first video data and obtaining second video data at a first frame rate, the blending rate for each pixel of the respective frame of the first video data being selected from plural candidate blending rates based on a luminance value of the respective pixel, the second video data including frames corresponding to a second frame rate that is lower than the first frame rate, the frames corresponding to the second frame rate are blended with the one or more peripheral frames, encoding the frames corresponding to the second frame rate to obtain the basic stream, and encoding remaining frames of the second video data to obtain the extended stream, wherein information about the one or more blending rates for blending the pixels of the respective frame of the first video data is included in the basic stream or the extended stream, and the circuitry is further configured to, based on a frame rate capability of a display connected to the reception apparatus, decode the basic stream to obtain the frames corresponding to the second frame rate, or decode the basic stream and the extended stream to obtain the second video data, and obtain unblended video data at the first frame rate by performing a reverse blending process on the second video data on a basis of the information about the one or more blending rates.

8. The reception apparatus according to claim 7, wherein the information about the one or more blending rates includes the plural candidate blending rates and a corresponding luminance range for at least one of the plural candidate blending rates, and the circuitry is configured to perform the reverse blending process based on the plural candidate blending rates and the corresponding luminance range for the at least one of the plural candidate blending rates.

9. A reception method comprising:

receiving, by circuitry of a reception apparatus, a basic stream and an extended stream, which are obtained by performing blending, at one or more blending rates, pixels of each frame of first video data with pixels of one or more peripheral frames of the first video data and obtaining second video data at a first frame rate, the blending rate for each pixel of the respective frame of the first video data being selected from plural candidate blending rates based on a luminance value of the respective pixel, the second video data including frames corresponding to a second frame rate that is lower than the first frame rate, the frames corresponding to the second frame rate are blended with the one or more peripheral frames, encoding the frames corresponding to the second frame rate to obtain the basic stream, and encoding remaining frames of the second video data to obtain the extended stream, wherein information about the one or more blending rates for blending the pixels of the respective frame of the first video data is included in the basic stream or the extended stream, and the reception method further comprises, based on a frame rate capability of a display connected to the reception apparatus, decoding, by the circuitry, the basic stream to obtain the frames corresponding to the second frame rate, or decoding the basic stream and the extended stream to obtain the second video data, and obtaining unblended video data at the first frame rate by performing a reverse blending process on the second video data on a basis of the information about the one or more blending rates.

10. The reception apparatus according to claim 7, wherein the basic stream and the extended stream have a Network Abstraction Layer (NAL) unit structure, and a Supplemental Enhancement Information (SEI) NAL unit with the information about the one or more blending rates is inserted into the basic stream or the extended stream.

11. The reception apparatus according to claim 8, wherein the information about the one or more blending rates includes a first luminance threshold and a second luminance threshold, the first luminance threshold and the second luminance threshold defining the corresponding luminance range for the at least one of the plural candidate blending rates.

12. The reception apparatus according to claim 7, wherein the first frame rate is 120 Hz or 240 Hz, and the second frame rate is 60 Hz.

13. The reception method according to claim 9, wherein the information about the one or more blending rates includes the plural candidate blending rates and a corresponding luminance range for at least one of the plural candidate blending rates, and performing, by the circuitry, the reverse blending process based on the plural candidate blending rates and the corresponding luminance range for the at least one of the plural candidate blending rates.

14. The reception method according to claim 9, wherein the basic stream and the extended stream have a Network Abstraction Layer (NAL) unit structure, and a Supplemental Enhancement Information (SEI) NAL unit with the information about the one or more blending rates is inserted into the basic stream or the extended stream.

15. The reception method according to claim 13, wherein the information about the one or more blending rates includes a first luminance threshold and a second luminance threshold, the first luminance threshold and the second luminance threshold defining the corresponding luminance range for the at least one of the plural candidate blending rates.

16. The reception method according to claim 9, wherein the first frame rate is 120 Hz or 240 Hz, and the second frame rate is 60 Hz.

* * * * *